US012134117B2

(12) United States Patent
Suzuki

(10) Patent No.: US 12,134,117 B2
(45) Date of Patent: Nov. 5, 2024

(54) COUPLING DEVICE FOR TUBULAR MEMBER, DIFFERENT-MATERIAL JOINING METHOD USING SAME, AND MANUFACTURING METHOD FOR TUBULAR MEMBER EQUIPPED WITH DIFFERENT-MATERIAL-JOINING AUXILIARY MEMBER

(71) Applicant: Kabushiki Kaisha Kobe Seiko Sho (Kobe Steel, Ltd.), Kobe (JP)

(72) Inventor: Reiichi Suzuki, Kanagawa (JP)

(73) Assignee: Kobe Steel, Ltd., Kobe (JP)

( * ) Notice: Subject to any disclaimer, the term of this patent is extended or adjusted under 35 U.S.C. 154(b) by 367 days.

(21) Appl. No.: 17/623,028

(22) PCT Filed: Jun. 12, 2020

(86) PCT No.: PCT/JP2020/023248
§ 371 (c)(1),
(2) Date: Dec. 27, 2021

(87) PCT Pub. No.: WO2020/262045
PCT Pub. Date: Dec. 30, 2020

(65) Prior Publication Data
US 2022/0258225 A1    Aug. 18, 2022

(30) Foreign Application Priority Data
Jun. 28, 2019 (JP) ................. 2019-122510

(51) Int. Cl.
*B21D 39/04* (2006.01)
*B23K 9/00* (2006.01)
(Continued)

(52) U.S. Cl.
CPC ......... *B21D 39/046* (2013.01); *B21D 39/048* (2013.01); *B23K 9/0026* (2013.01);
(Continued)

(58) Field of Classification Search
CPC ... B21D 39/046; B21D 39/048; F16L 13/007; F16L 13/141; Y10T 29/49927; Y10T 29/49929
See application file for complete search history.

(56) References Cited

U.S. PATENT DOCUMENTS 1,693,839 A * 12/1928 Faudi ................. B60G 7/00
29/508
4,320,568 A    3/1982 Herrod et al.
(Continued)

FOREIGN PATENT DOCUMENTS

DE    10135879 A1 * 7/2002 ............ B21D 39/04
FR    2282970 A1 * 3/1976 .......... B21D 39/046
(Continued)

OTHER PUBLICATIONS

International Search Report and Written Opinion issued Sep. 8, 2020 in PCT/JP2020/023248 filed Jun. 12, 2020, 7 pages.

*Primary Examiner* — Jermie E Cozart
(74) *Attorney, Agent, or Firm* — Oblon, McClelland, Maier & Neustadt, L.L.P.

(57) ABSTRACT

This coupling device for a tubular member is provided with: a base stand for holding an inner member and an outer member in a state in which the outer member is disposed around the inner member; a plurality of pressing members that are supported by the base stand in a movable manner in the radial direction of the inner member and the outer member and have a protruding part on the tip thereof; a pressing member that make contact with the final end of the pressing member and that can press the pressing member radially inward; and a drive mechanism that drives any one among the base stand and the pressing member in a direction perpendicular to the movement direction of the pressing member so that the one member moves relative to the other. The inner member and the outer member are caulked and (Continued)

coupled by driving, by the drive mechanism, any one among the base stand and the pressing member and displacing the pressing member radially inward to thereby expand, radially inward, a portion of a peripheral wall of the outer member by the protruding part.

14 Claims, 79 Drawing Sheets

(51) Int. Cl.
    *F16L 13/007*     (2006.01)
    *F16L 13/14*     (2006.01)

(52) U.S. Cl.
    CPC ........... *F16L 13/007* (2013.01); *F16L 13/141* (2013.01); *Y10T 29/49927* (2015.01); *Y10T 29/49929* (2015.01)

(56) References Cited

U.S. PATENT DOCUMENTS

| | | |
|---|---|---|
| 2002/0042983 A1* | 4/2002 | Ellis ................... B21D 39/048 29/505 |
| 2013/0026796 A1 | 1/2013 | Wagner et al. |
| 2013/0229005 A1 | 9/2013 | Knittel et al. |
| 2018/0015527 A1 | 1/2018 | Maeda et al. |
| 2019/0210088 A1 | 7/2019 | Maeda et al. |
| 2019/0210089 A1 | 7/2019 | Maeda et al. |

FOREIGN PATENT DOCUMENTS

| | | |
|---|---|---|
| JP | 3-238124 A | 10/1991 |
| JP | 10-99926 A | 4/1998 |
| JP | 2002-174219 A | 6/2002 |
| JP | 2006-26724 A | 2/2006 |
| JP | 2016-147309 A | 8/2016 |

* cited by examiner

COUPLING DEVICE FOR TUBULAR MEMBER, DIFFERENT-MATERIAL JOINING METHOD USING SAME, AND MANUFACTURING METHOD FOR TUBULAR MEMBER EQUIPPED WITH DIFFERENT-MATERIAL-JOINING AUXILIARY MEMBER

TECHNICAL FIELD

The present invention relates to a device for coupling tubular members, a method for joining different materials using the device for coupling tubular members, and a method for manufacturing a tubular member equipped with an auxiliary member for joining different materials, and particularly relates to a device for coupling tubular members, a method for joining different materials using the device for coupling tubular members, and a method for manufacturing a tubular member equipped with an auxiliary member for joining different materials, that can be applied to vehicles such as an automobile and a railway vehicle and a structure such as a building.

BACKGROUND ART

For example, weight of a vehicle body needs to be reduced in order to improve fuel consumption of vehicles such as an automobile. In order to reduce the weight, there is a method for replacing steel that is mainly used at present with an aluminum alloy, a magnesium alloy, a carbon fiber, and the like that are lightweight materials. However, in order to replace all materials with these lightweight materials, there are problems that costs are increased and strength is insufficient. As a solution to these problems, there is a design method such as a so-called multi-material in which steel and a lightweight material are combined at an appropriate place.

In order to combine steel and the lightweight material, there is inevitably a portion where the steel and the lightweight material are joined to each other. It is known that welding is easily performed between steels, between aluminum alloys, and between magnesium alloys, but it is extremely difficult to perform welding between different materials. This is because that an intermetallic compound (IMC) having an extremely brittle property is generated in a molten and mixed portion of steel and aluminum or magnesium, and the molten and mixed portion is easily broken by an external stress such as tension or impact. Therefore, a welding method such as a resistance spot welding method or an arc welding method cannot be adopted for different-material joining, and other joining methods are generally used. The joining of steel and a carbon fiber cannot be performed by welding because the carbon fiber is not a metal.

As an example of a technique for joining different materials in the related art, there is a method in which a through hole is provided in both a steel material and a lightweight material, and each of the steel material and the lightweight material is restrained from both sides of the through hole by a bolt and a nut. As another example, there is known a method of inserting a caulking member from one side by applying a strong pressure and restraining the caulking member by a caulking effect (for example, see Patent Literature 1).

As a portion where the steel material and the lightweight material are joined to each other, in addition to a case where flat plates are joined to each other, there is also a case where a tubular member and a flat plate are joined to each other, or a case where a tubular member and a rod member are joined to each other.

Patent Literature 2 discloses a technique in which an aluminum pipe is inserted into a hole portion of a plate-shaped steel component, and in a state in which rubber is further inserted into the aluminum pipe, both ends of the rubber are compressed to enlarge and deform the aluminum pipe, so that the aluminum pipe is joined to the steel component.

Further, Patent Literature 3 discloses a technique in which a tubular member is inserted into an opening of a steel wall, and an elastic body disposed inside the tubular member is compressed in an axial direction to expand the tubular member in two stages, so that the tubular member is joined to the steel wall.

Further, Patent Literature 4 discloses a technique in which a stainless steel pipe and an aluminum rod material are joined by laser welding to form a joint portion in a rapidly solidified state, and the joint portion is joined as a structure including a supersaturated solid solution phase in which aluminum is supersaturated and dissolved in iron.

CITATION LIST

Patent Literature

Patent Literature 1: JP-A-2002-174219
Patent Literature 2: JP-A-2016-147309
Patent Literature 3: U.S. Pat. No. 4,320,568 specification
Patent Literature 4: JP-A-2006-026724

SUMMARY OF INVENTION

Technical Problem

Here, in the case of the joining method disclosed in Patent Literature 2 or Patent Literature 3, a coupling device having a rubber or an elastic body is required at a joining site, and joining work at the site may be complicated.

In the case of the joining method disclosed in Patent Literature 4, welding conditions of the laser for obtaining sufficient joining strength are precise, and condition setting for each product is complicated.

The present invention has been made in view of the above circumstances, and an object of the present invention is to provide a device for coupling tubular members, a method for joining different materials using the device for coupling tubular members, and a method for manufacturing a tubular member equipped with an auxiliary member for joining different materials that can easily and reliably join a tubular inner member and an outer member to each other at low costs and can be applied to a wide range of fields.

Solution to Problem

The above object of the present invention is achieved by the following configurations.

(1) A device for coupling tubular members, the device coupling a tubular inner member with a tubular outer member disposed around the inner member, the coupling device including:
  a base that holds the inner member and the outer member in a state in which the outer member is disposed around the inner member;
  a plurality of pressing members that are supported by the base around the outer member in a manner in which the pressing members are movable in a radial direction of the inner member and the outer member, a tip end of each of the pressing members having a protruding portion;
a pressurizing member that comes into contact with an end part of the pressing member and pressurize the pressing member inward in the radial direction; and
a drive mechanism that drives one of the base and the pressurizing member so as to move relative to the other one of the base and the pressurizing member in a direction perpendicular to a moving direction of the pressing members, in which
the drive mechanism is that drives one of the base and the pressurizing member to displace the pressing member inward in the radial direction, so that a part of a peripheral wall of the outer member is bulged inward in the radial direction by the protruding portion, and the inner member and the outer member are caulked and coupled to each other.

(2) The device for coupling tubular members according to (1), further including a columnar core that can be placed inside the inner member.

(3) The device for coupling tubular members according to (2), in which
the core has a plurality of groove portions extending along an axial direction, and
the core is attached to the base such that phases of the plurality of groove portions and phases of the plurality of pressing members coincide with each other.

(4) The device for coupling tubular members according to any one of (1) to (3), further including a mechanism for returning pressing members that displaces the plurality of pressing members outward in the radial direction relative to the inner member and the outer member that are caulked and coupled to each other.

(5) The device for coupling tubular members according to any one of (1) to (4), in which
the base has a plurality of non-circular support holes that supports the plurality of pressing members respectively around the outer member in a manner in which the pressing members are movable in the radial direction of the inner member and the outer member, and the base is formed into a cylindrical shape, and
the pressurizing member is formed into an annular shape so as to surround a periphery of the base having the cylindrical shape, and has an inclined surface that faces an inclined surface of the end part of the pressing member.

(6) A method for joining different materials for joining a tubular first member made of a first material and a second member made of a second material different from the first material, using the device for coupling tubular members according to any one of (1) to (5), the method including:
setting the inner member and the outer member on the base such that one of the tubular auxiliary member made of a third material different from the first material and the first member is disposed as the outer member around a portion of the other one of the auxiliary member and the first member as the inner member where a plurality of holes are formed;
caulking and coupling the inner member and the outer member to each other by displacing the pressing member inward in the radial direction toward a peripheral wall of the outer member that faces the plurality of holes formed in the inner member, and causing a part of the peripheral wall of the outer member to bulge inward in the radial direction and fit into the holes, and;
detaching the inner member and outer member that are caulked and coupled to each other from the base; and
joining the first member and the second member via the auxiliary member by welding the auxiliary member and the second member.

(7) The method for joining different materials according to (6), in which
a columnar core is provided, the core has a plurality of groove portions extending along an axial direction at phases corresponding to the plurality of holes, and the core can be placed inside the inner member,
the core is attached to the base such that phases of the plurality of groove portions and phases of the plurality of pressing members coincide with each other,
the inner member is set on the base in the setting such that phases of the plurality of holes coincide with the phases of the plurality of groove portions of the core, and
a part of the peripheral wall of the outer member is fitted into the holes of the inner member and the groove portions of the core in the caulking and coupling.

(8) A method for joining different materials for joining a tubular first member made of a first material and a second member made of a second material different from the first material, using the device for coupling tubular members according to (3), the method including:
setting the inner member and the outer member on the base such that one of the tubular auxiliary member made of a third material different from the first material and the first member is disposed as the outer member around the other one of the auxiliary member and the first member as the inner member;
caulking and coupling the inner member and the outer member to each other by displacing the pressing member inward in the radial direction toward a peripheral wall of the outer member that faces the plurality of groove portions formed in the core via the inner member, and causing a part of the peripheral wall of the outer member to bulge inward in the radial direction and fit into recesses formed in the inner member;
detaching the inner member and outer member that are caulked and coupled to each other from the base; and
joining the first member and the second member via the auxiliary member by welding the auxiliary member and the second member.

(9) The method for joining different materials according to claim 6, wherein
the inner member is the auxiliary member, and the outer member is the first member,
an expanded pipe portion having an outer peripheral surface of which a diameter is larger than an inner diameter of the first member is provided at an axial end portion of the auxiliary member, and
the axial end portion of the first member is brought into contact with the expanded pipe portion of the auxiliary member.

(10) The method for joining different materials according to any one of (6) to (9),
in which the first material is made of any one of an aluminum alloy, a magnesium alloy, a steel, and a non-metal, and
the second and the third materials are made of any one of aluminum alloy, magnesium alloy, and steel.

(11) A method for manufacturing a tubular member equipped with an auxiliary member for joining different materials including a tubular member, and a tubular auxiliary member that is made of a material different from a material of the tubular member and is fitted to the tubular member, the method using the device for coupling tubular members according to any one of (1) to (5), the method including:
  setting the inner member and the outer member on the base such that one of the tubular member and the auxiliary member is disposed as the outer member around a portion of the other one of the tubular member and the auxiliary member as the inner member where a plurality of holes are formed;
  caulking and coupling the inner member and the outer member to each other by displacing the pressing member inward in the radial direction toward a peripheral wall of the outer member that faces the plurality of holes formed in the inner member, and causing a part of the peripheral wall of the outer member to bulge inward in the radial direction and fit into the holes; and
  detaching the inner member and outer member that are caulked and coupled to each other from the base.

(12) The method for manufacturing a tubular member equipped with an auxiliary member for joining different materials according to (11), in which
  a columnar core is provided, the core has a plurality of groove portions extending along an axial direction at phases corresponding to the plurality of holes, and the core can be placed inside the inner member,
  the core is attached to the base such that phases of the plurality of groove portions and phases of the plurality of pressing members coincide with each other,
  the inner member is set on the base in the setting such that phases of the plurality of holes coincide with the phases of the plurality of groove portions of the core, and
  a part of the peripheral wall of the outer member is fitted into the holes of the inner member and the groove portions of the core in the caulking and coupling.

(13) A method for manufacturing a tubular member equipped with an auxiliary member for joining different materials including a tubular member and a tubular auxiliary member that is made of a material different from a material of the tubular member and is fitted to the tubular member, the method using the device for coupling tubular members according to (3), the method including:
  setting the inner member and the outer member on the base such that one of the tubular member and the auxiliary member is disposed as the outer member around the other one of the tubular member and the auxiliary member as the inner member;
  caulking and coupling the inner member and the outer member to each other by displacing the pressing member inward in the radial direction toward a peripheral wall of the outer member that faces the plurality of groove portions formed in the core via the inner member, and causing a part of the peripheral wall of the outer member to bulge inward in the radial direction and fit into recesses formed in the inner member; and
  detaching the inner member and outer member that are caulked and coupled to each other from the base.

(14) The method for manufacturing a tubular member equipped with an auxiliary member for joining different materials according to any one of (11) to (13), in which
  the inner member is the auxiliary member, and the outer member is the tubular member,
  an expanded pipe portion having an outer peripheral surface of which a diameter is larger than an inner diameter of the tubular member is provided at an axial end portion of the auxiliary member, and
  the axial end portion of the tubular member is brought into contact with the expanded pipe portion of the auxiliary member.

(15) The method for manufacturing a tubular member equipped with an auxiliary member for joining different materials according to any one of (11) to (14), in which
  a material of the tubular member is any one of aluminum alloy, magnesium alloy, steel, and non-metal, and
  a material of the auxiliary member is any one of aluminum alloy, magnesium alloy, and steel.

Advantageous Effects of Invention

According to the device for coupling tubular members of the present invention, the tubular inner member and the tubular outer member can be joined easily and reliably at low costs, and can be applied to a wide range of fields.

According to the method for joining different materials of the present invention, the tubular auxiliary member is firmly coupled to the tubular first member, and the auxiliary member and the second member are joined by welding, so that the first member and the second member that are made of different materials can be joined indirectly via the auxiliary member.

The second member can be joined to any position of the first member depending on an attachment position of the auxiliary member to the first member.

Further, when the tubular first member and the auxiliary member are coupled to each other in advance, the auxiliary member and the second member can be easily joined to each other using a general welding method.

Since it is possible to provide a large number of caulking portions between the tubular first member and the auxiliary member, coupling strength can be further increased.

Therefore, the present invention can easily and reliably join members made of different materials at low costs, and can be applied to a wide range of fields.

According to the method for manufacturing a tubular member equipped with an auxiliary member for joining different materials of the present invention, the tubular auxiliary member is firmly coupled to the tubular member, so that the tubular member and a member made of a different material from a material of the tubular member can be joined indirectly via the auxiliary member.

The member made of a different material from the material of the tubular member can be joined to any position of the tubular member depending on an attachment position of the auxiliary member to the tubular member.

Since it is possible to provide a large number of caulking portions between the tubular first member and the auxiliary member, coupling strength can be further increased.

Therefore, the present invention can easily and reliably join members made of different materials at low costs, and can be applied to a wide range of fields.

DESCRIPTION OF EMBODIMENTS

Hereinafter, a device for coupling tubular members, a method for joining different materials using the device for coupling tubular members, and a method for manufacturing a tubular member equipped with an auxiliary member for joining different materials according to embodiments of the present invention will be described in detail with reference to the drawings.

In the first to the third embodiments to be described below, a pipe 1 that is a first member is an inner member of the present invention and an auxiliary member 3 is an outer member of the present invention. In the fourth to the seventh embodiments, the pipe 1 that is a first member is an outer member of the present invention and the auxiliary member 3 is an inner member of the present invention. In the first, second, fourth, fifth, and seventh embodiments, a plurality of through holes 1a and 3f are formed in the inner member, while in the third and sixth embodiments, no through hole is formed.

First Embodiment

Figure 1:
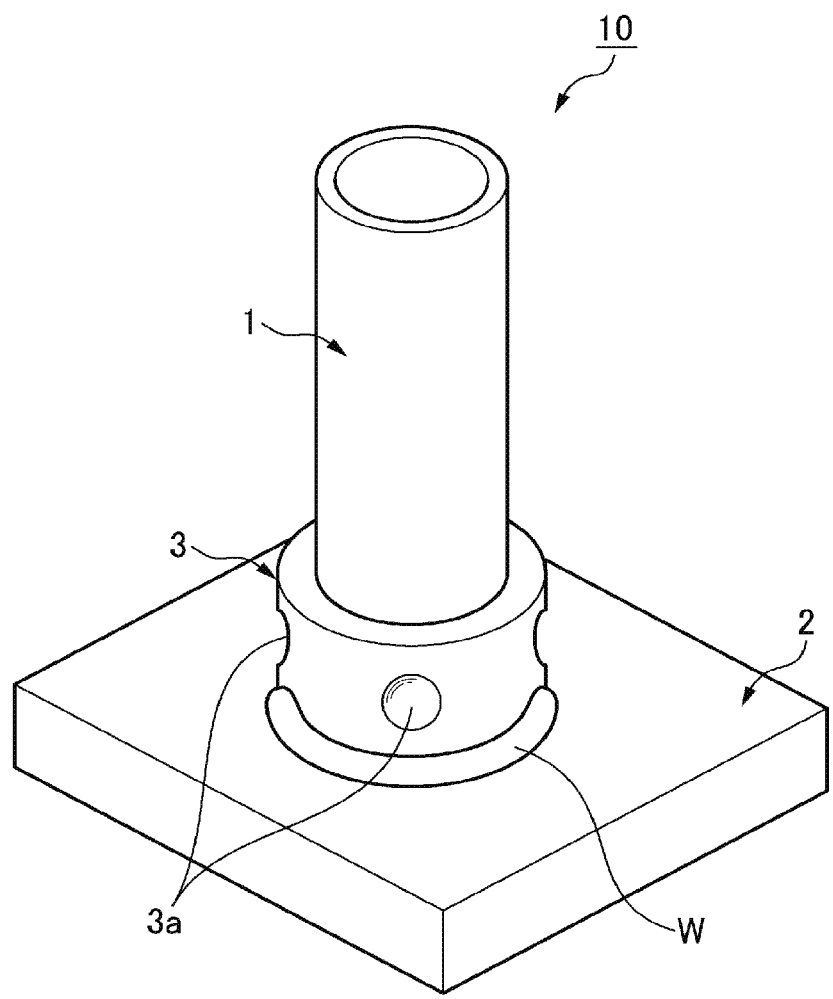
FIG. 1 is a perspective view showing a joint of different materials according to a first embodiment of the present invention.

In a method for joining different materials according to a first embodiment, a circular tubular pipe (a first member, a tubular member) 1 made of an aluminum alloy or a magnesium alloy (a first material) and a flat plate material (a second member) 2 made of steel (a second material) are indirectly joined to each other using a circular tubular auxiliary member 3 made of steel (a third material) to obtain a joint 10 of different materials as shown in FIG. 1. Therefore, in the joint 10 of different materials, as will be described in detail below, the auxiliary member 3 is firmly coupled to the pipe 1, and the auxiliary member 3 and the plate material 2 are joined to each other by arc welding or the like.

Figure 2:
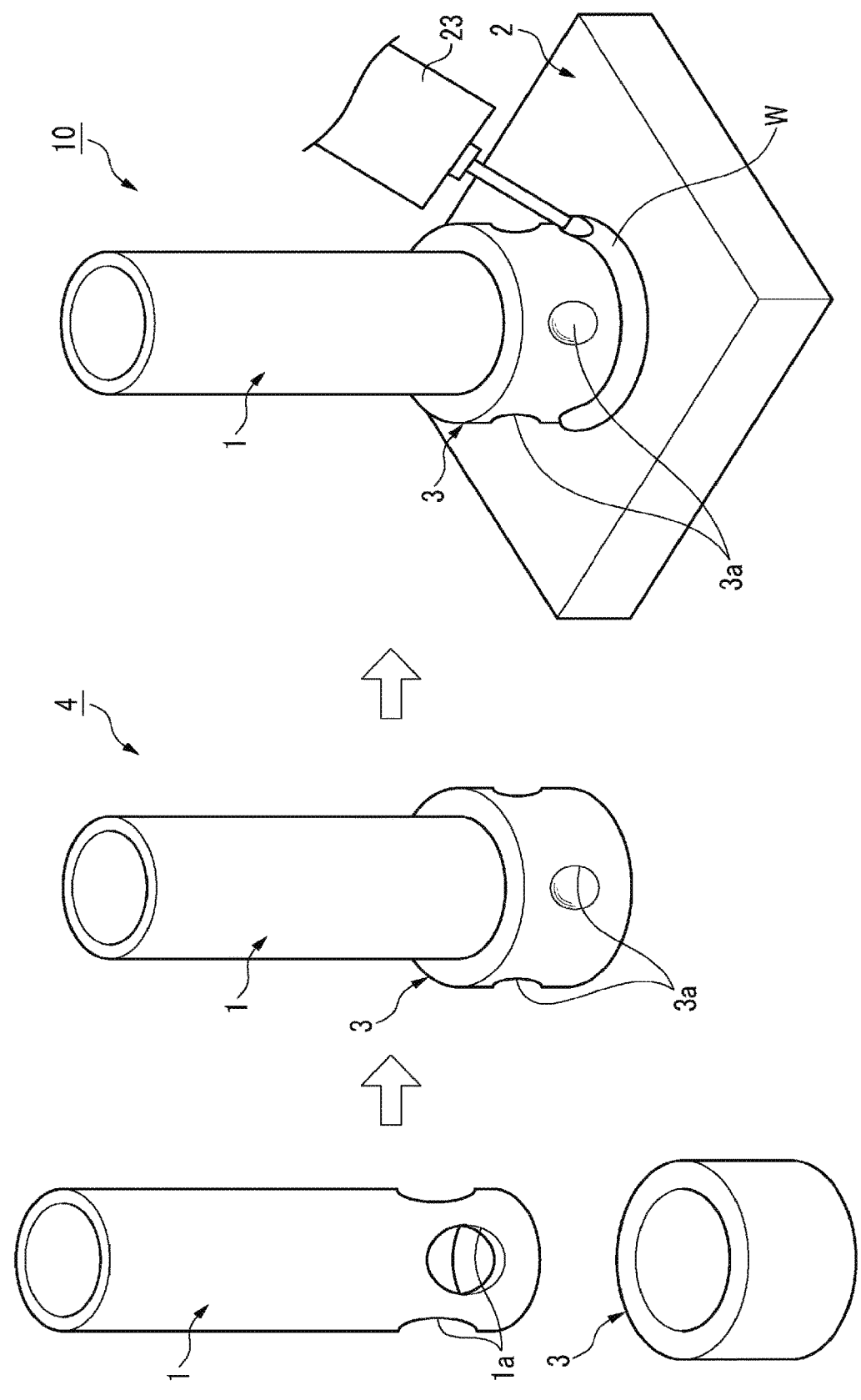
FIG. 2 is a perspective view showing steps of a method for joining different materials according to the first embodiment of the present invention.

As shown in FIG. 2, a plurality of through holes (four in the present embodiment) 1a are formed in the pipe 1 at a predetermined interval in a circumferential direction. The plurality of through holes 1a are formed at positions close to an end portion of the pipe 1 in an axial direction.

Figure 4:
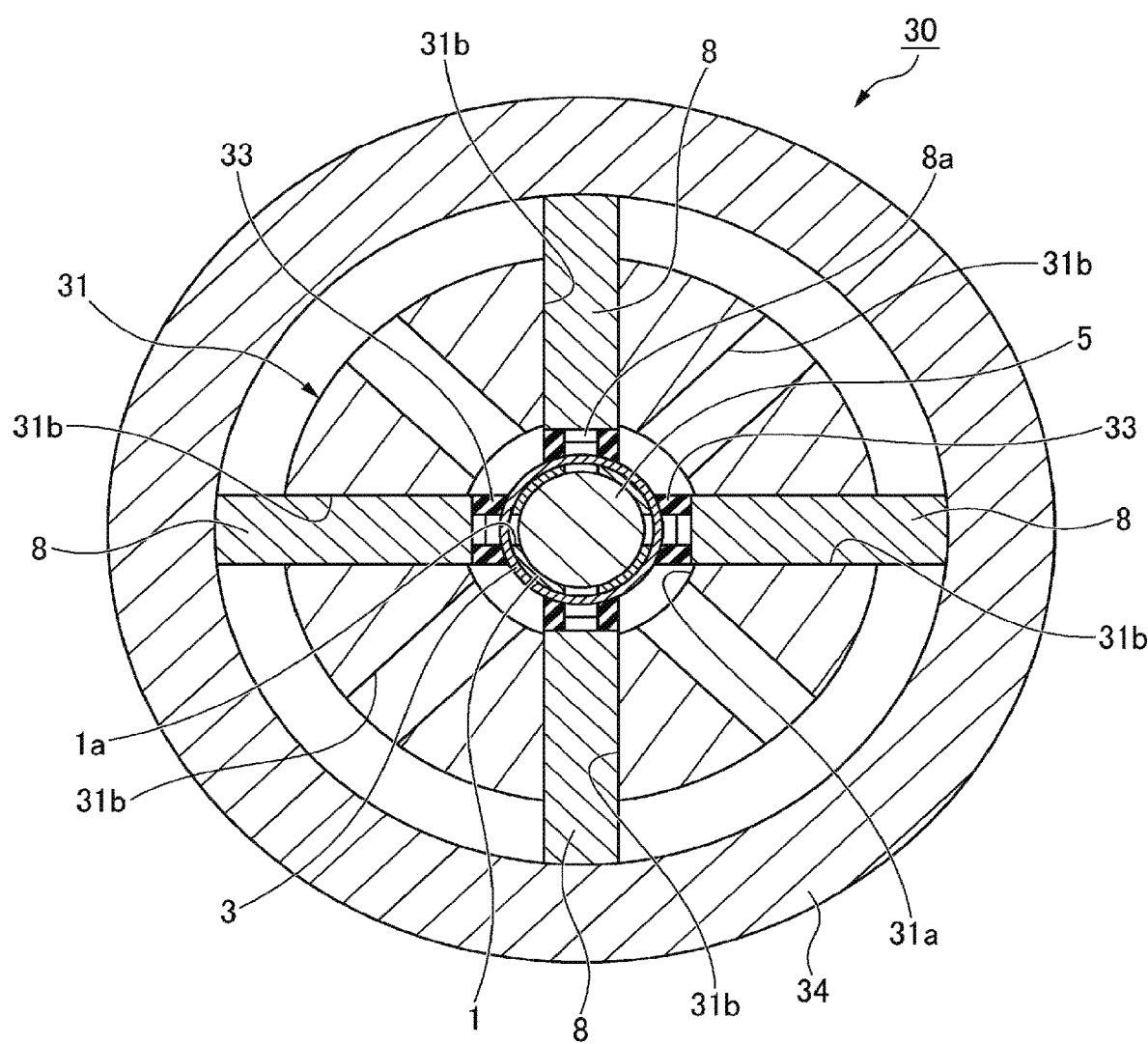
FIG. 4 is a horizontal cross-sectional view showing a coupling device taken along a line IV-IV in FIG. 5A and showing a state in which a pipe and an auxiliary member are mounted on a base in the method for joining different materials and the method for manufacturing a tubular member equipped with an auxiliary member for joining different materials according to the first embodiment.
Figure 5A:
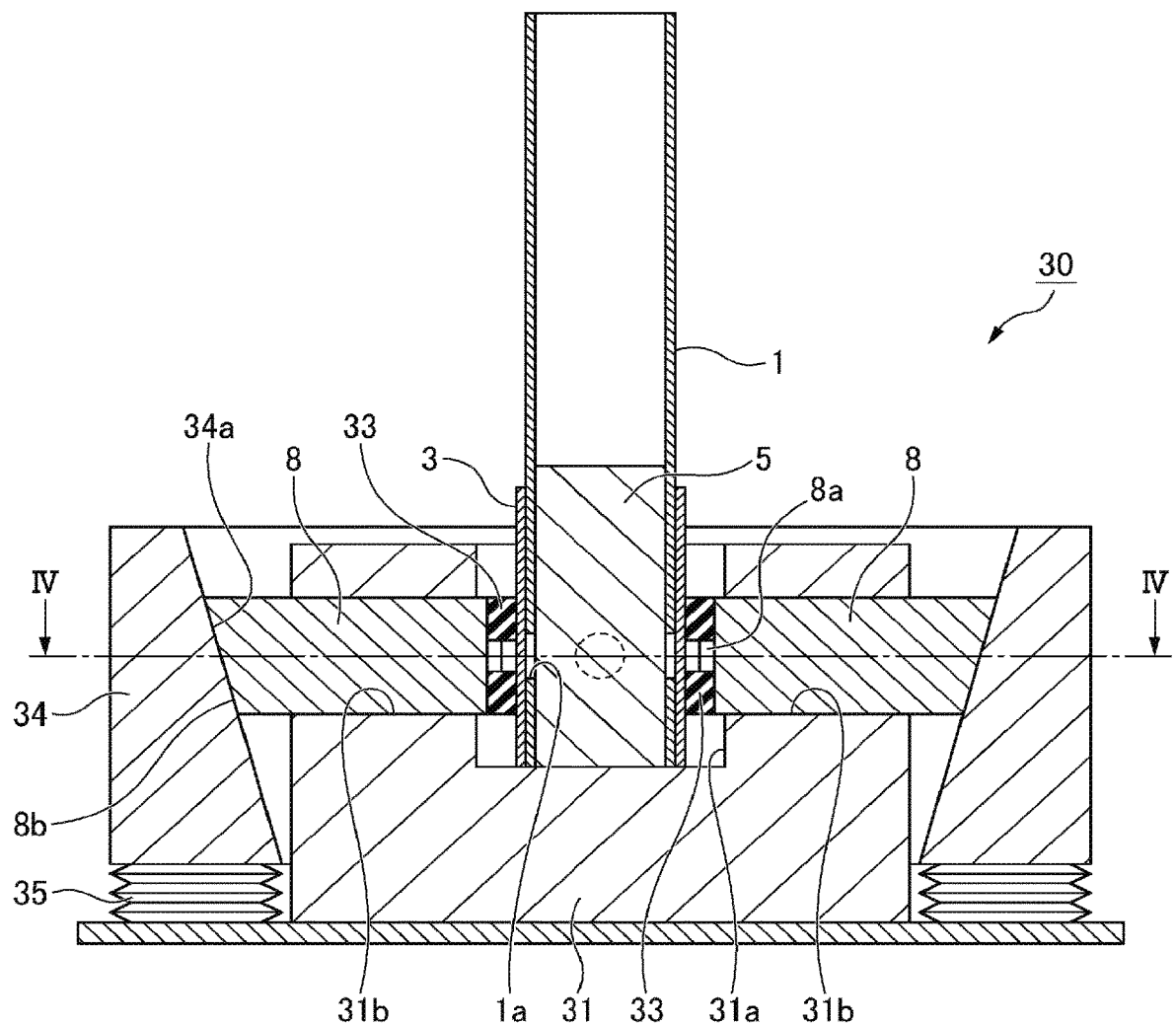
FIG. 5A is a cross-sectional view showing the coupling device in a state in which the pipe and the auxiliary member are mounted on the base in the method for joining different materials and the method for manufacturing a tubular member equipped with an auxiliary member for joining different materials according to the first embodiment.

The auxiliary member 3 is fitted and attached to the end portion of the pipe 1. Therefore, an inner diameter of the auxiliary member 3 is designed to be slightly larger than an outer diameter of the pipe 1. The auxiliary member 3 has a plurality of fitting portions 3a of which a part of a peripheral wall facing the plurality of through holes 1a of the pipe 1 is bulged inward in the radial direction by a coupling device 30 for a tubular member as shown in FIGS. 4 and 5A and that are fitted into the plurality of through holes 1a. Accordingly, the auxiliary member 3 is caulked and coupled to the pipe 1. A base portion of the fitting portion 3a is brought into contact with an outer peripheral surface of the pipe 1 over the entire periphery of an edge portion of the through hole 1a, and the auxiliary member 3 is positioned in the axial direction relative to the pipe 1 and is prevented from rotating.

A welded metal W is formed by arc welding at corner portions between the plate material 2 and an end portion of the auxiliary member 3 placed on a flat surface of the plate material 2, and the plate material 2 and the auxiliary member 3 are firmly joined to each other.

The coupling device 30 shown in FIGS. 4 and 5A mainly includes a base 31, a core 5, a plurality of plungers 8 serving as pressing members, a return rubber 33 serving as a mechanism for returning pressing members, a pressurizing member 34, and a pump 35 serving as a drive mechanism.

The base 31 is formed into a cylindrical shape, and has a recessed portion 31a opened upward at the center of the base 31. The base 31 holds the pipe 1 and the auxiliary member 3 on a bottom surface of the recessed portion 31a in a state in which the auxiliary member 3 is disposed around the pipe 1. An inner diameter of the recessed portion 31a is formed to be larger than an outer diameter of the auxiliary member 3. A plurality of non-circular support holes 31b are formed at equal intervals in the circumferential direction in the base 31. The support holes 31b respectively support the plurality of plungers 8 in a manner in which the plungers 8 can move in a radial direction of the pipe 1 and the auxiliary member 3 in order to advance the plurality of plungers 8 into the recessed portion 31a. Although the plungers 8 are arranged at equal intervals at four positions among eight positions of the support holes 31b in the drawing, the plungers 8 may be arranged at all of the eight positions depending on coupling strength.

The core 5 is made of steel, is formed into a cylindrical shape, and is attached to the bottom surface of the recessed portion 31a in a manner of being concentric with a central axis of the base 31. An outer diameter of the core 5 is designed to be slightly smaller than an inner diameter of the pipe 1 so that the core 5 can be disposed inside the pipe 1. Therefore, the pipe 1 and the auxiliary member 3 are disposed coaxially relative to the central axis of the base 31 by disposing the pipe 1 and the auxiliary member 3 around the core 5 in the present embodiment.

The core 5 may not be attached to the bottom surface of the recessed portion 31a in advance, and may be inserted into the pipe 1 from above the pipe 1 after the pipe 1 is disposed on the base 31. In this case, the pipe 1 needs to be disposed concentrically with the central axis of the base 31.

The plurality of plungers 8 are supported by the support holes 31b of the base 31 around the auxiliary member 3 in a manner in which the plungers 8 can move in the radial direction of the pipe 1 and the auxiliary member 3. The plungers 8 has a similar shape whose cross-sectional dimension is slightly smaller than that of the support holes 31b. Each of the plungers 8 has a protruding portion 8a whose outer diameter is smaller than an inner diameter of the through hole 1a at a tip end of the plunger 8 close to the recessed portion 31a, and has an inclined surface 8b at an end part of the plunger 8 close to the pressurizing member 34.

The return rubber 33 is attached to a periphery of the protruding portion 8a at the tip end of each plunger 8, and the protruding portion 8a is displaced inward in the radial direction to be elastically deformed when the auxiliary member 3 is deformed.

The pressurizing member 34 is formed into an annular shape so as to surround a periphery of the base 31 having a cylindrical shape, and has an inclined surface 34a that faces the inclined surface 8b of the plunger 8. In the present embodiment, an inclination angle of the inclined surface 34a is designed to be the same as an inclination angle of the inclined surface 8b of the plunger 8. The inclined surface 34a of the pressurizing member 34 and the inclined surface 8b of the plunger 8 are formed to be inclined in a manner of being separated from the central axis toward an upper side. The inclined surface 34a of the pressurizing member 34 may be formed for each inclined surface 8b corresponding to a shape of the inclined surface 8b of the plunger 8, but the inclined surface 34a is formed to be a single conical surface in the present embodiment. When the inclined surface 34a of the pressurizing member 34 is a single conical surface, the inclined surface 8b of the plunger 8 is preferably a partially cylindrical surface having a curved shape in a top view along the conical surface, and may be a flat surface as long as the plunger 8 can be moved by the driving of the pressurizing member 34.

The pump 35 is attached to a lower surface of the pressurizing member 34, and drives the pressurizing member 34 in a direction perpendicular to a moving direction of the plunger 8, that is, in a vertical direction. A plurality of pumps 35 may be arranged at equal intervals in the circumferential direction, and may drive the lower surface of the pressurizing member 34 to move upward uniformly.

Therefore, in the coupling device 30, the pump 35 drives the pressurizing member 34 upward, and the pressurizing member 34 displaces the plunger 8 inward in the radial direction, so that a part of a peripheral wall of the auxiliary member 3 is bulged inward in the radial direction by the protruding portion 8a of the plunger 8, and the pipe 1 and the auxiliary member 3 are caulked and coupled to each other.

Therefore, the pump 35 can apply, to the pressurizing member 34, a heavy load by which the protruding portions 8a of the plurality of plungers 8 simultaneously deform a part of the peripheral wall of the auxiliary member 3, and the pressurizing member 34 is brought into contact with the end part of the plunger 8, so that the pressurizing member 34 can pressurize the plungers 8 inward in the radial direction.

Figure 3:
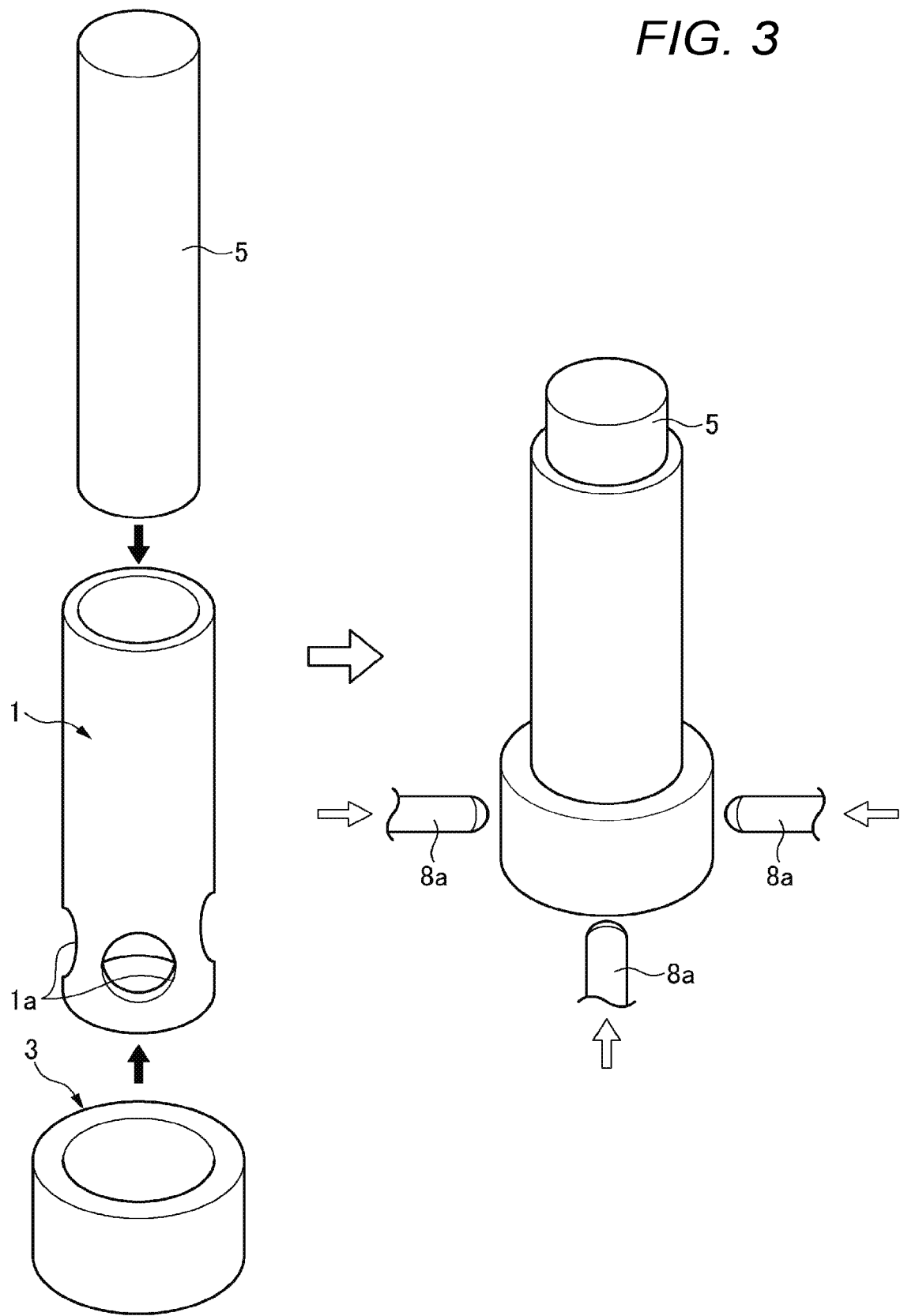
FIG. 3 is a perspective view showing a core arrangement step and a caulking and coupling step in the method for joining different materials and a method for manufacturing a tubular member equipped with an auxiliary member for joining different materials according to the first embodiment.

As shown in FIGS. 2 and 3, in a method for manufacturing the joint 10 of different materials, first, the circular tubular pipe 1 in which the plurality of through holes 1a are formed and the tubular auxiliary member 3 are prepared. The plurality of through holes 1a of the pipe 1 are formed in a tubular blank member using a punch or the like (not shown). The plurality of through holes 1a are not limited to a circular shape as shown in FIG. 1, and may have other shapes such as a polygonal shape. It is preferable that a shape of a tip end of the plunger 8 matches with a shape of the through hole 1a.

Then, as shown in FIGS. 4 and 5A, the pipe 1 and the auxiliary member 3 are set on the base 31 of the coupling device 30. Accordingly, as shown in FIG. 3, the auxiliary member 3 is disposed around a portion of the pipe 1 where the plurality of through holes 1a are formed, and the columnar core 5 is disposed inside the pipe 1.

When the pipe 1 is set on the base 31, the plurality of plungers (pressing members) 8 are arranged at positions corresponding to phases of the plurality of through holes 1a of the pipe 1 at an outer side in the radial direction of the auxiliary member 3.

Figure 5B:
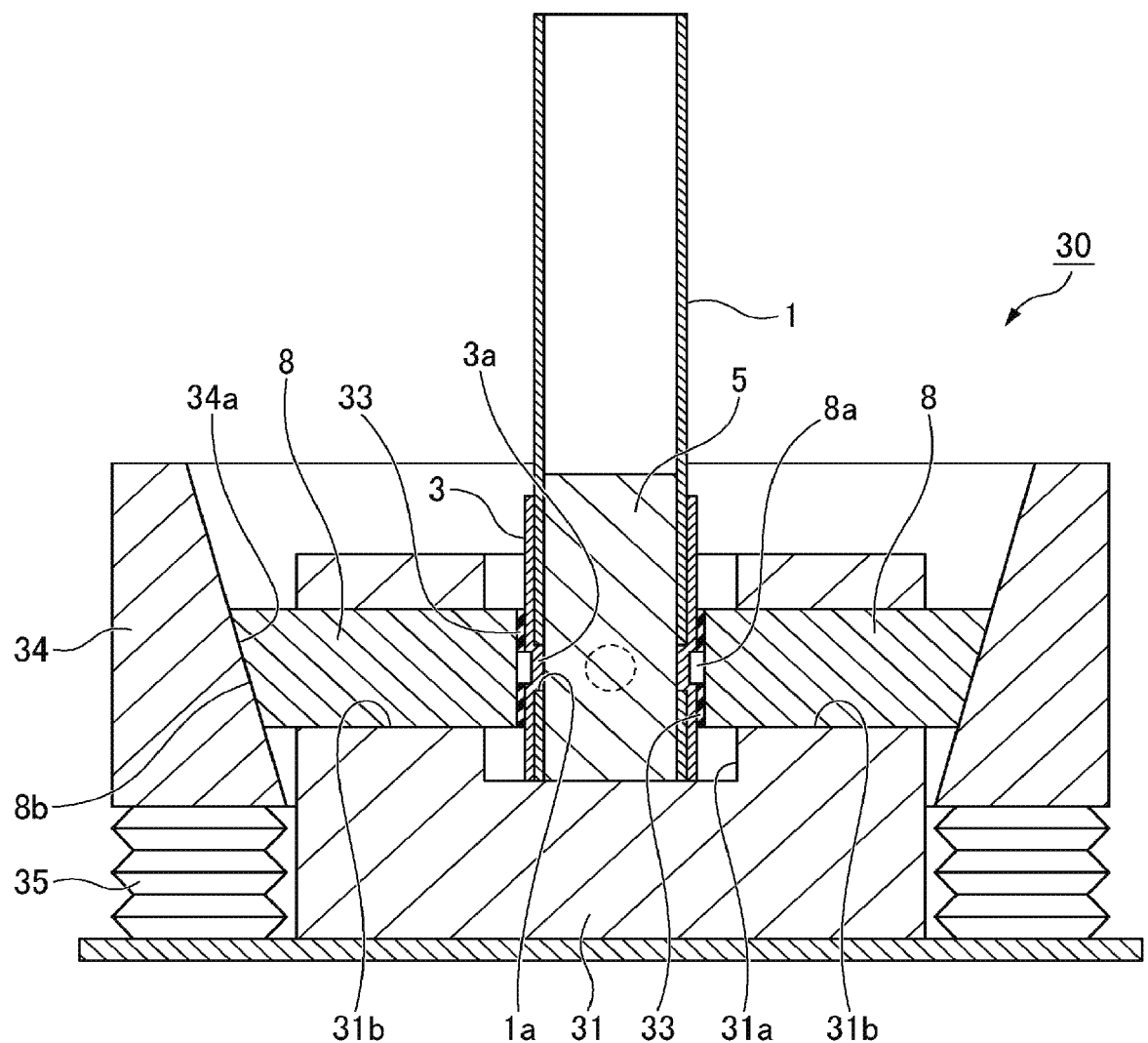
FIG. 5B is a cross-sectional view showing the coupling device in a caulking and coupling state in the method for joining different materials and the method for manufacturing a tubular member equipped with an auxiliary member for joining different materials according to the first embodiment.

Then, as shown in FIG. 5B, the pump 35 drives the pressurizing member 34 upward, so that the plurality of plungers 8 are displaced inward in the radial direction toward the peripheral wall of the auxiliary member 3 that faces the plurality of through holes 1a of the pipe 1. Accordingly, a part of the peripheral wall of the auxiliary member 3 is bulged inward in the radial direction by the protruding portion 8a of the plunger 8 and is fitted into the through hole 1a to form the fitting portion 3a, and the pipe 1 and the auxiliary member 3 are caulked and coupled to each other.

Figure 5C:
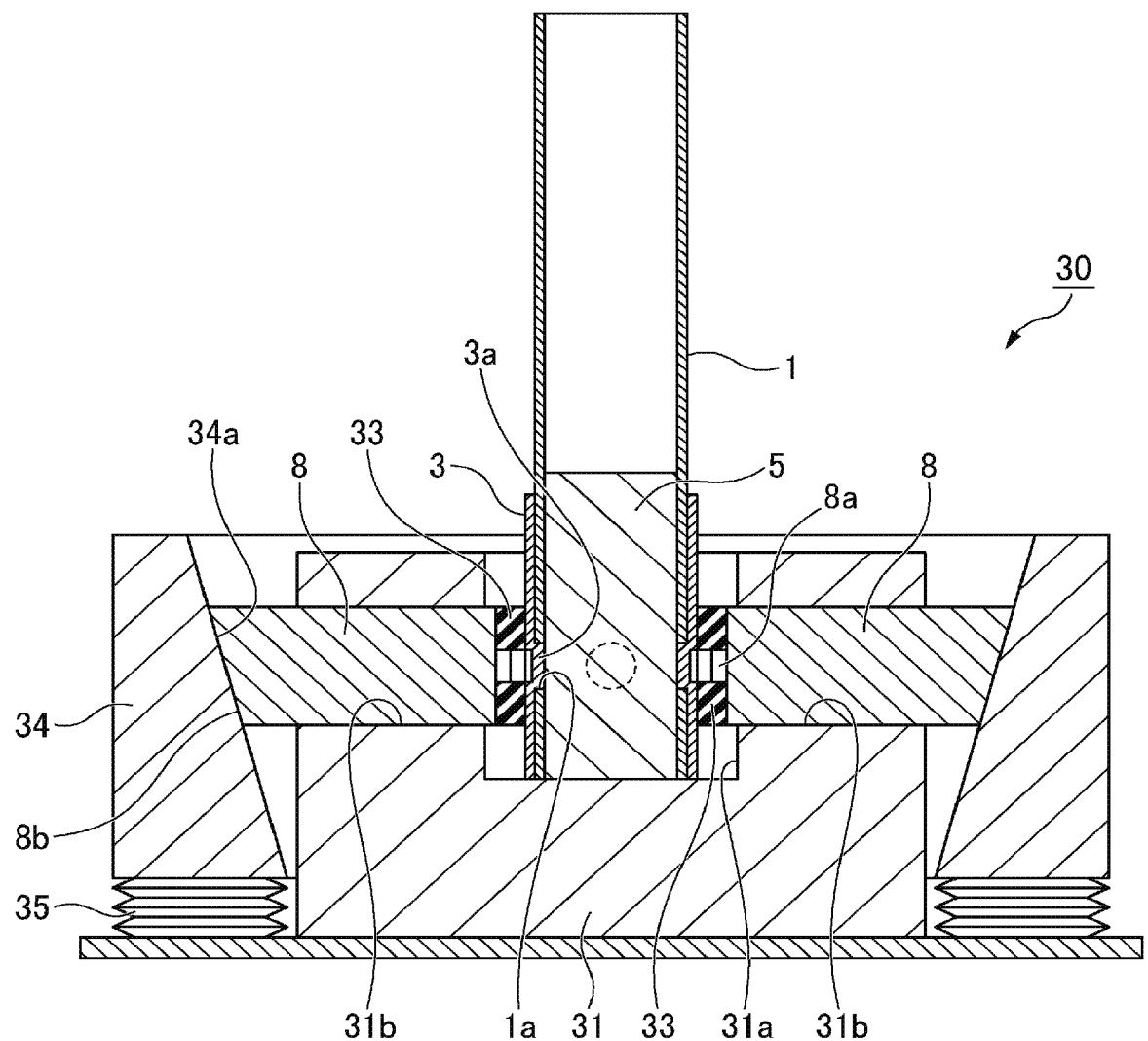
FIG. 5C is a cross-sectional view showing the coupling device in a state in which a plunger is returned and caulking and coupling are completed in the method for joining different materials and the method for manufacturing a tubular member equipped with an auxiliary member for joining different materials according to the first embodiment.
Figure 5D:
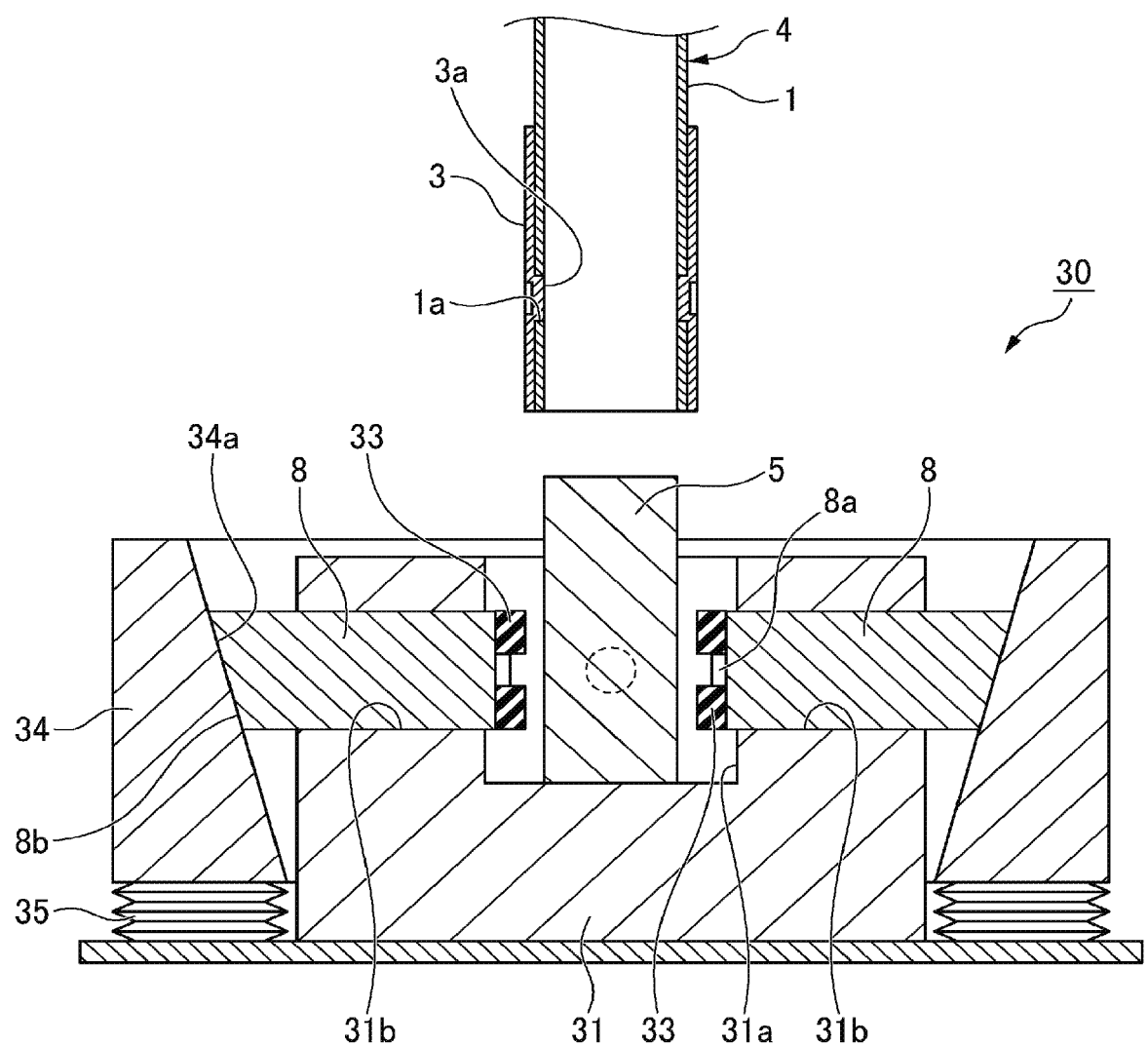
FIG. 5D is a cross-sectional view showing the coupling device in a state in which the tubular member equipped with an auxiliary member is detached from the coupling device in the method for joining different materials and the method for manufacturing a tubular member equipped with an auxiliary member for joining different materials according to the first embodiment.

Thereafter, as shown in FIG. 5C, the pump 35 drives the pressurizing member 34 downward, thereby moving the plunger 8 outward in the radial direction so as to retreat from the fitting portion 3a due to an action of the return rubber 33. Then, as shown in FIG. 5D, the pipe 1 and the auxiliary member 3 are detached from the core 5 and the base 31, thereby obtaining a joined body (a tubular member equipped with an auxiliary member for joining different materials) 4 including the pipe 1 and the auxiliary member 3.

Thereafter, returning to FIG. 2, the auxiliary member 3 of the joined body 4 and the plate material 2 are joined by arc welding or the like. Since fillet welding by an arc is welding between steels, the plate material 2 and the auxiliary member 3 are firmly joined without generating an intermetallic compound. In FIG. 2, reference numeral 23 denotes a welding torch.

In the present embodiment, the pipe 1 is made of an aluminum alloy or a magnesium alloy, and the plate material 2 and the auxiliary member 3 are made of steel. Materials of the members are not limited thereto as along as a material of the plate material 2 and a material of the auxiliary member 3 are different from a material of the pipe 1. For example, the material of the plate material 2 and the auxiliary member 3 may be any material that can be joined to each other by fusion welding without generating an intermetallic compound. Steel compositions of the plate material 2 and the auxiliary member 3 may be the same or may be different from each other.

When the pipe 1 is made of steel and the plate material 2 is made of an aluminum alloy or a magnesium alloy, the auxiliary member 3 may be made of a material different from the material of the pipe 1, and may be made of, for example, an aluminum alloy or a magnesium alloy which is the same material as the plate material 2.

Further, the pipe 1 may be made of a non-metal material including a resin material such as a carbon fiber reinforced resin instead of a metal material. In this case as well, the plate material 2 and the auxiliary member 3 may be made of a metal material and may be made of steel, or may be made of an aluminum alloy or a magnesium alloy.

A cross-sectional shape of the pipe 1 is not limited to a circular shape and may be any shape as long as the shape is a tubular shape. A cross-sectional shape of the auxiliary member 3 may be a shape corresponding to the shape of the pipe 1 or may be a shape different from the shape of the pipe 1 as long as the auxiliary member 3 has a shape in which the auxiliary member 3 is brought into contact with or close to an outer surface of the pipe 1 at a portion where the through hole 1a is formed and the fitting portion 3a is formed in the through hole 1a. On the other hand, a cross-sectional shape of the core 5 is required to be similar to the cross-sectional shape of the pipe 1.

Figure 6A:
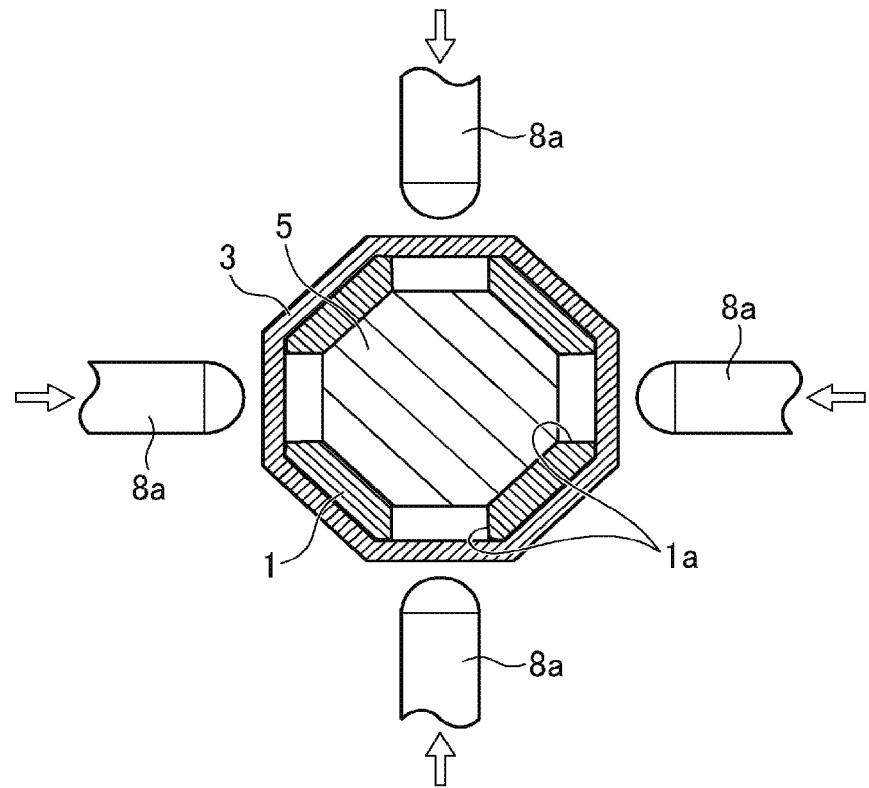
FIG. 6A is a horizontal cross-sectional view showing a pipe, an auxiliary member, a core, and a plunger and showing a caulking and coupling step in the method for joining different materials and the method for manufacturing a tubular member equipped with an auxiliary member for joining different materials according to a first modification of the first embodiment.

For example, in FIG. 6A, the pipe 1 is a polygonal tube member whose cross-sectional shape is a regular octagonal shape, the auxiliary member 3 is also a polygonal tube member whose cross-sectional shape is a regular octagonal shape, and the core 5 is a polygonal columnar member whose cross-sectional shape is a regular octagonal shape. The through hole 1a is formed in every other side of the pipe 1. The through holes 1a are formed in four sides.

Figure 6B:
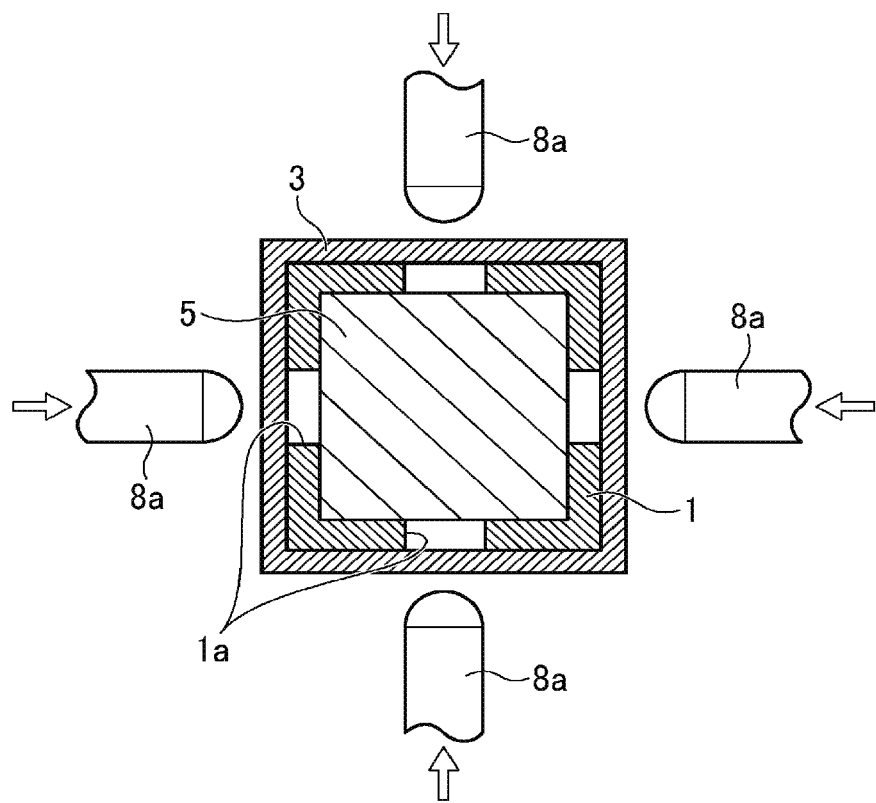
FIG. 6B is a horizontal cross-sectional view showing a pipe, an auxiliary member, a core, and a plunger and showing a caulking and coupling step in the method for joining different materials and the method for manufacturing a tubular member equipped with an auxiliary member for joining different materials according to a second modification of the first embodiment.

In FIG. 6B, the pipe 1 is a polygonal tube member whose cross-sectional shape is a square, the auxiliary member 3 is also a polygonal tube member whose cross-sectional shape is a square, and the core 5 is a polygonal columnar member whose cross-sectional shape is a square. The through holes 1a are formed in all sides of the pipe 1.

Figure 6C:
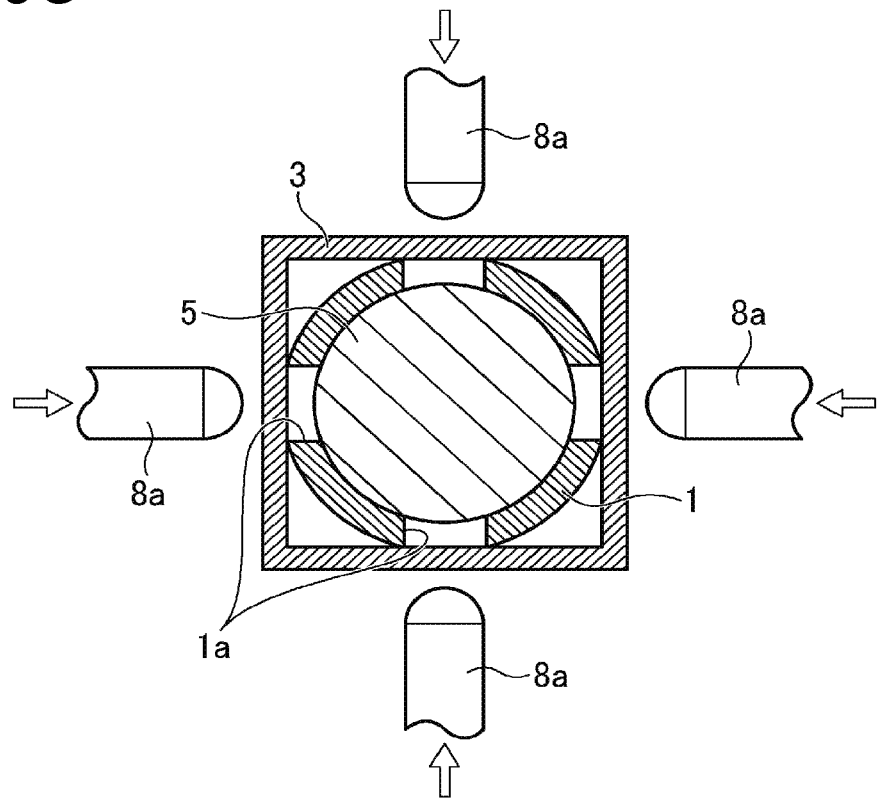
FIG. 6C is a horizontal cross-sectional view showing a pipe, an auxiliary member, a core, and a plunger and showing a caulking and coupling step in the method for joining different materials and the method for manufacturing a tubular member equipped with an auxiliary member for joining different materials according to a third modification of the first embodiment.

In FIG. 6C, the pipe 1 is a circular tube member whose cross-sectional shape is a circular shape, the auxiliary member 3 is a polygonal tube member whose cross-sectional shape is a square, and the core 5 is a cylindrical member whose cross-sectional shape is a circular shape. The through holes 1a are formed in the pipe 1 at an interval of 90° in the circumferential direction.

Figure 6D:
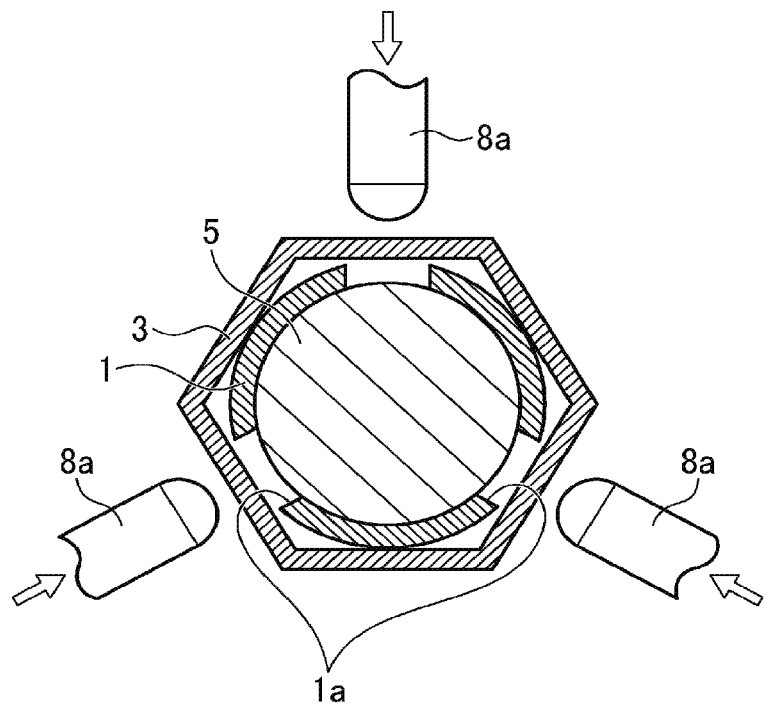
FIG. 6D is a horizontal cross-sectional view showing a pipe, an auxiliary member, a core, and a plunger and showing a caulking and coupling step in the method for joining different materials and the method for manufacturing a tubular member equipped with an auxiliary member for joining different materials according to a fourth modification of the first embodiment.

In FIG. 6D, the pipe 1 is a circular tube member whose cross-sectional shape is a circular shape, the auxiliary member 3 is a polygonal tube member whose cross-sectional shape is a regular hexagonal shape, and the core 5 is a cylindrical member whose cross-sectional shape is a circular shape. The through holes 1a are formed in the pipe 1 at an interval of 120° in the circumferential direction.

Figure 6E:
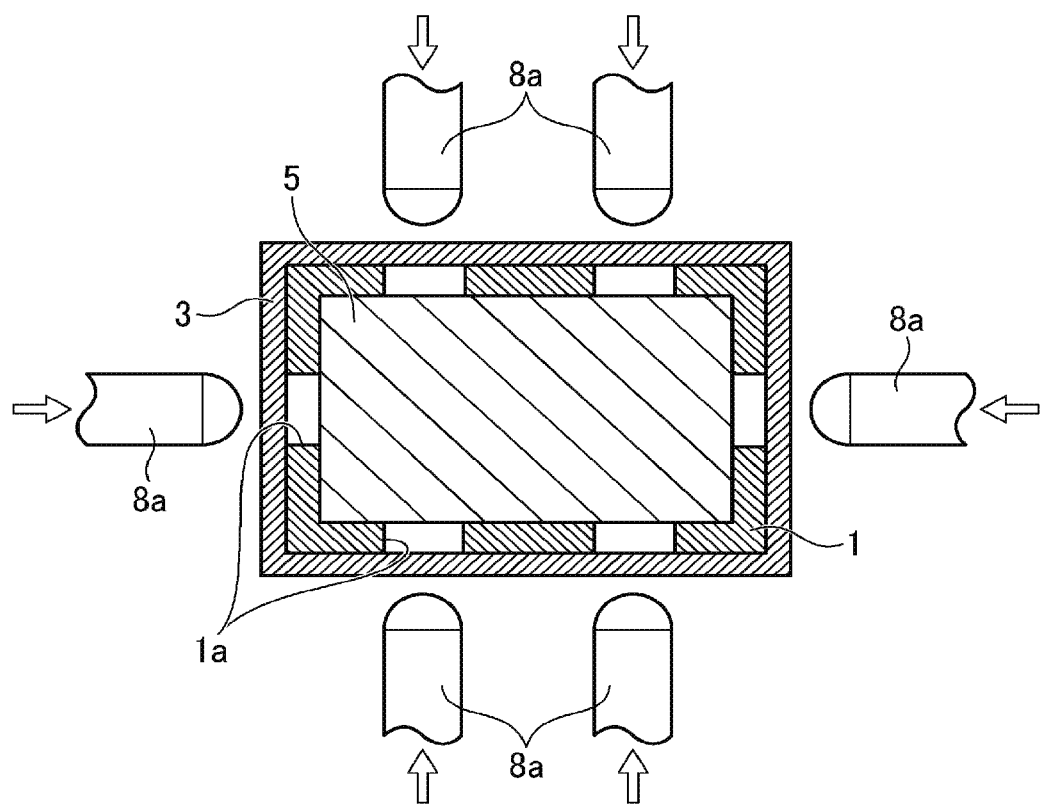
FIG. 6E is a horizontal cross-sectional view showing a pipe, an auxiliary member, a core, and a plunger and showing a caulking and coupling step in the method for joining different materials and the method for manufacturing a tubular member equipped with an auxiliary member for joining different materials according to a fifth modification of the first embodiment.

In FIG. 6E, the pipe 1 is a polygonal tube member whose cross-sectional shape is a rectangular shape, the auxiliary member 3 is also a polygonal tube member whose cross-sectional shape is a rectangular shape, and the core 5 is a polygonal columnar member whose cross-sectional shape is a rectangular shape. The through hole 1a is formed in each side of the pipe 1, and in particular, two through holes 1a are formed in a long side.

In any one modification of FIGS. 6A to 6E described above, the auxiliary member 3 is firmly coupled to the pipe 1 by a pipe contraction processing of the pipe 1, and the auxiliary member 3 and the plate material 2 are joined by arc welding or the like.

An arrangement and the number of the plungers 8 are changed according to a cross-sectional shape of the pipe 1 or the auxiliary member 3, and a configuration of the pressurizing member 34 is appropriately designed according to the arrangement and the number of the plungers 8. For example, the pressurizing member 34 may be divided as long as the pressurizing member 34 can be caulked and coupled to the plunger 8.

As described above, the coupling device 30 for a device for coupling tubular members according to the present embodiment includes the base 31 for holding the pipe 1 and the auxiliary member 3 in a state in which the auxiliary member 3 is disposed around the pipe 1, a plurality of plungers 8 that are supported by the base 31 around the auxiliary member 3 in a manner in which the plungers 8 can move in the radial direction of the pipe 1 and the auxiliary member 3 and a tip end of each plunger 8 has the protruding portion 8*a*, the pressurizing member 34 that is brought into contact with an end part of the plunger 8 and that can pressurize the plunger 8 inward in the radial direction, and the pump 35 that drives the pressurizing member 34 so as to move relative to the base 31 in a direction perpendicular to the moving direction of the plunger 8. Then, the pump 35 drives the pressurizing member 34 to displace the plunger 8 inward in the radial direction, so that a part of the peripheral wall of the auxiliary member 3 is bulged inward in the radial direction by the protruding portion 8*a*, and the pump 1 and the auxiliary member 3 are caulked and coupled to each other. Accordingly, a plurality of fitting portions 3*a* can be formed all at once, and the tubular pipe 1 and the auxiliary member 3 can be easily and reliably coupled to each other at low costs, and can be applied to a wide range of fields.

Since the coupling device 30 further includes the columnar core 5 that can be disposed inside the pipe 1, the pipe 1 and the auxiliary member 3 can be stably held.

Further, since the coupling device 30 further includes the return rubber 33 that displaces the plurality of plungers 8 outward in the radial direction relative to the pipe 1 and the auxiliary member 3 that are caulked and coupled to each other, when the pump 35 drives the pressurizing member 34 in a direction opposite to a caulking and coupling direction, the protruding portion 8*a* of the plungers 8 can be separated from the fitting portion 3*a*, and the plunger 8 can be easily separated from the joined body 4.

The base 31 has a plurality of non-circular support holes 31*b* that respectively support the plurality of plungers 8 around the auxiliary member 3 in a manner in which the plungers 8 can move in the radial direction of the pipe 1 and the auxiliary member 3. The base 31 is formed into a cylindrical shape, and the pressurizing member 34 is formed into an annular shape in a manner of surrounding a periphery of the base 31 having a cylindrical shape, and the pressurizing member 34 has the inclined surface 34*a* that faces the inclined surface 8*b* at the end part of the plunger 8. Accordingly, the plurality of fitting portions 3*a* can be stably formed all at once with a compact configuration, and the pipe 1 and the auxiliary member 3 can be more reliably coupled to each other.

Further, according to the method for joining different materials using the coupling device 30 according to the present embodiment, the tubular pipe 1 is made of an aluminum alloy or a magnesium alloy, and the flat plate material 2 is made of steel. In this case, the method for joining different materials includes a step of setting the pipe 1 and the auxiliary member 3 on the base 31 so that the tubular auxiliary member 3 made of steel is disposed around a portion of the pipe 1 where the plurality of through holes 1*a* are formed, a step of caulking and coupling the pipe 1 and the auxiliary member 3 to each other by displacing the plunger 8 inward in the radial direction toward the peripheral wall of the auxiliary member 3 that faces the plurality of through holes 1*a* formed in the pipe 1 so as to cause a part of the peripheral wall of the auxiliary member 3 to bulge inward in the radial direction and fit into the through hole 1*a*, a step of detaching the pipe 1 and the auxiliary member 3 that are caulked and coupled to each other from the base 31, and a step of joining the pipe 1 and the plate material 2 via the auxiliary member 3 by welding the auxiliary member 3 and the plate material 2. Accordingly, the tubular auxiliary member 3 is firmly coupled to the tubular pipe 1, and the auxiliary member 3 and the plate material 2 are joined by welding, so that the pipe 1 and the plate material 2 that are made of different materials can be joined indirectly via the auxiliary member 3.

When the tubular pipe 1 and the auxiliary member 3 are coupled in advance, the auxiliary member 3 and the plate material 2 can be easily joined to each other using a general welding method.

Therefore, in the present embodiment, the pipe 1 and the plate material 2 that are made of different materials can be joined easily and reliably at low costs, and can be applied to a wide range of fields.

In a method for manufacturing a tubular member equipped with an auxiliary member for joining different materials using the coupling device 30 according to the present embodiment, the tubular pipe 1 made of an aluminum alloy or a magnesium alloy and the tubular auxiliary member 3 that is made of steel and is disposed around the pipe 1 are provided. The manufacturing method includes a step of setting the pipe 1 and the auxiliary member 3 on the base 31 so that the tubular auxiliary member 3 is disposed around a portion of the pipe 1 where the plurality of through holes 1*a* are formed, a step of caulking and coupling the pipe 1 and the auxiliary member 3 to each other by displacing the plunger 8 inward in the radial direction toward the peripheral wall of the auxiliary member 3 that faces the plurality of through holes 1*a* formed in the pipe 1 so as to cause a part of the peripheral wall of the auxiliary member 3 to bulge inward in the radial direction and fit into the through hole 1*a*, and a step of detaching the pipe 1 and the auxiliary member 3 that are caulked and coupled to each other from the base 31.

Accordingly, since the tubular auxiliary member 3 is firmly coupled to the pipe 1, the pipe 1 and the plate material 2 that is made of a material different from a material of the pipe 1 can be indirectly joined to each other via the auxiliary member 3.

Therefore, in the present embodiment, the pipe 1 and the plate material 2 that are made of different materials can be joined easily and reliably at low costs, and can be applied to a wide range of fields.

When the pipe 1 and the auxiliary member 3 are stably supported by the base 1 at the time of caulking and coupling, the coupling device 30 may not have a core.

Figure 7A:
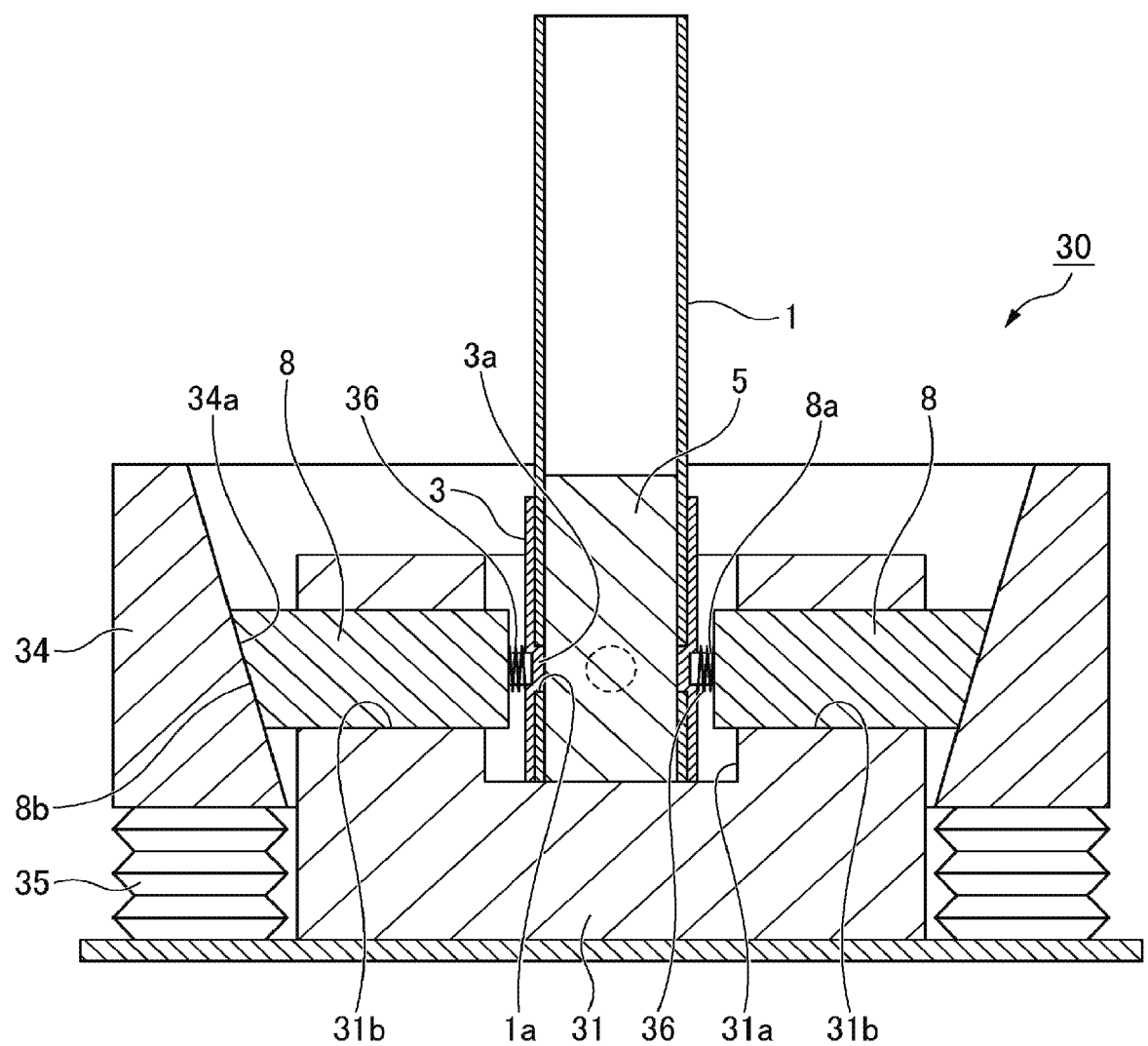
FIG. 7A is a cross-sectional view showing a caulking and coupling state in which a return spring is used as a mechanism for returning pressing members according to a first modification of the coupling device of the first embodiment.
Figure 7B:
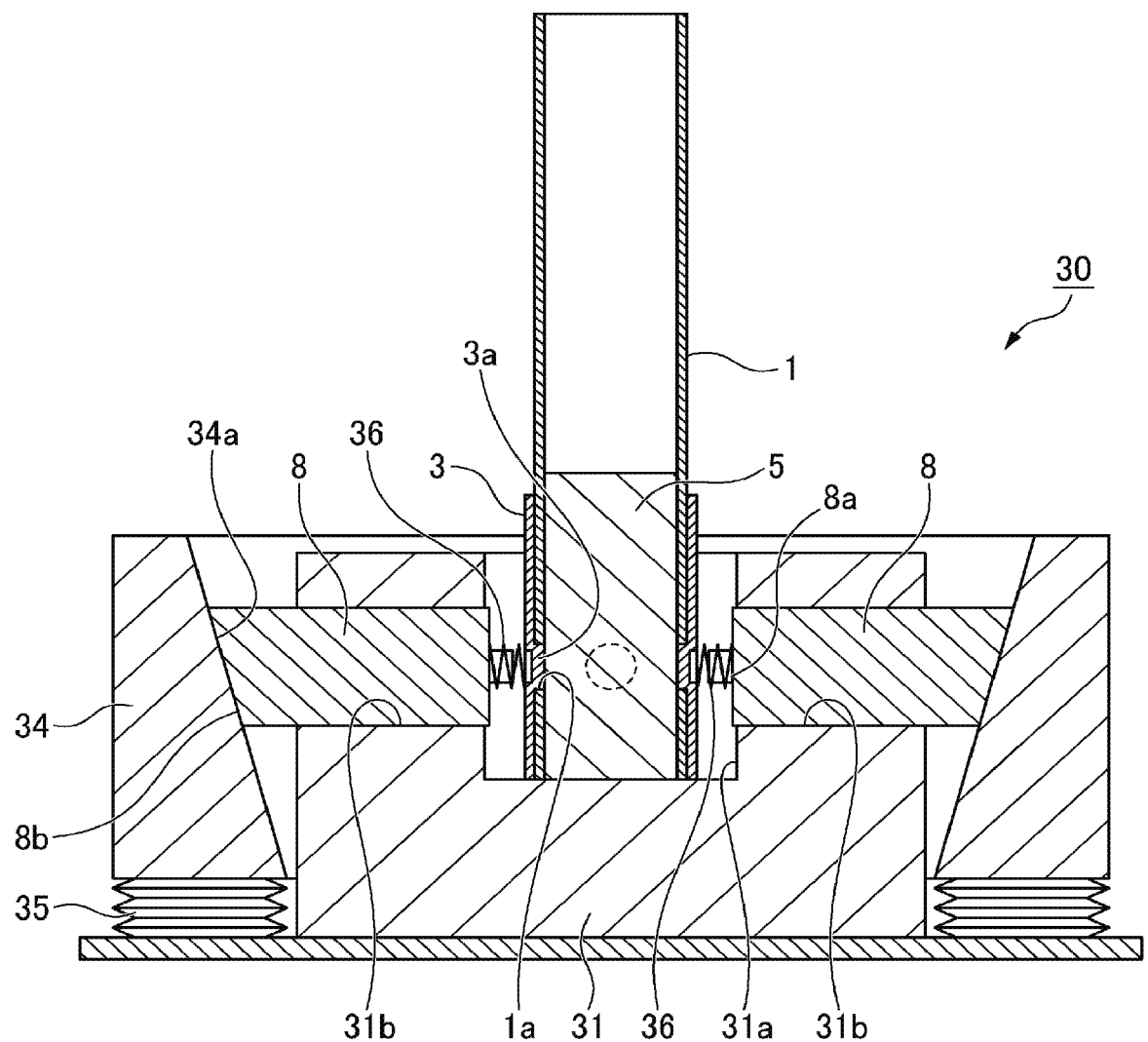
FIG. 7B is a cross-sectional view showing a state in which a return spring is used as a mechanism for returning pressing members, the plunger is returned, and caulking and coupling are completed according to the first modification of the coupling device of the first embodiment.
Figure 8A:
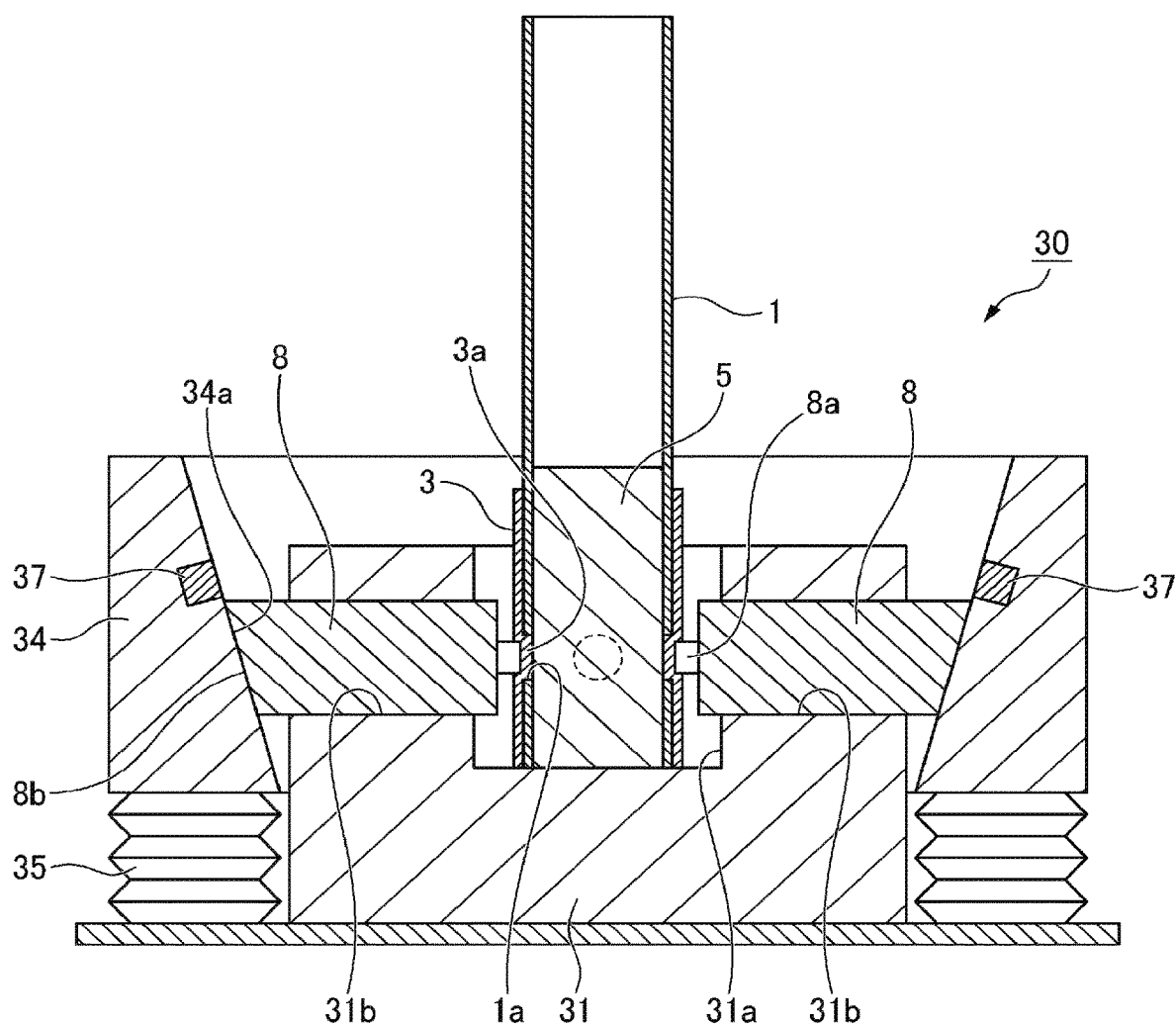
FIG. 8A is a cross-sectional view showing a caulking and coupling state in which a magnet is used as a mechanism for returning pressing members according to a second modification of the coupling device of the first embodiment.
Figure 8B:
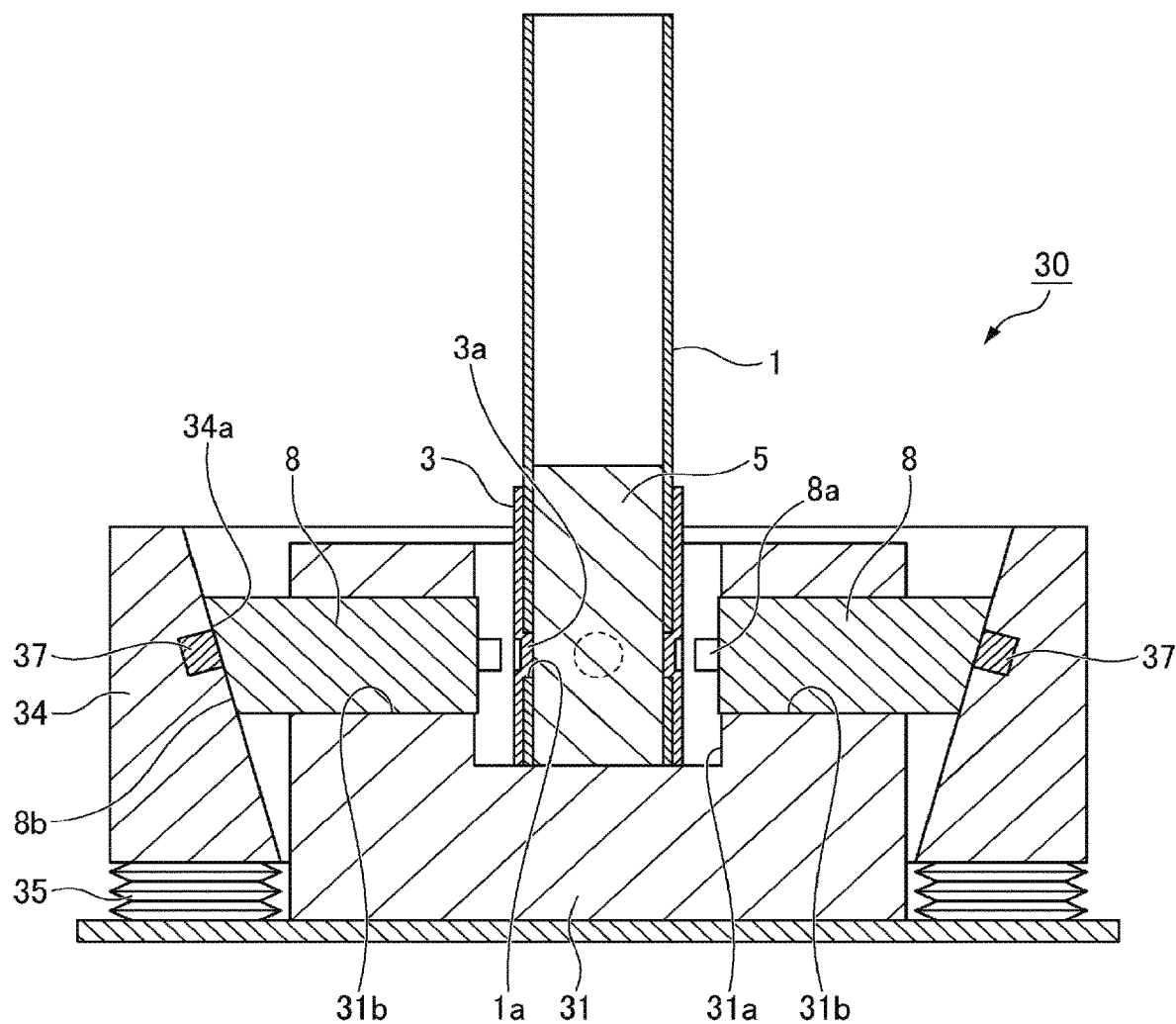
FIG. 8B is a cross-sectional view showing a state in which a magnet is used as a mechanism for returning pressing members, the plunger is returned, and caulking and coupling are completed according to the second modification of the coupling device of the first embodiment.

In the coupling device 30, instead of the return rubber 33, a return spring 36 may be attached to a tip end of the plunger 8 as a mechanism for returning pressing members, as shown in FIGS. 7A and 7B. Alternatively, a magnet 37 may be provided as the mechanism for returning pressing members in a manner of facing the inclined surface 34*a* of the pressurizing member 34, as shown in FIGS. 8A and 8B. In this case, the magnet 37 is disposed at a position where the plunger 8 can be attracted when the pressurizing member 34 moves in a direction opposite to a caulking direction (here, when the pressurizing member 34 moves downward).

Figure 9A:
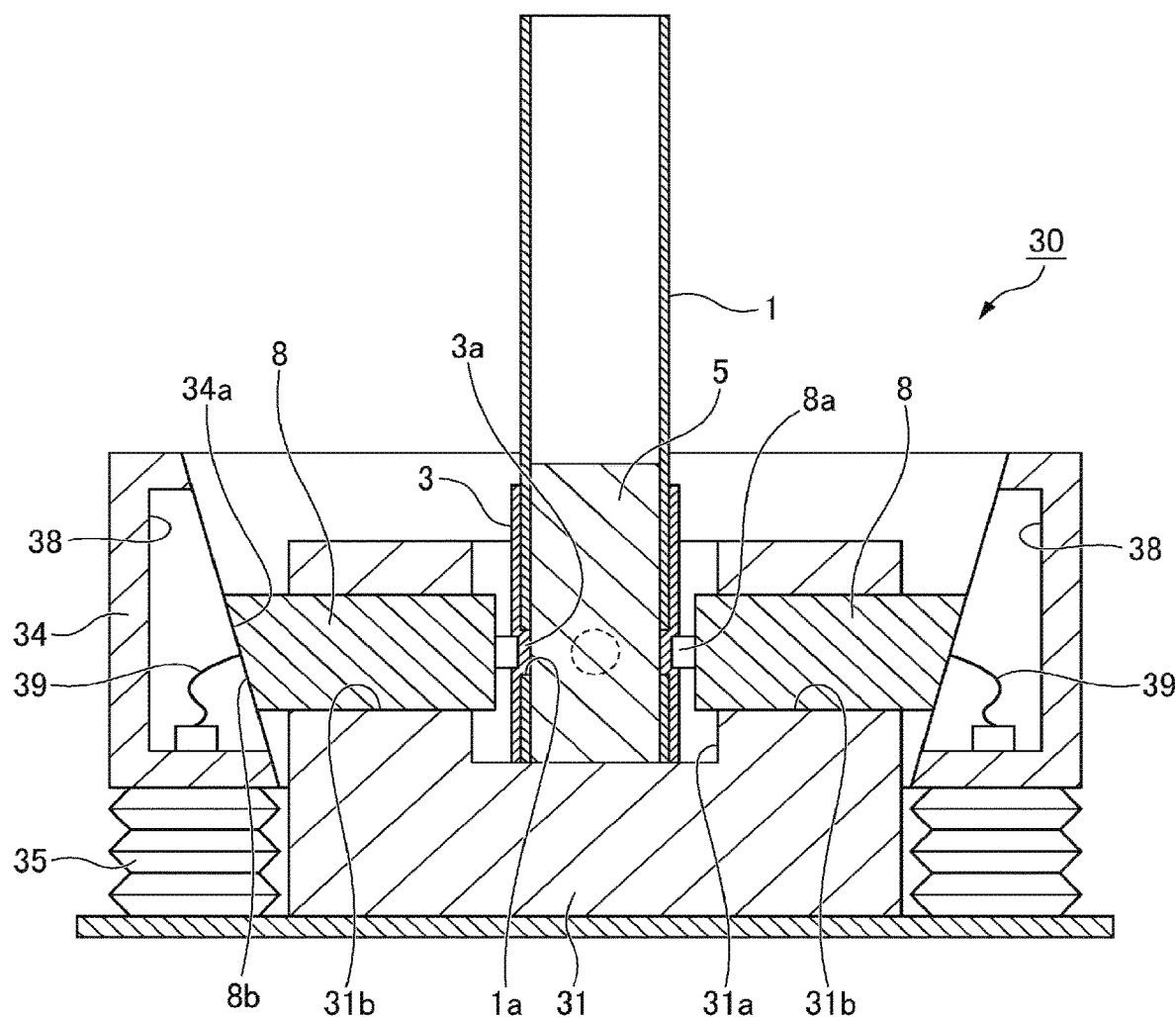
FIG. 9A is a cross-sectional view showing a caulking and coupling state in which a coupling member is used as a mechanism for returning pressing members according to a third modification of the coupling device of the first embodiment.
Figure 9B:
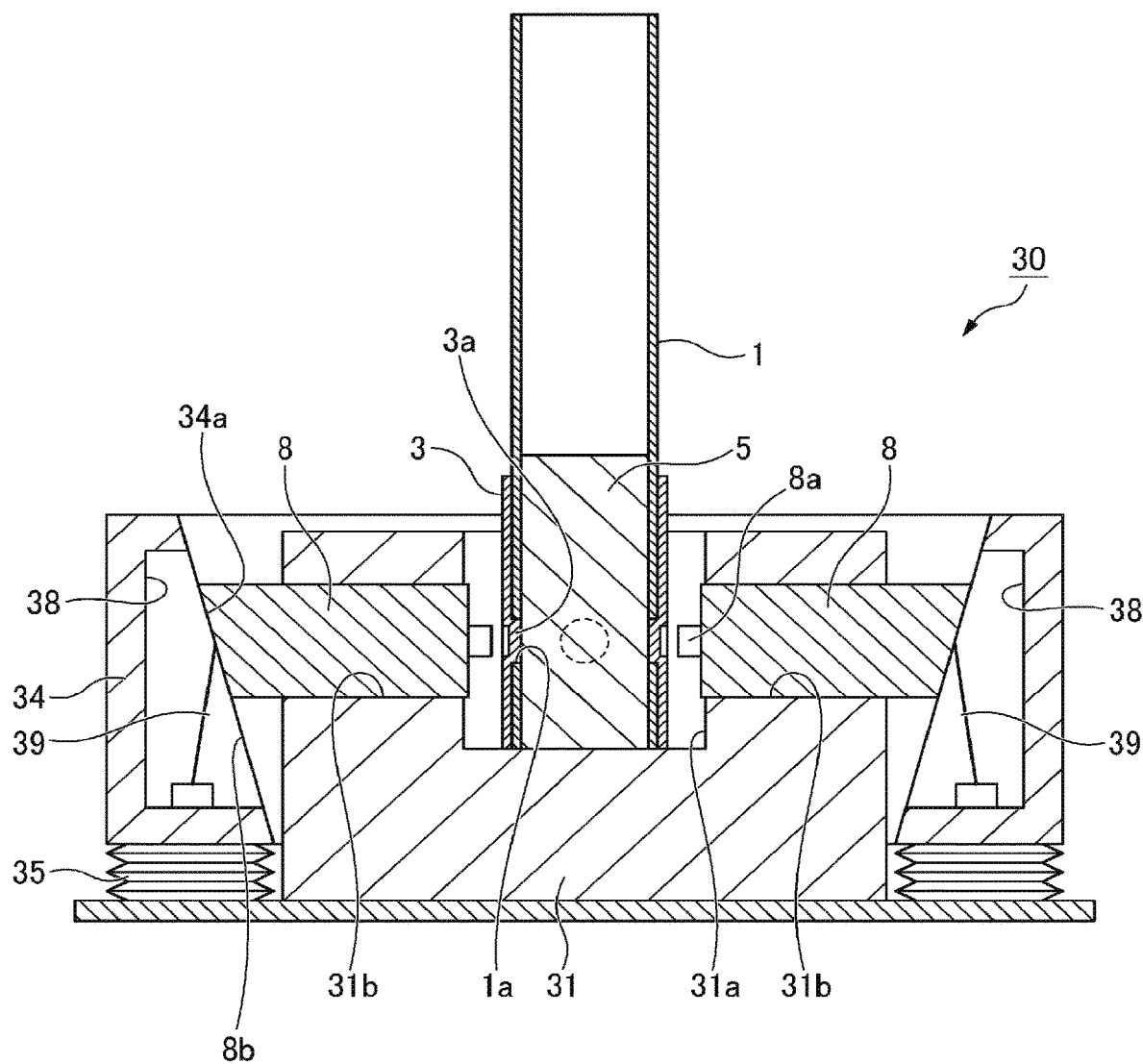
FIG. 9B is a cross-sectional view showing a state in which a coupling member is used as a mechanism for returning pressing members, the plunger is returned, and caulking and coupling are completed according to the third modification of the coupling device of the first embodiment.

As shown in FIGS. 9A and 9B, the mechanism for returning pressing members may be a coupling member 39 such as a string or a chain that is provided in each of a plurality of slits 38 of the pressurizing member 34 that are formed in the same phase as the plungers 8 and couples the plunger 8 and the pressurizing member 34. In this case as well, a length of the coupling member 39 is set so as to pull the plunger 8 toward the pressurizing member when the pressurizing member 34 moves in a direction opposite to the caulking direction.

Figure 10A:
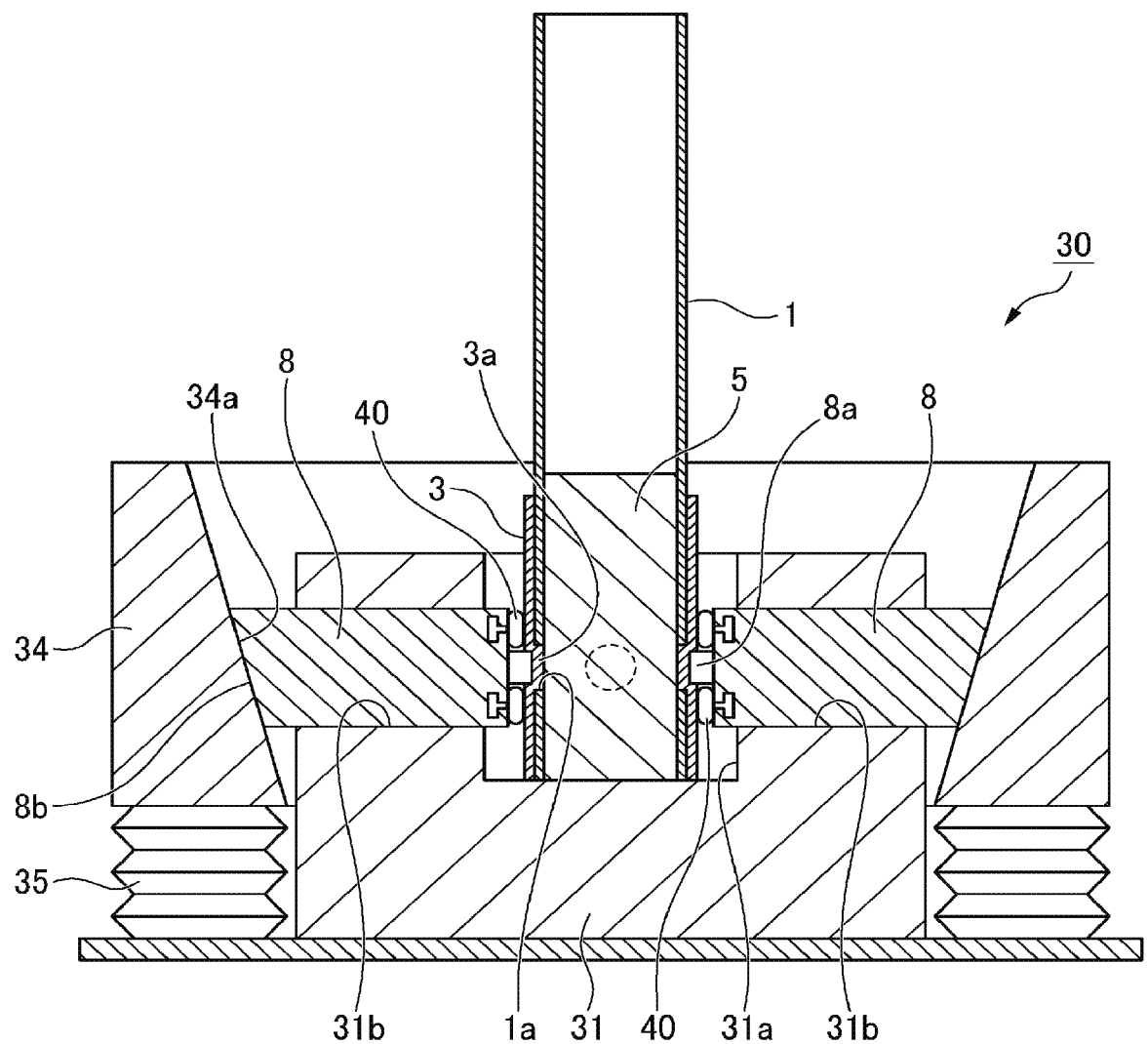
FIG. 10A is a cross-sectional view showing a caulking and coupling state in which an air suspension is used as a mechanism for returning pressing members according to a fourth modification of the coupling device of the first embodiment.
Figure 10B:
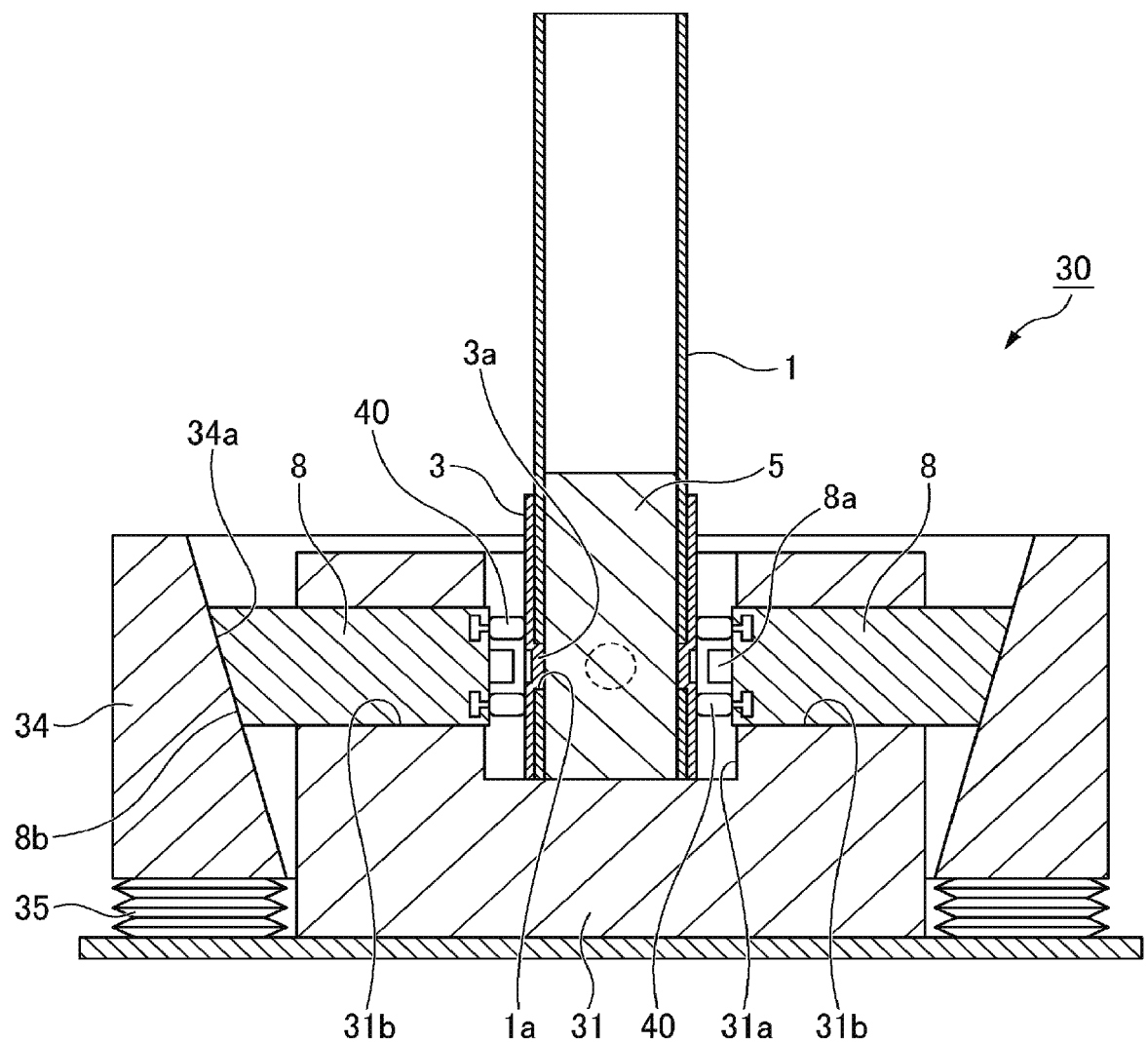
FIG. 10B is a cross-sectional view showing a state in which an air suspension is used as a mechanism for returning pressing members, the plunger is returned, and caulking and coupling are completed according to the fourth modification of the coupling device of the first embodiment.

Further, an air suspension 40 may be provided as the mechanism for returning pressing members and attached to the tip end of the plunger 8 as shown in FIGS. 10A and 10B.

Although the pump 35 is used as a drive mechanism in the embodiment described above, the pump 35 may be any one of an electric pump, a hydraulic pump, and a pneumatic pump, and may be another drive mechanism.

Further, the drive mechanism drives the pressurizing member 34 in the vertical direction relative to the base 31 in the embodiment described above, the present invention is not limited thereto, and the base 31 may be driven in the vertical direction relative to the pressurizing member 34.

Although a configuration is described in the embodiment described above in which the drive mechanism drives the pressurizing member 34, so that the plurality of fitting portions 3a can be formed all at once by the plurality of plungers 8, the plurality of plungers 8 may be driven in multiple stages by using a plurality of driving mechanisms and pressurizing devices so as to form the plurality of fitting portions 3a in multiple stages.

Figure 11A:
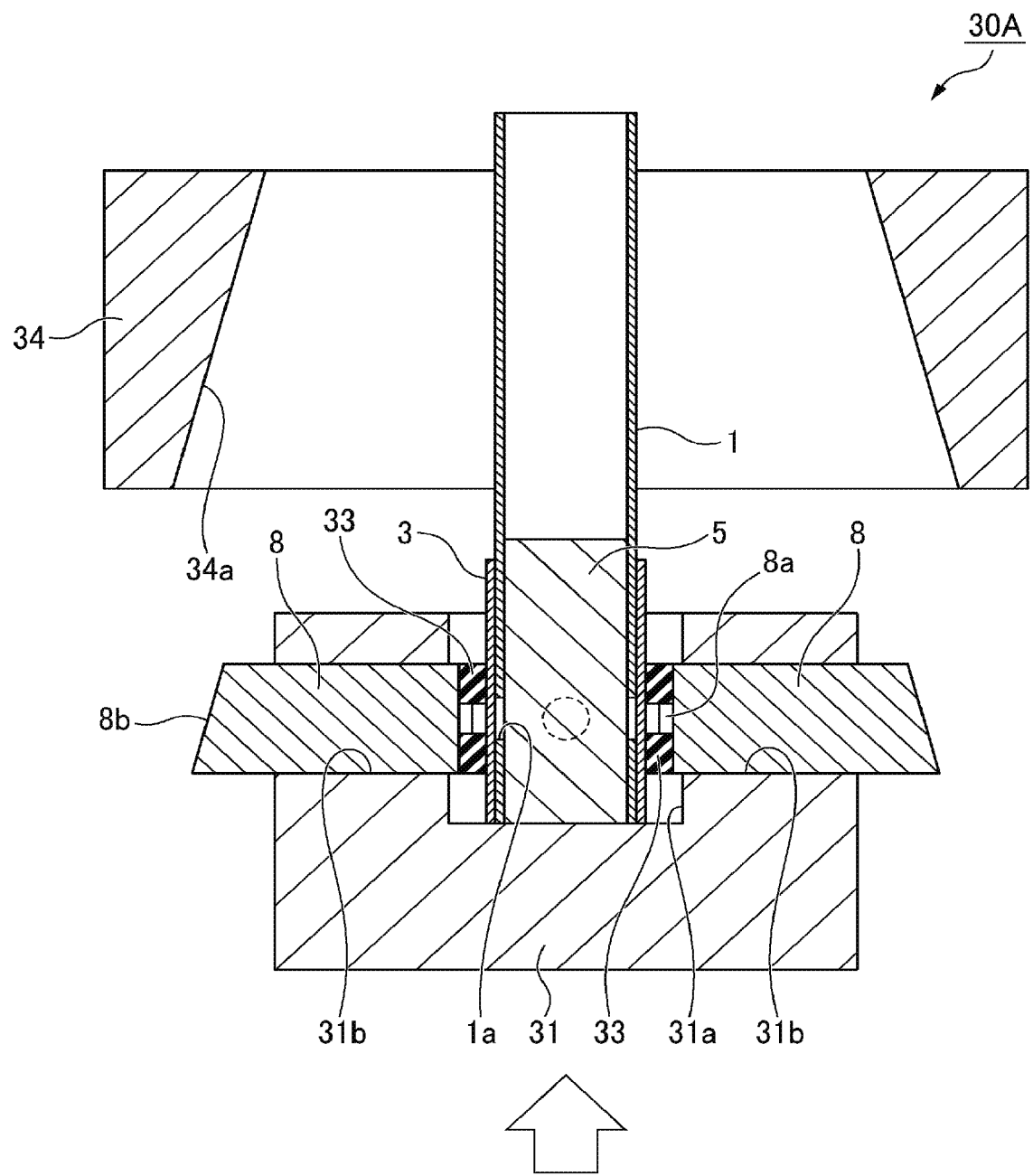
FIG. 11A is a cross-sectional view showing a state in which a pipe and an auxiliary member are mounted on a base according to a fifth modification of the coupling device of the first embodiment.

For example, as shown in FIG. 11A, the base 31 can be driven in the vertical direction by a drive mechanism (not shown) in the coupling device 30A. The inclined surface 34a of the pressurizing member 34 and the inclined surface 8b of the plunger 8 are formed in a manner of coming close to the central axis toward the upper side in contrary to those described in the embodiment described above.

Figure 11B:
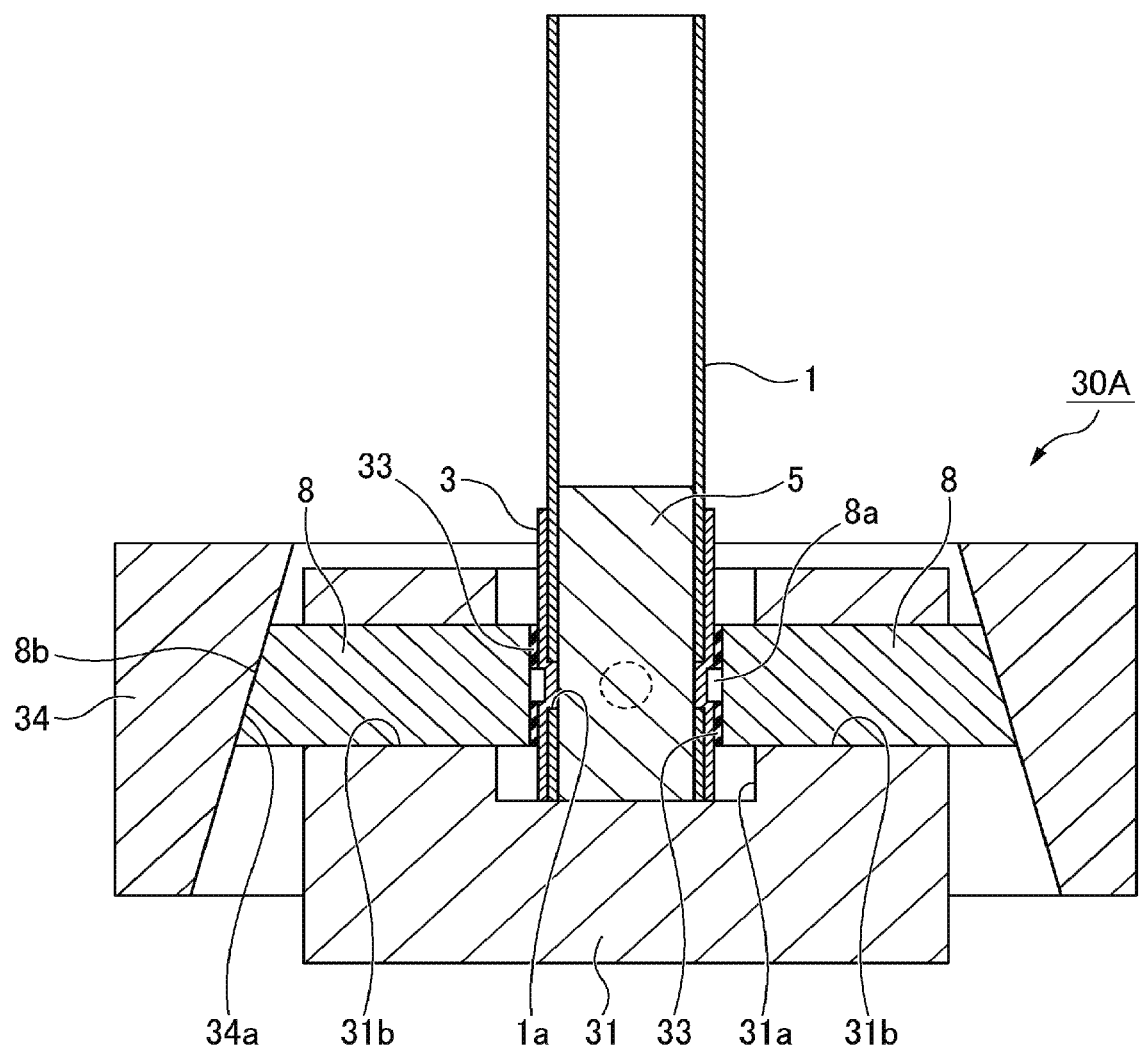
FIG. 11B is a cross-sectional view showing a caulking and coupling step according to the fifth modification of the coupling device of the first embodiment.

As shown in FIG. 11B, the drive mechanism drives the base 31 upward so as to displace the plurality of plungers 8 inward in the radial direction toward the peripheral wall of the auxiliary member 3 that faces the plurality of through holes 1a of the pipe 1. Accordingly, a part of the peripheral wall of the auxiliary member 3 is bulged inward in the radial direction by the protruding portion 8a of the plunger 8 and is fitted into the through hole 1a to form the fitting portion 3a, and the pipe 1 and the auxiliary member 3 are caulked and coupled to each other.

Second Embodiment

Next, a method for joining different materials according to a second embodiment of the present invention will be described with reference to FIGS. 12 to 15E. The description of the same or equivalent parts as those of the first embodiment will be omitted or simplified.

Figure 12:
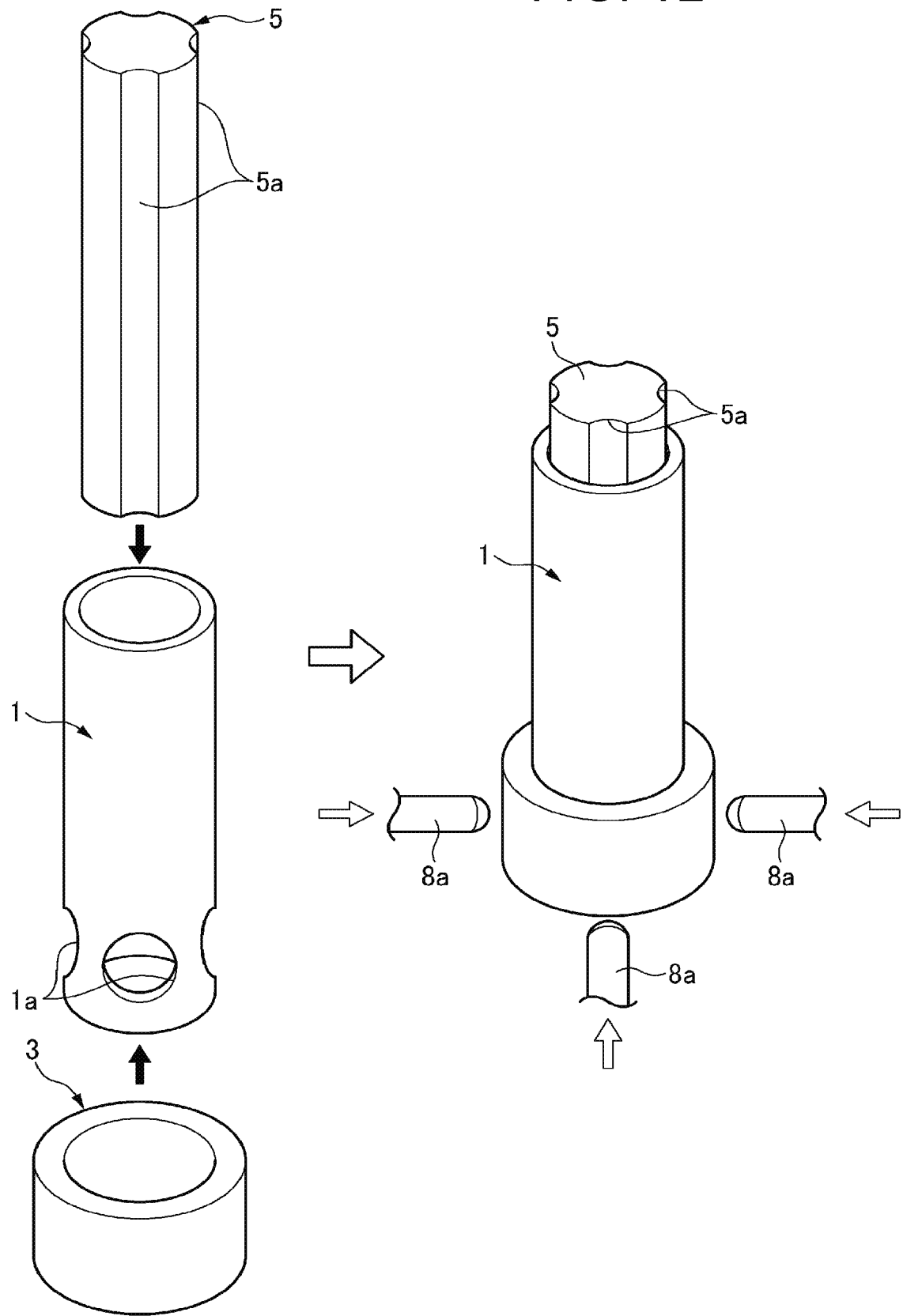
FIG. 12 is a perspective view showing a core arrangement step and a caulking and coupling step in a method for joining different materials and a method for manufacturing a tubular member equipped with an auxiliary member for joining different materials according to a second embodiment of the present invention.
Figure 13:
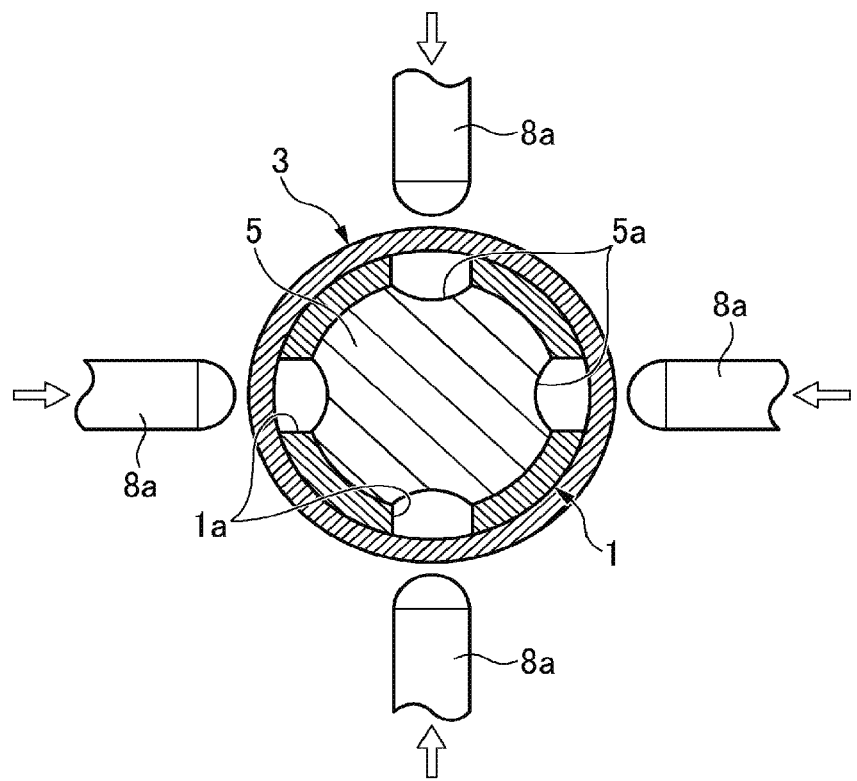
FIG. 13 is a horizontal cross-sectional view showing a pipe, an auxiliary member, a core, and a plunger and showing the caulking and coupling step in the method for joining different materials and the method for manufacturing a tubular member equipped with an auxiliary member for joining different materials according to the second embodiment.

In the second embodiment, the core 5 has a plurality of (four in the present embodiment) groove portions 5a extending along the axial direction at respective phases corresponding to the plurality of through holes 1a of the pipe 1, as shown in FIGS. 12 and 13. Therefore, in the present embodiment, the core 5 is attached to the base 31 such that phases of the plurality of groove portions 5a and phases of the protruding portions 8a of the plungers 8 coincide with each other, and the pipe 1 is set in the recessed portion 31a of the base 31 such that the phases of the plurality of groove portions 5a and phases of the plurality of through holes 1a of the pipe 1 coincide with each other.

The coupling device according to the present embodiment has the same configuration as the coupling device according to the first embodiment except for the core 5.

Figure 14:
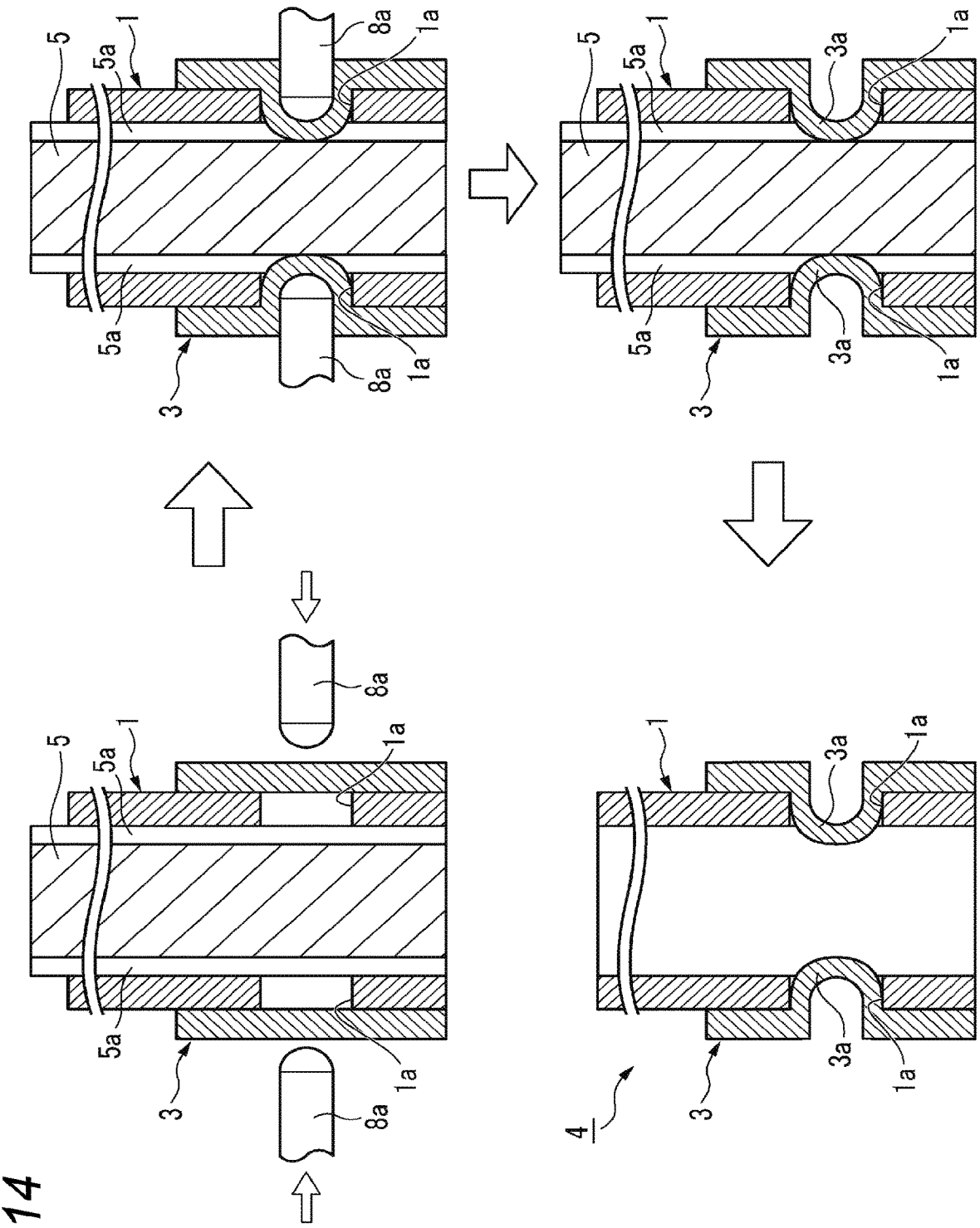
FIG. 14 is a vertical cross-sectional view showing a pipe, an auxiliary member, a core, and a plunger and showing the caulking and coupling step and a joined body detachment step in the method for joining different materials and the method for manufacturing a tubular member equipped with an auxiliary member for joining different materials according to the second embodiment.
Figure 15A:
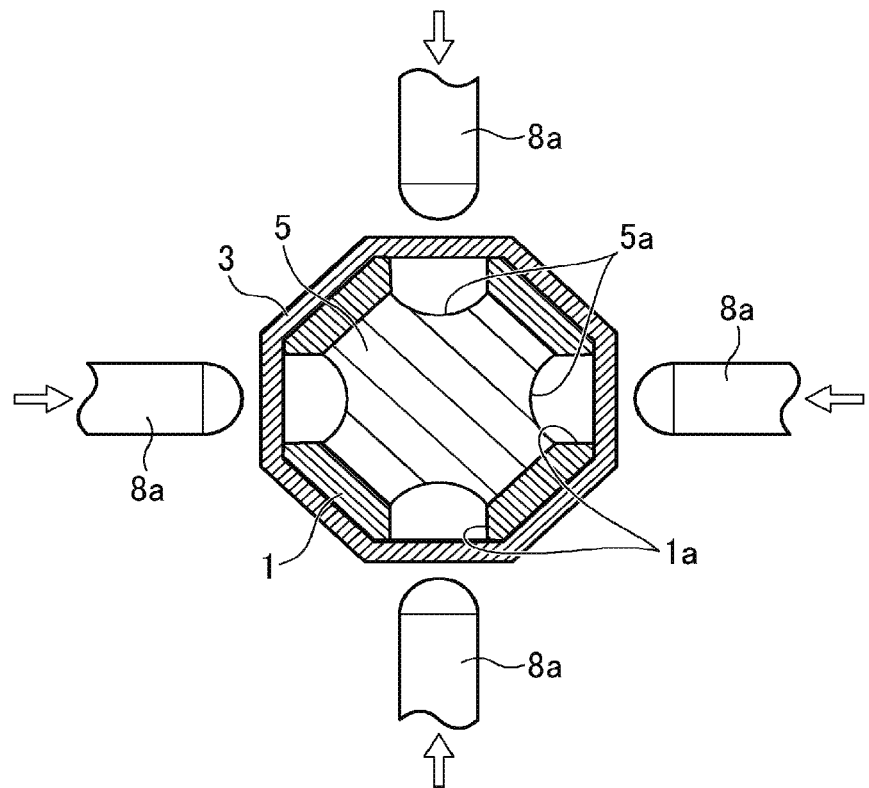
FIG. 15A is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a first modification of the second embodiment.
Figure 15B:
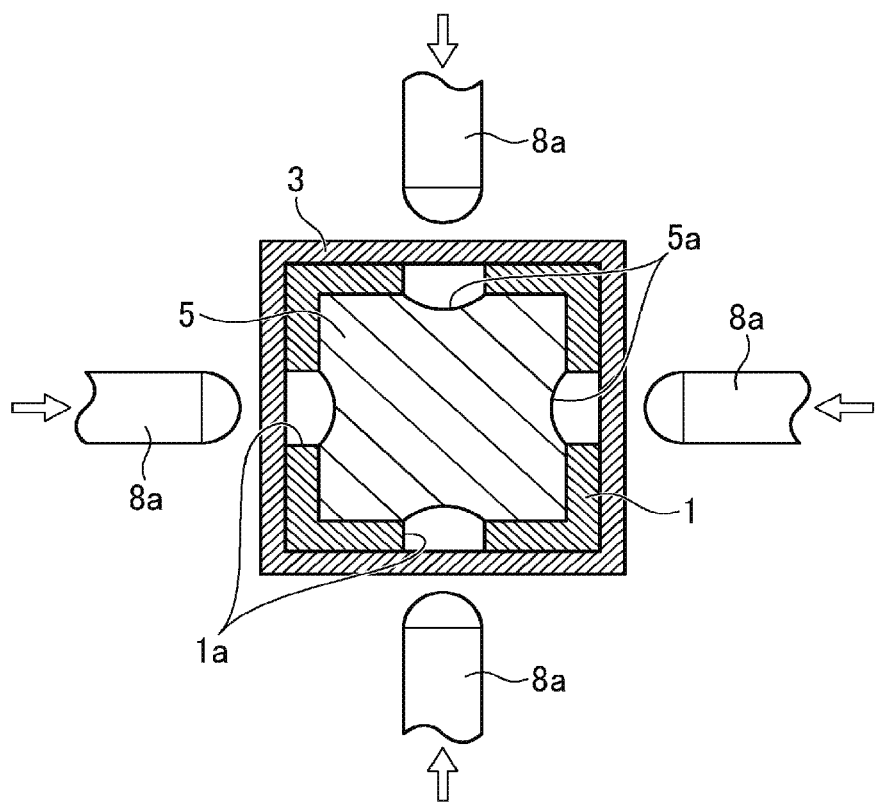
FIG. 15B is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a second modification of the second embodiment.
Figure 15C:
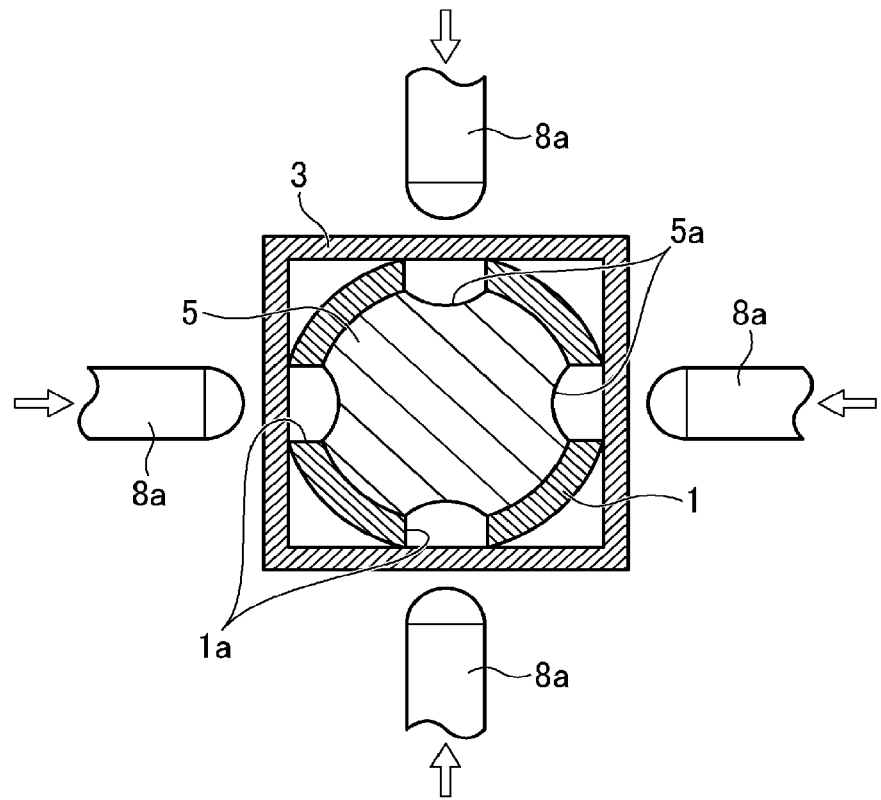
FIG. 15C is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a third modification of the second embodiment.
Figure 15D:
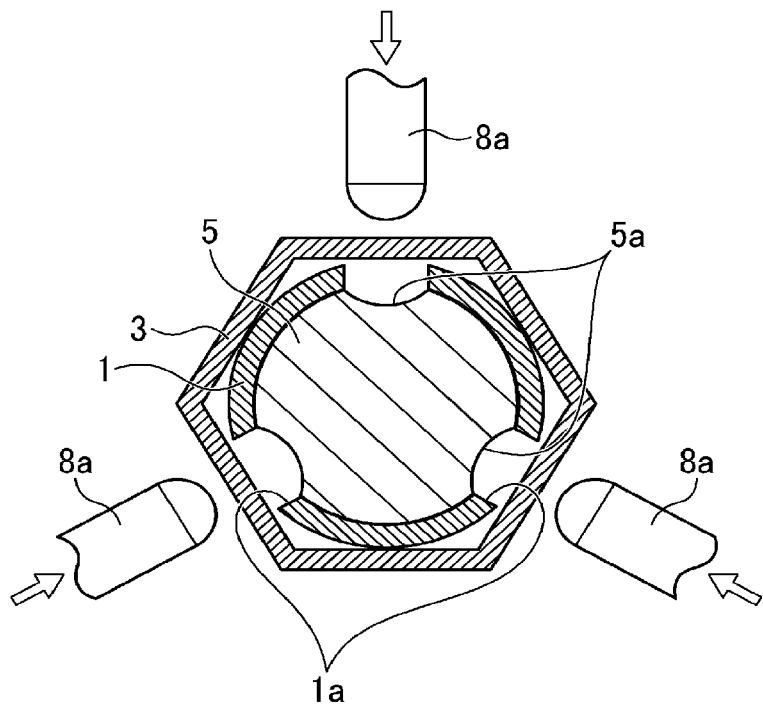
FIG. 15D is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a fourth modification of the second embodiment.
Figure 15E:
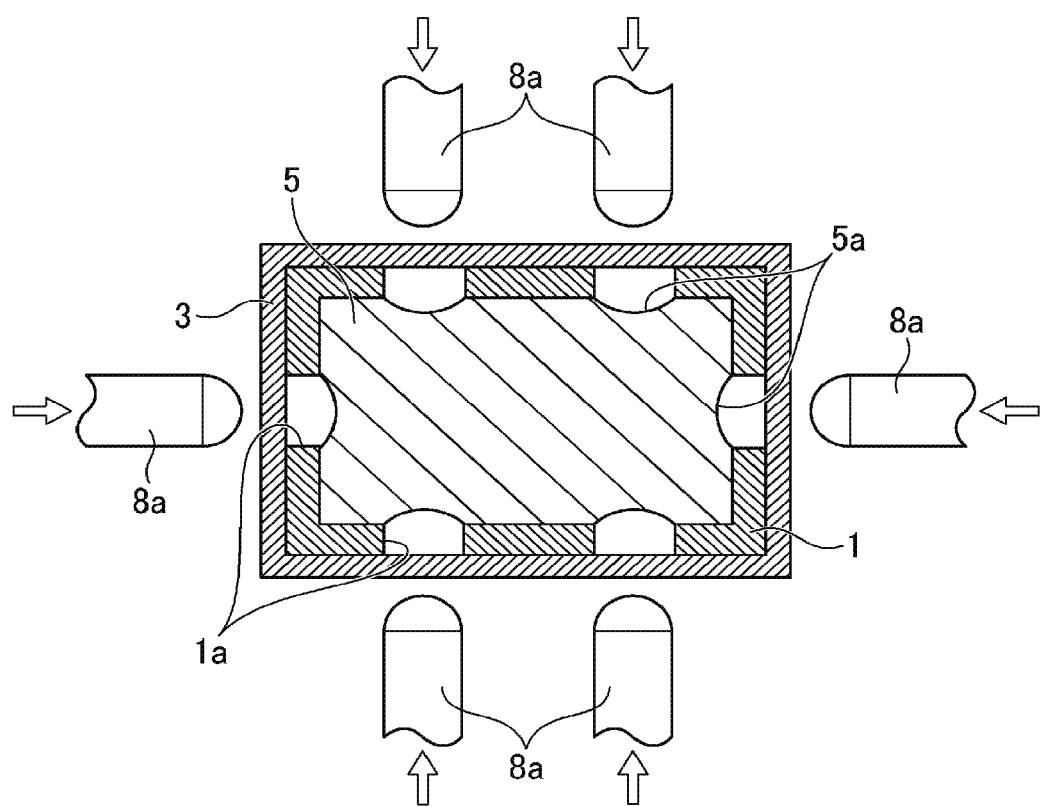
FIG. 15E is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a fifth modification of the second embodiment.

Accordingly, as shown in FIGS. 13 and 14, in the caulking and coupling step, the plunger 8 can be pushed inward in the radial direction more deeply, and a part of the peripheral wall of the auxiliary member 3 is fitted into the through holes 1a of the pipe 1 and the groove portions 5a of the core 5. That is, since the fitting portion 3a according to the present embodiment bulges inward in the radial direction from the inner peripheral surface of the pipe 1 and is formed deeper than that in the first embodiment, it is possible to obtain the joint 10 of different materials and the joined body 4 that have improved caulking strength.

In the present embodiment, even when the pipe 1 and the auxiliary member 3 that have the same cross-sectional shapes as those in FIGS. 6A to 6E in the first embodiment are combined as shown in FIGS. 15A to 15E, it is possible to obtain the joint 10 of different materials and the joined body 4 that have improved caulking strength by using the core 5 having the groove portions 5a.

Other configurations and functions are the same as those in the first embodiment.

Third Embodiment

Next, a method for joining different materials according to a third embodiment of the present invention will be described with reference to FIGS. 16 to 20E. The description of the same or equivalent parts as those of the first embodiment will be omitted or simplified.

Figure 16:
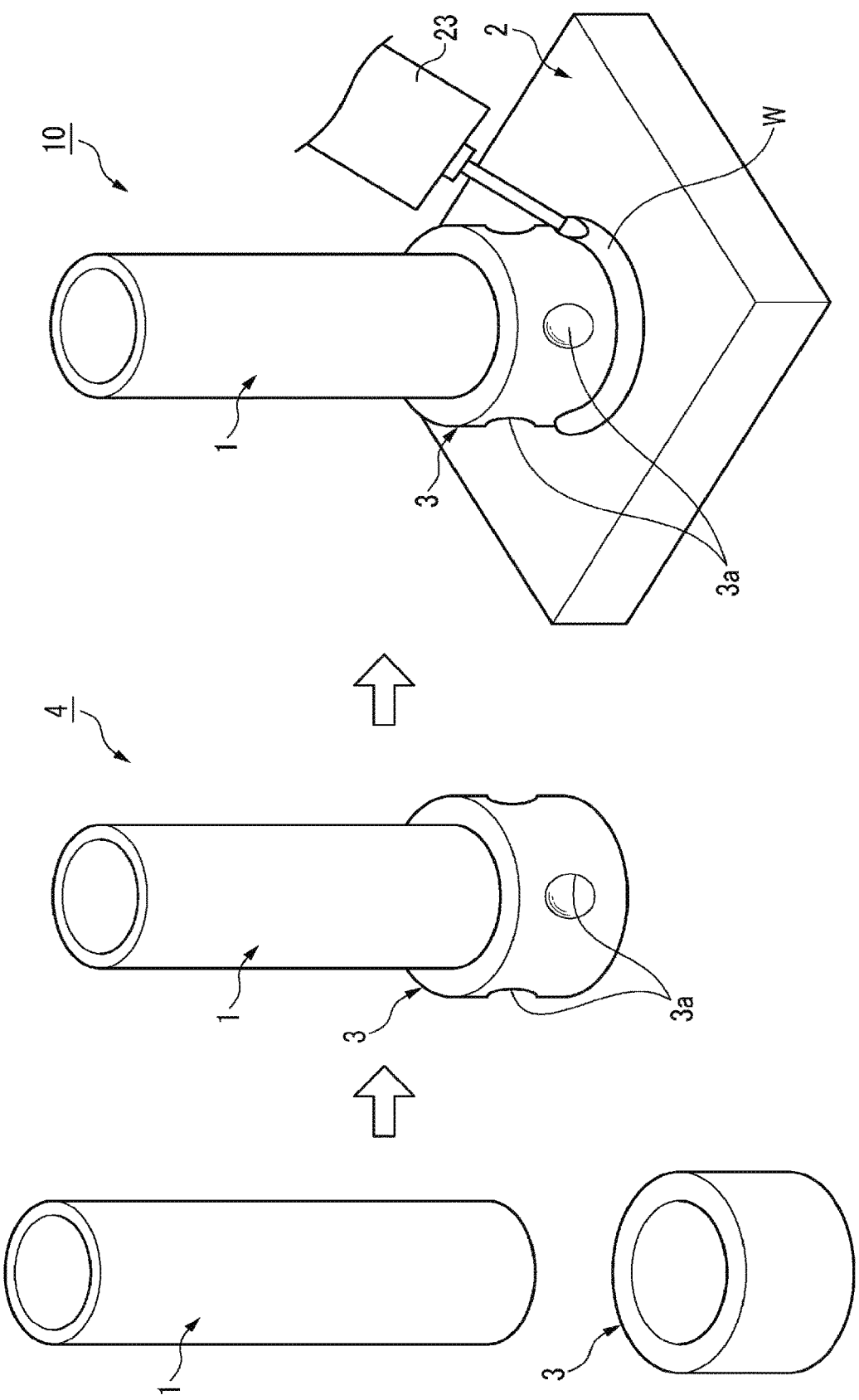
FIG. 16 is a perspective view showing steps of a method for joining different materials according to a third embodiment of the present invention.
Figure 17:
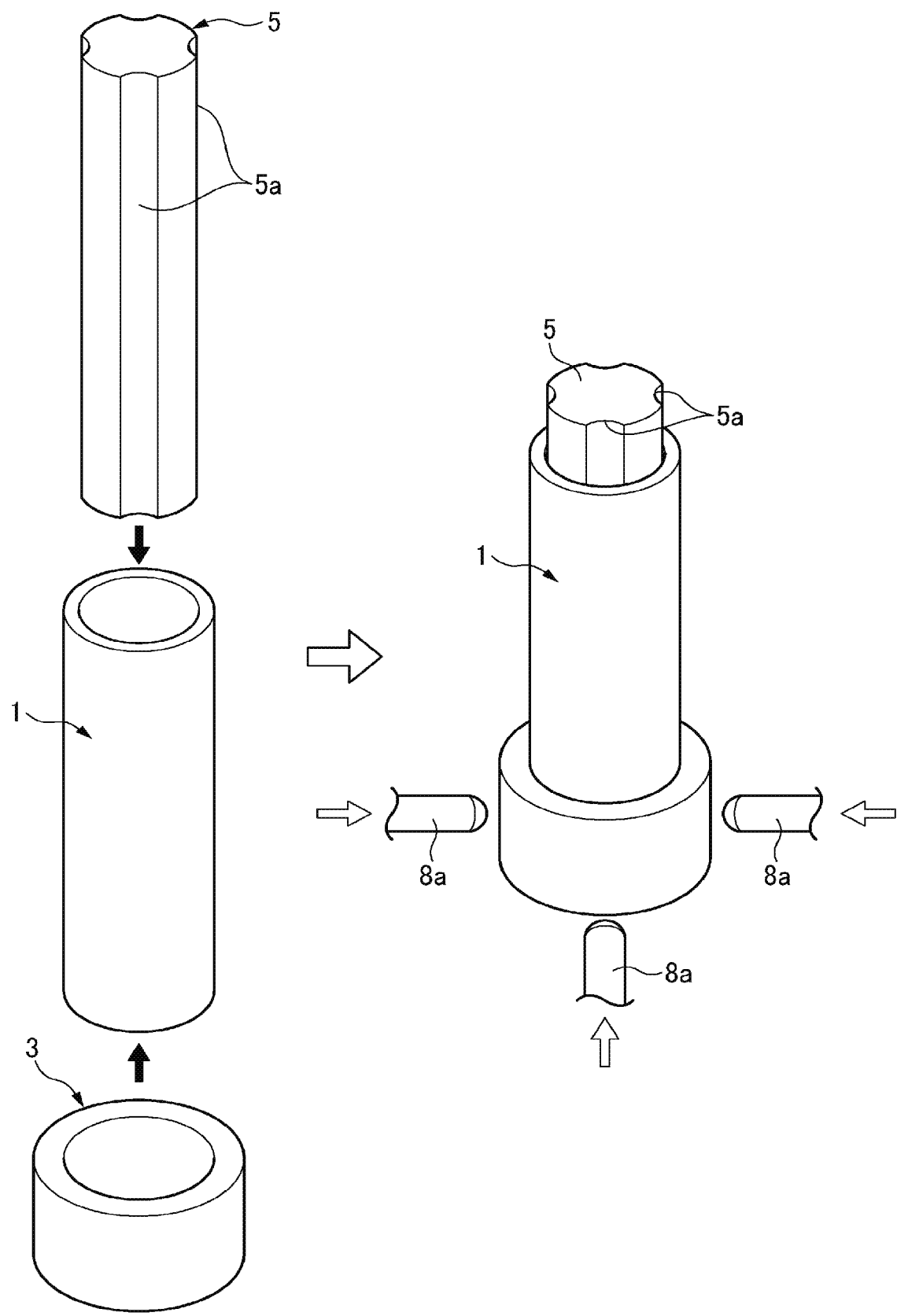
FIG. 17 is a perspective view showing a core arrangement step and a caulking and coupling step in a method for joining different materials and a method for manufacturing a tubular member equipped with an auxiliary member for joining different materials according to the third embodiment of the present invention.
Figure 18:
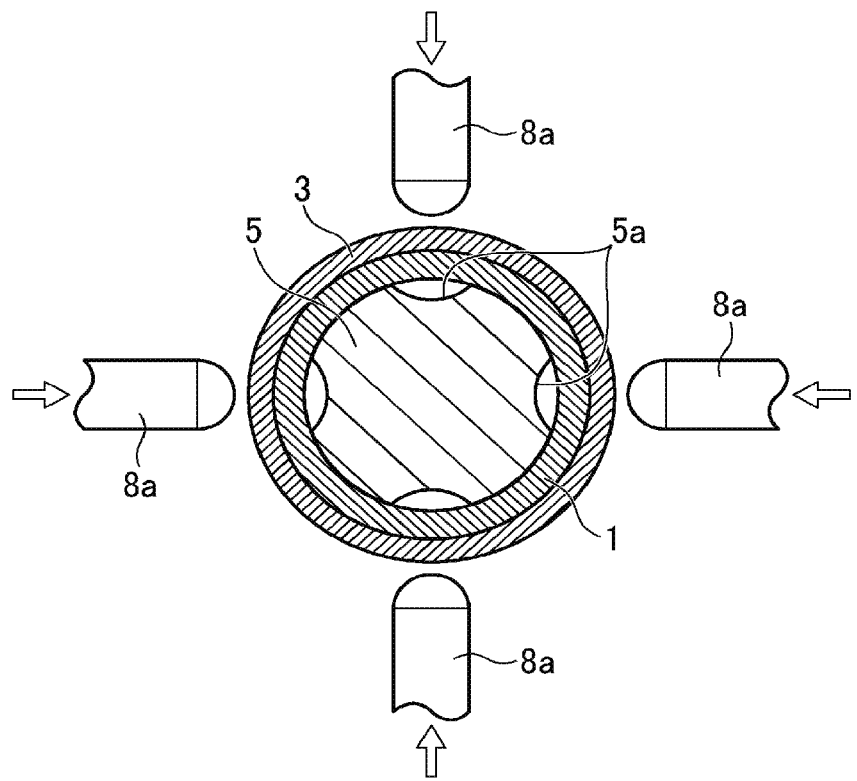
FIG. 18 is a horizontal cross-sectional view showing a pipe, an auxiliary member, a core, and a plunger and showing the caulking and coupling step in the method for joining different materials and the method for manufacturing a tubular member equipped with an auxiliary member for joining different materials according to the third embodiment.
Figure 19:
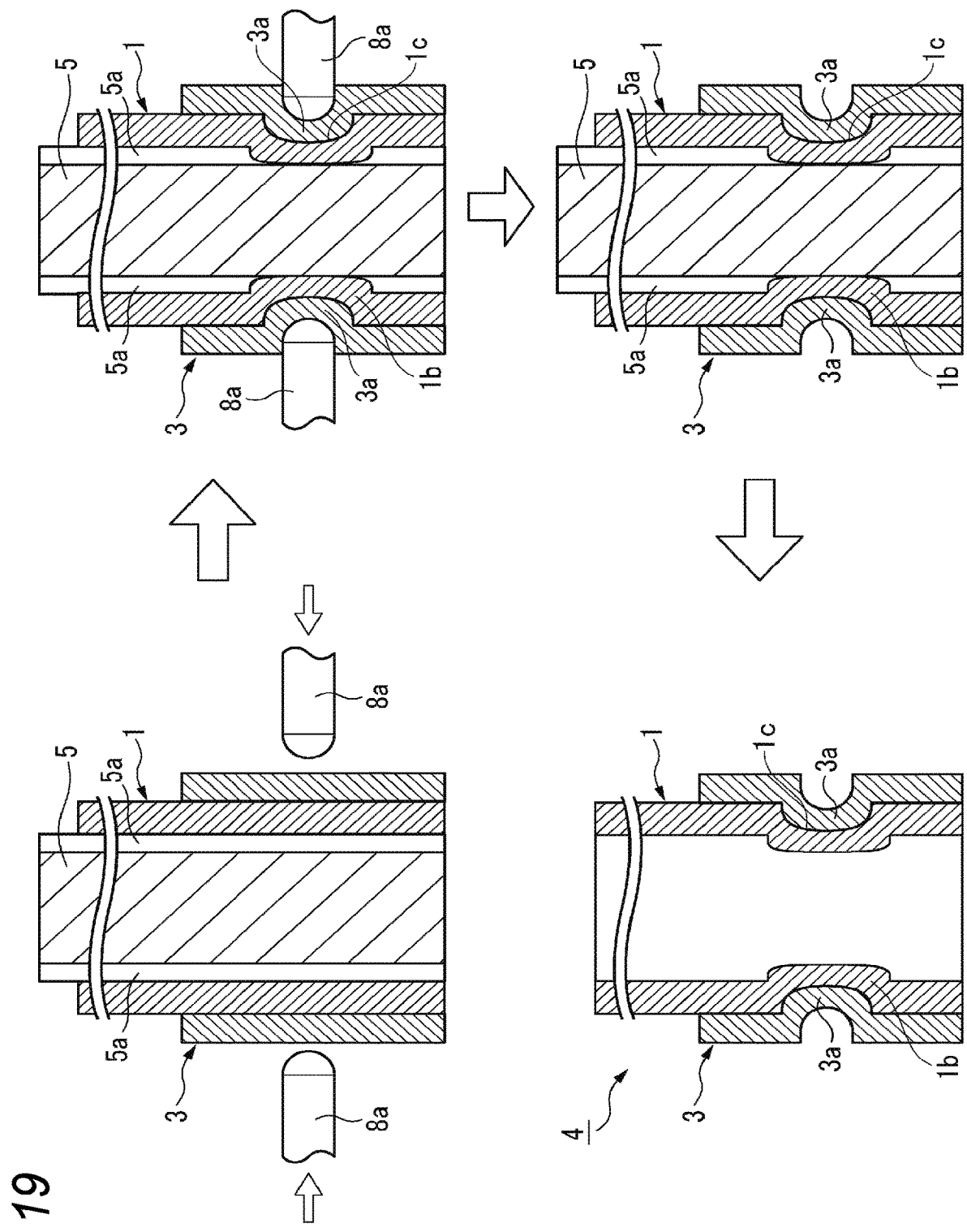
FIG. 19 is a vertical cross-sectional view showing a pipe, an auxiliary member, a core, and a plunger and showing the caulking and coupling step and a joined body detachment step in the method for joining different materials and the method for manufacturing a tubular member equipped with an auxiliary member for joining different materials according to the third embodiment.
Figure 20A:
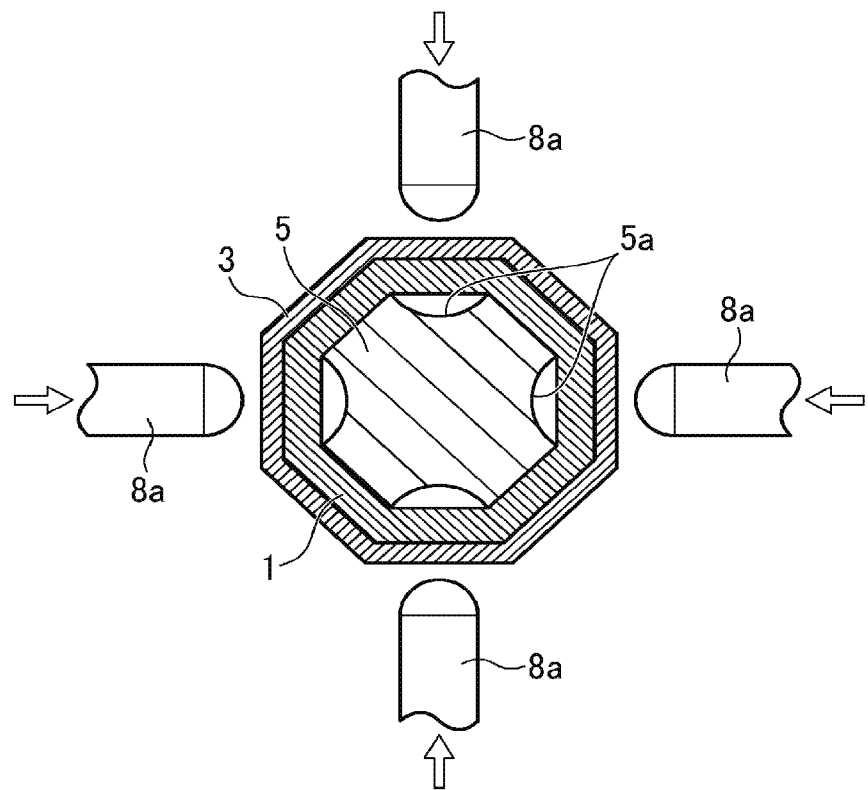
FIG. 20A is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a first modification of the third embodiment.
Figure 20B:
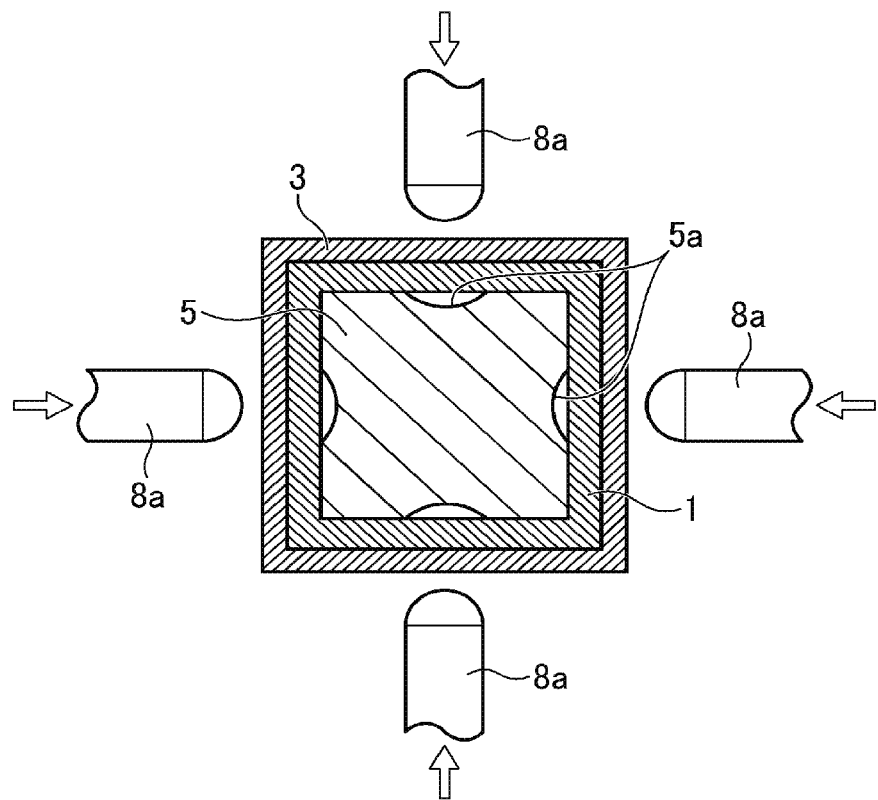
FIG. 20B is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a second modification of the third embodiment.
Figure 20C:
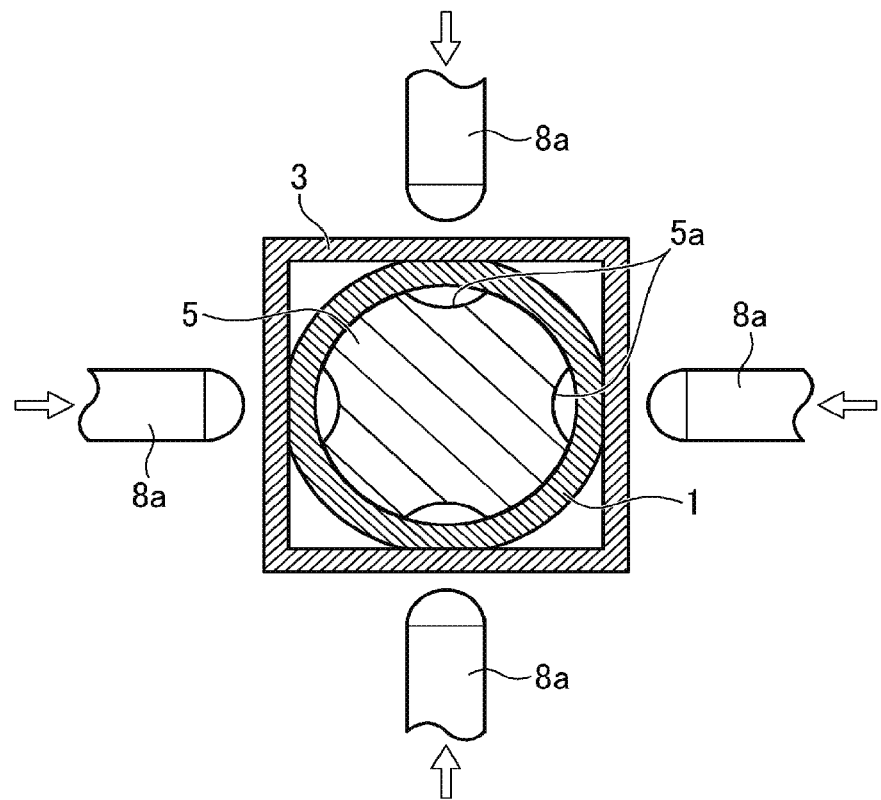
FIG. 20C is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a third modification of the third embodiment.
Figure 20D:
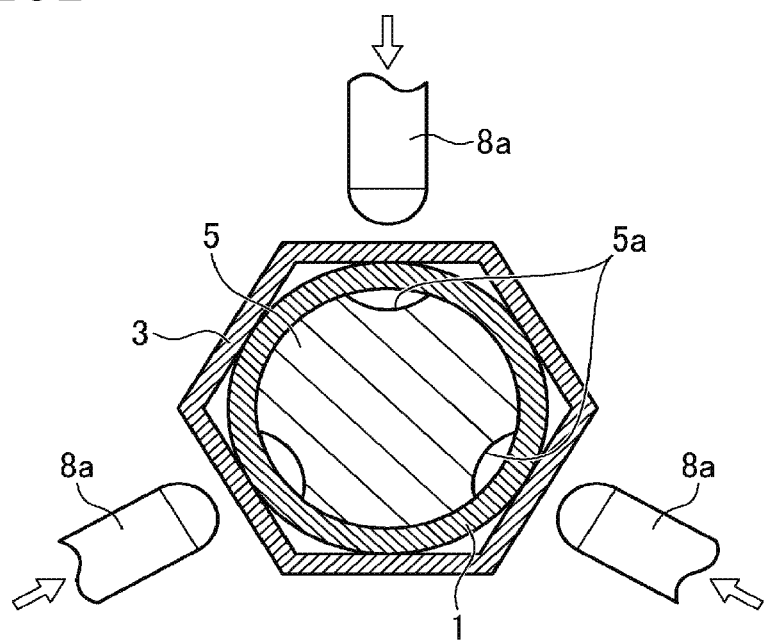
FIG. 20D is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a fourth modification of the third embodiment.
Figure 20E:
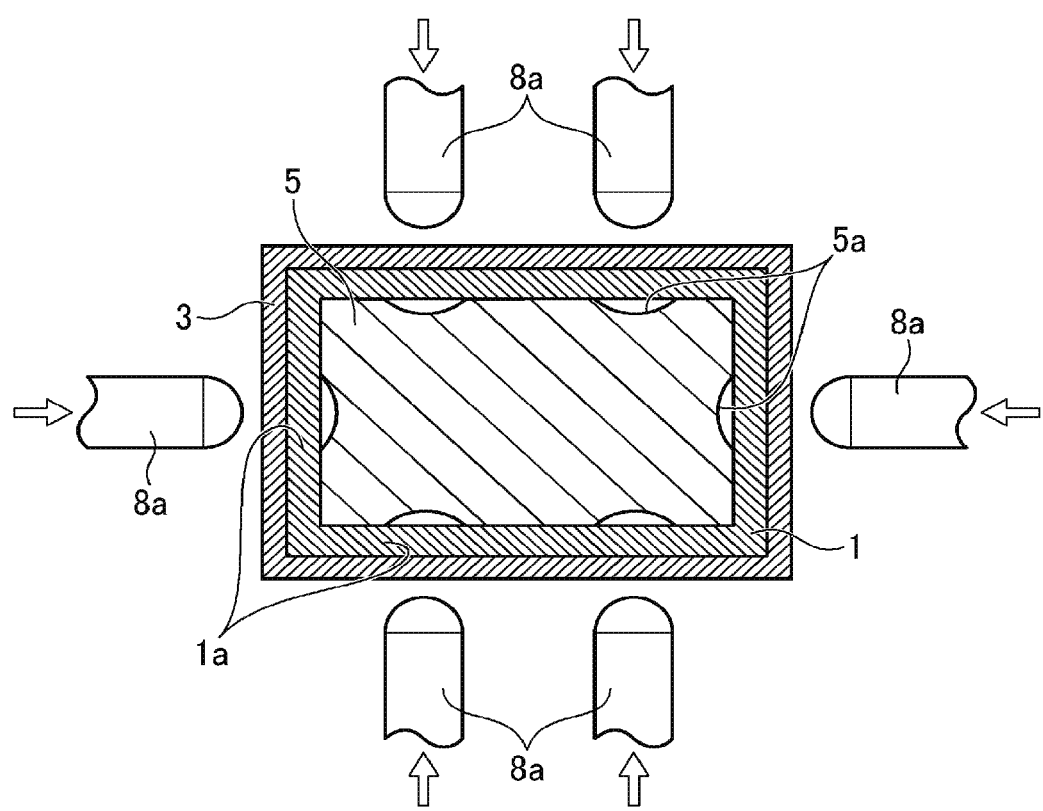
FIG. 20E is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a fifth modification of the third embodiment.

Different from the first and second embodiments, the circular tubular pipe 1 that is not formed with a through hole is used in the third embodiment, as shown in FIG. 16. On the other hand, similar to the second embodiment, a cylindrical core that has a plurality of groove portions 5a extending along the axial direction is used as the core 5 as shown in FIG. 17. The plurality of groove portions 5a are formed at equal intervals in the circumferential direction, and the core 5 is attached to the base 31 such that the phases of the plurality of groove portions 5a and the phases of the protruding portions 8a of the plungers 8 coincide with each other. Therefore, the coupling device according to the present embodiment has the same configuration as the coupling device according to the second embodiment. Similar to the first and second embodiments, a circular tubular member is used as the auxiliary member 3.

Therefore, in the third embodiment, when the tubular pipe 1 is made of an aluminum alloy or a magnesium alloy and the flat plate material 2 is made of steel, the tubular auxiliary member 3 made of steel is disposed around the pipe 1, and the pipe 1 and the auxiliary member 3 are set in the recessed portion 31a of the base 31. Then, the pump 35 is driven to displace the plunger 8 inward in the radial direction toward the peripheral wall of the auxiliary member 3 that faces the plurality of groove portions 5a formed in the core 5 via the pipe 1. Accordingly, a part of the peripheral wall of the auxiliary member 3 is bulged inward in the radial direction to form a plurality of inward protruding portions 1b in the pipe 1, and the inward protruding portions 1b respectively enter the plurality of groove portions 5a of the core 5. A part of the peripheral wall of the auxiliary member 3 is formed with a plurality of fitting portions 3a that are respectively fitted into a plurality of recesses 1c formed by the plurality of inward protruding portions 1b of the pipe 1, so that the pipe 1 and the auxiliary member 3 are caulked and coupled to each other.

Thereafter, similar to the first embodiment, the joined body 4 is detached from the core 5 and the base 31, and further the auxiliary member 3 and the plate material 2 are welded to each other, thereby joining the pipe 1 and the plate material 2 to each other via the auxiliary member 3 so as to obtain the joint 10 of different materials.

As described above, according to the method for manufacturing a tubular member equipped with an auxiliary member for joining different materials and the method for manufacturing the different-material joined joint in the third embodiment, the pipe 1 and the auxiliary member 3 are caulked and coupled to each other by using the core 5 having the groove portions 5a in the circular tubular pipe 1 that is not formed with the through holes 1a. Accordingly, it is not necessary to perform an operation of forming a through hole in the pipe 1, it is also not necessary to perform an operation of determining phases when the pipe 1 is set in the coupling device 30, the number of steps can be reduced, and manufacturing costs can be reduced.

In the present embodiment, even when the pipe 1 and the auxiliary member 3 that have the same cross-sectional shapes as those in FIGS. 6A to 6E in the first embodiment are combined as shown in FIGS. 20A to 20E, the pipe 1 and the auxiliary member 3 can be caulked and coupled to each other by using the core 5 having the groove portions 5a in the pipe 1 that is not formed with the through holes 1a. In this case as well, there is an advantage that the number of manufacturing steps can be reduced.

Other configurations and functions are the same as those in the first embodiment.

Fourth Embodiment

Next, a method for joining different materials according to a fourth embodiment of the present invention will be described with reference to FIGS. 21 to 26E. The description of the same or equivalent parts as those of the first embodiment will be omitted or simplified.

Figure 21:
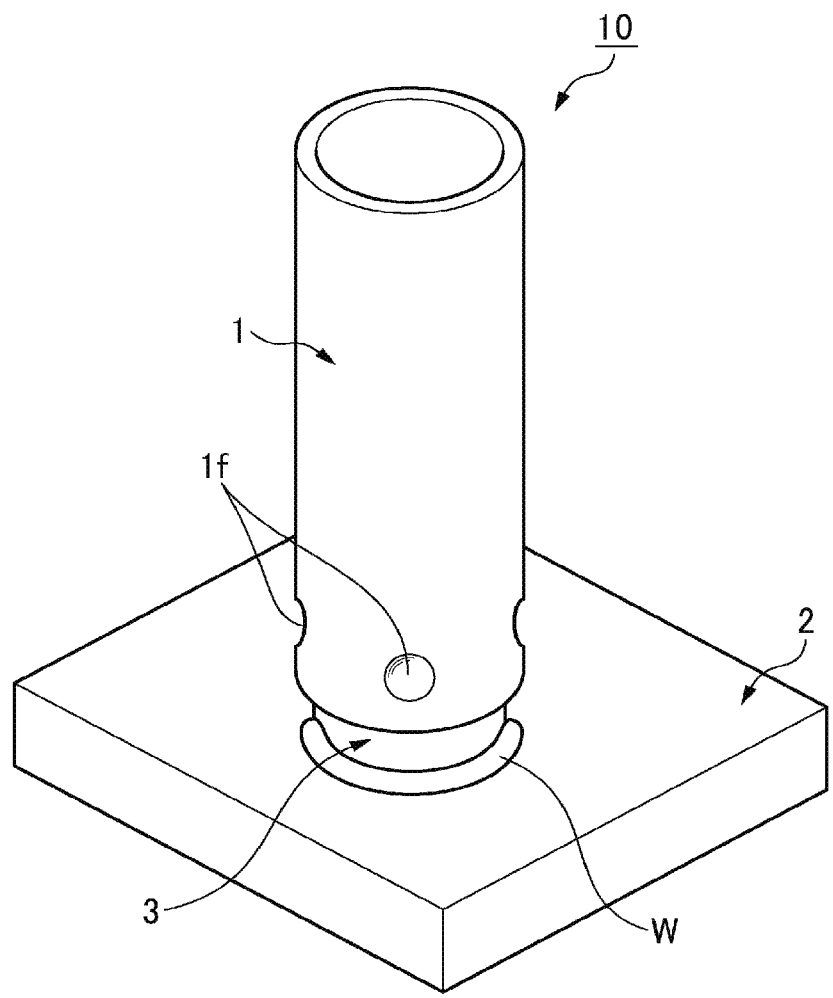
FIG. 21 is a perspective view showing a joint of different materials according to a fourth embodiment of the present invention.

In the method for joining different materials according to the fourth embodiment, the circular tubular pipe (a first member, a tubular member) 1 made of an aluminum alloy or a magnesium alloy (a first material) and the flat plate material (a second member) 2 made of steel (second material) are indirectly joined using the circular tubular auxiliary member 3 made of steel (a third material) to obtain the joint 10 of different materials as shown in FIG. 21. Therefore, in the joint 10 of different materials, as will described in detail below, the auxiliary member 3 is firmly coupled to the pipe 1, and the auxiliary member 3 and the plate material 2 are joined to each other by arc welding or the like.

Figure 22:
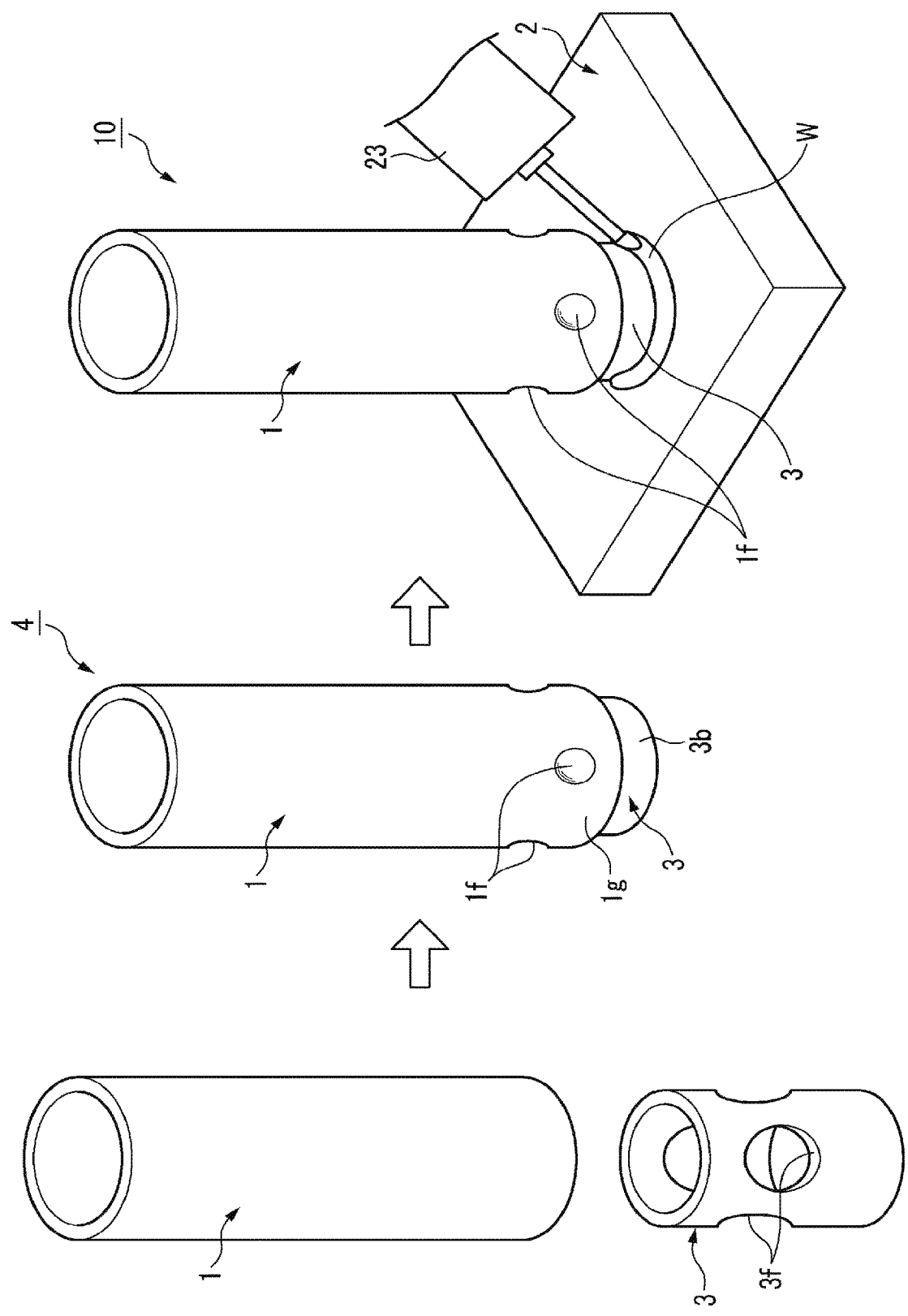
FIG. 22 is a perspective view showing steps of a method for joining different materials according to the fourth embodiment of the present invention.

As shown in FIG. 22, a plurality of (four in the present embodiment) through holes 3f are formed in the auxiliary member 3 at a predetermined interval in the circumferential direction.

Figure 24:
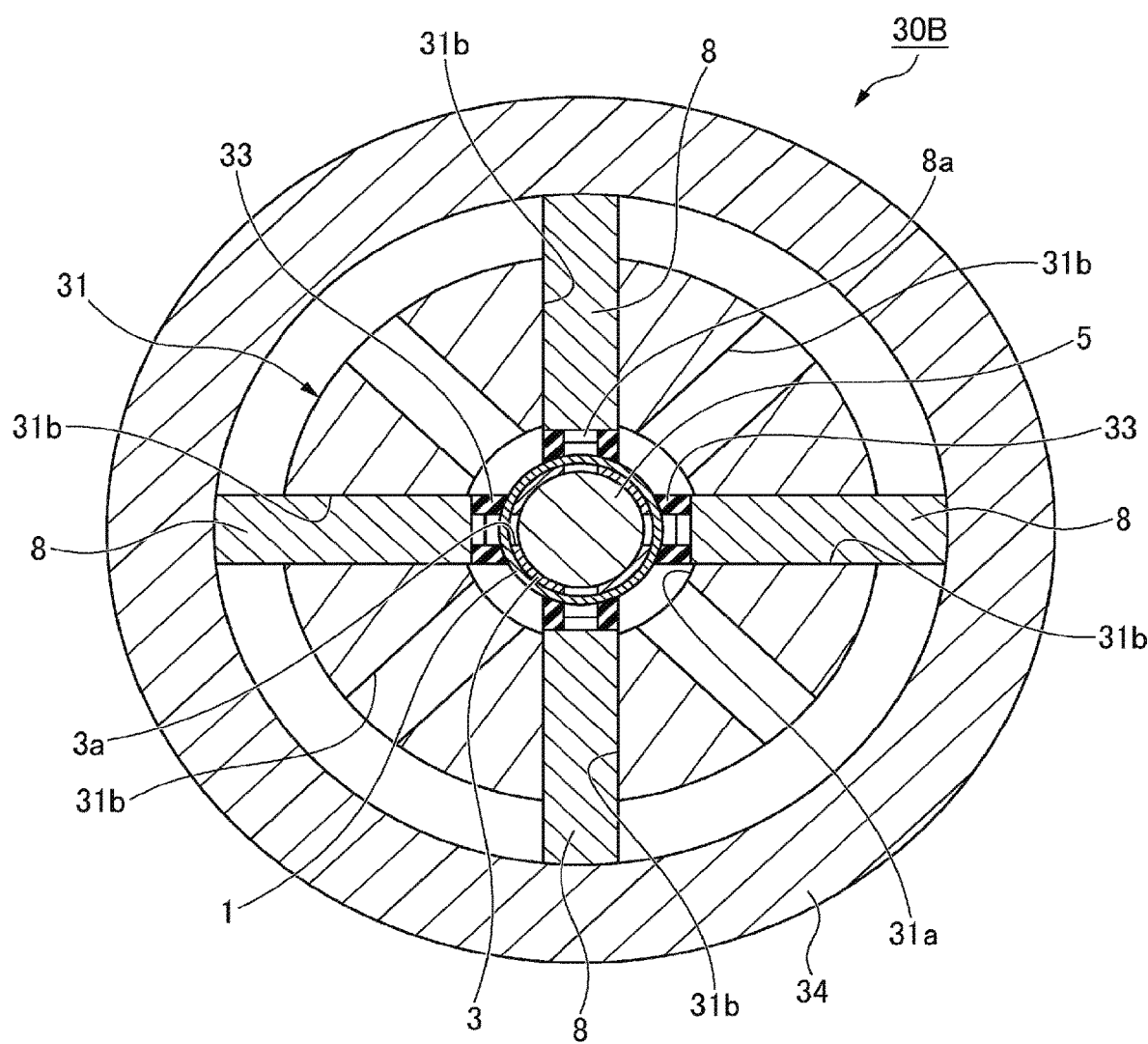
FIG. 24 is a horizontal cross-sectional view showing a coupling device taken along a line XXIV-XXIV in FIG. 25A and showing a state in which a pipe and an auxiliary member are mounted on a base in the method for joining different materials and the method for manufacturing a tubular member equipped with an auxiliary member for joining different materials according to the fourth embodiment.
Figure 25A:
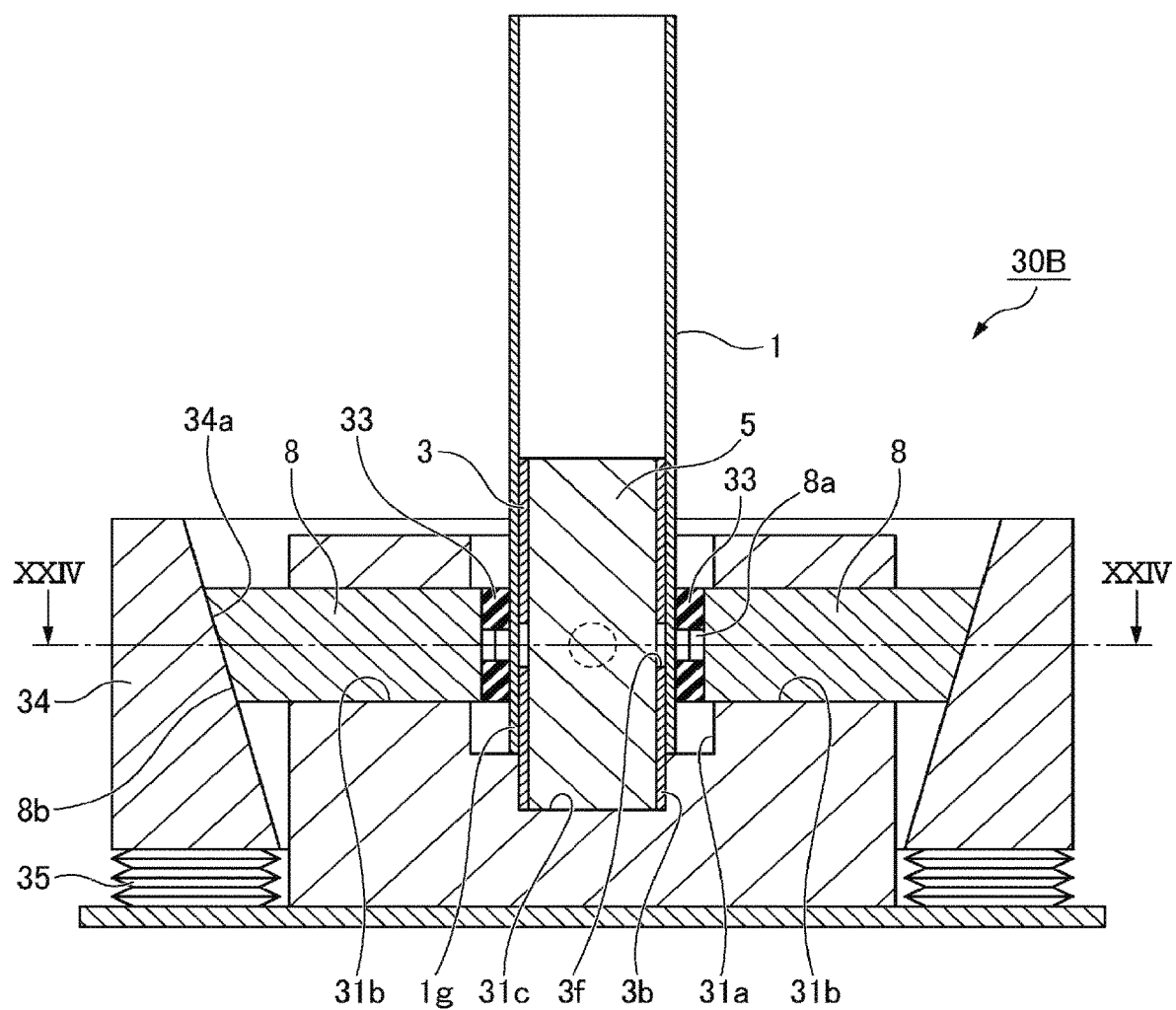
FIG. 25A is a cross-sectional view showing the coupling device in a state in which the pipe and the auxiliary member are mounted on the base in the method for joining different materials and the method for manufacturing a tubular member equipped with an auxiliary member for joining different materials according to the fourth embodiment.

The auxiliary member 3 is fitted and attached into an end portion of the pipe 1. Therefore, an outer diameter of the auxiliary member 3 is designed to be slightly smaller than an inner diameter of the pipe 1. The pipe 1 has a plurality of fitting portions 1f that are formed in a manner in which a part of a peripheral wall that faces the plurality of through holes 3f of the auxiliary member 3 is bulged inward in the radial direction by a coupling device 30B for a tubular member as shown in FIGS. 24 and 25A and that are fitted into the plurality of through holes 3f As a result, the pipe 1 and the auxiliary member 3 are caulked and coupled to each other. A base portion of the fitting portion 1f is formed such that the inner peripheral surface of the pipe 1 is brought into contact with an edge portion of the through hole 3f over the entire periphery, and the auxiliary member 3 is positioned in the axial direction relative to the pipe 1 and is prevented from rotating. In a state in which the pipe 1 and the auxiliary member 3 are caulked and coupled to each other, an axial end portion 3b of the auxiliary member 3 extends from an axial end portion 1g of the pipe 1.

A welded metal W is formed by arc welding at a corner portion between the plate material 2 and the axial end portion 3b of the auxiliary member 3 placed on a flat surface of the plate material 2, and the plate material 2 and the auxiliary member 3 are firmly joined to each other. Since the axial end portion 3b of the auxiliary member 3 extends from the axial end portion 1g of the pipe 1, the auxiliary member 3 can be easily welded to the plate material 2.

Therefore, in the coupling device 30B shown in FIGS. 24 and 25A, a hole 31c for holding an inner member is formed coaxially with the recessed portion 31a on a bottom surface of the recessed portion 31a of the base 31, and the axial end portion 3b of the auxiliary member 3 is supported in the hole 31c for holding the inner member and the core 5 is attached in the hole 31c for holding the inner member. Therefore, the coupling device 30B according to the present embodiment has the same configuration as the coupling device 30 according to the first embodiment except for the base 31.

Figure 23:
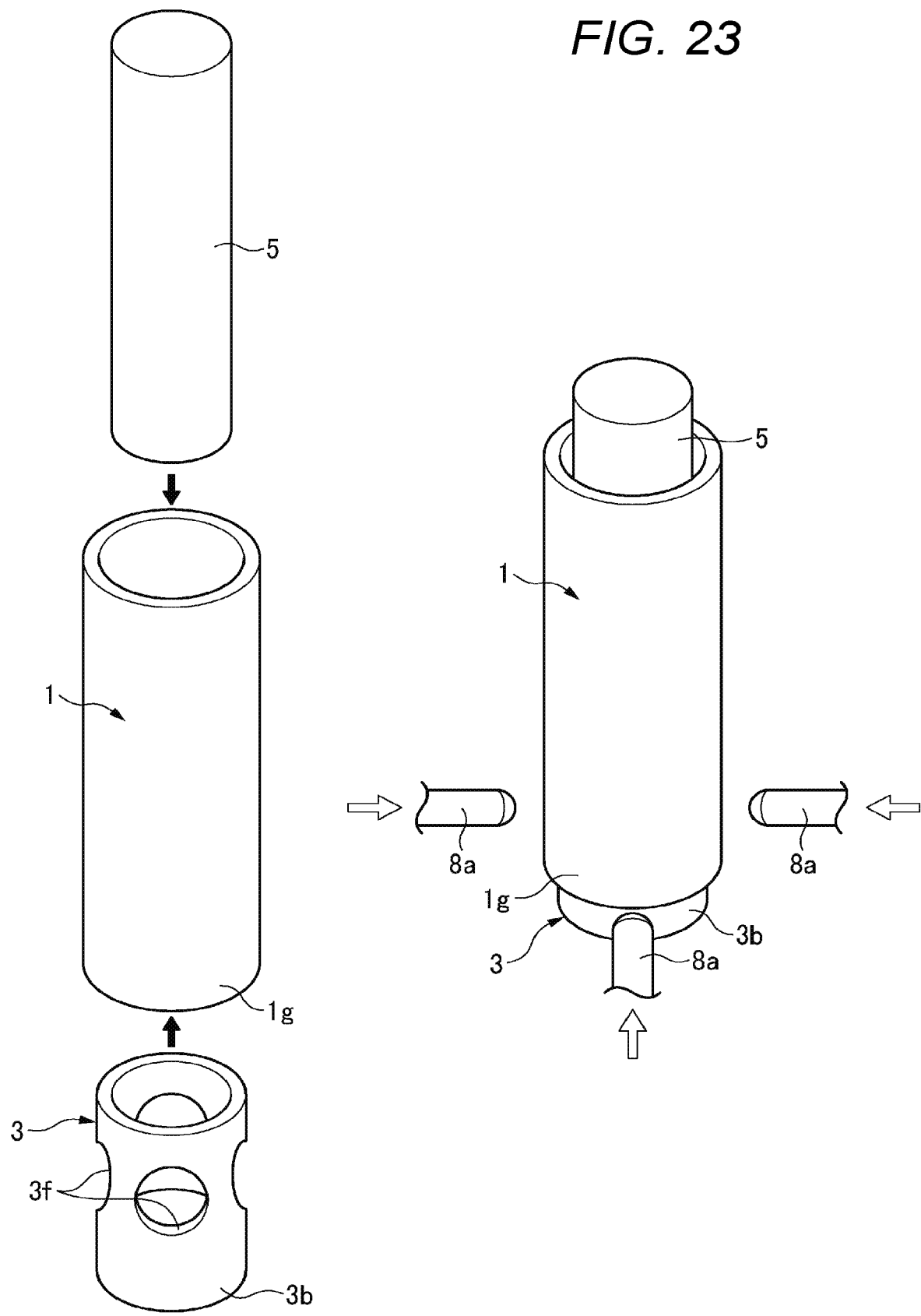
FIG. 23 is a perspective view showing a core arrangement step and a caulking and coupling step in the method for joining different materials and a method for manufacturing a tubular member equipped with an auxiliary member for joining different materials according to the fourth embodiment.

As shown in FIGS. 22 and 23, in the method for manufacturing the joint 10 of different materials, first, the circular tubular pipe 1 and the tubular auxiliary member 3 formed with a plurality of through holes 3f are prepared. The plurality of through holes 3f of the auxiliary member 3 are formed in a tubular blank member using a punch or the like (not shown). The plurality of through holes 3f are not limited to have a circular shape as shown in FIG. 21, and may have other shapes such as a polygonal shape. It is preferable that a shape of a tip end of the plunger 8 matches with a shape of the through hole 3f.

Then, as shown in FIGS. 24 and 25A, the pipe 1 and the auxiliary member 3 are set on the base 31 of the coupling device 30B. Accordingly, as shown in FIG. 23, the pipe 1 is disposed around a portion of the auxiliary member 3 where the plurality of through holes 3f are formed in a state in which the axial end portion 3b of the auxiliary member 3 extends from the axial end portion 1g of the pipe 1, and the columnar core 5 is disposed inside the auxiliary member 3.

When the auxiliary member 3 is set on the base 31, the plurality of plungers (pressing members) 8 are arranged at positions corresponding to phases of the plurality of through holes 3f of the auxiliary member 3 at an outer side in the radial direction of the auxiliary member 3.

Figure 25B:
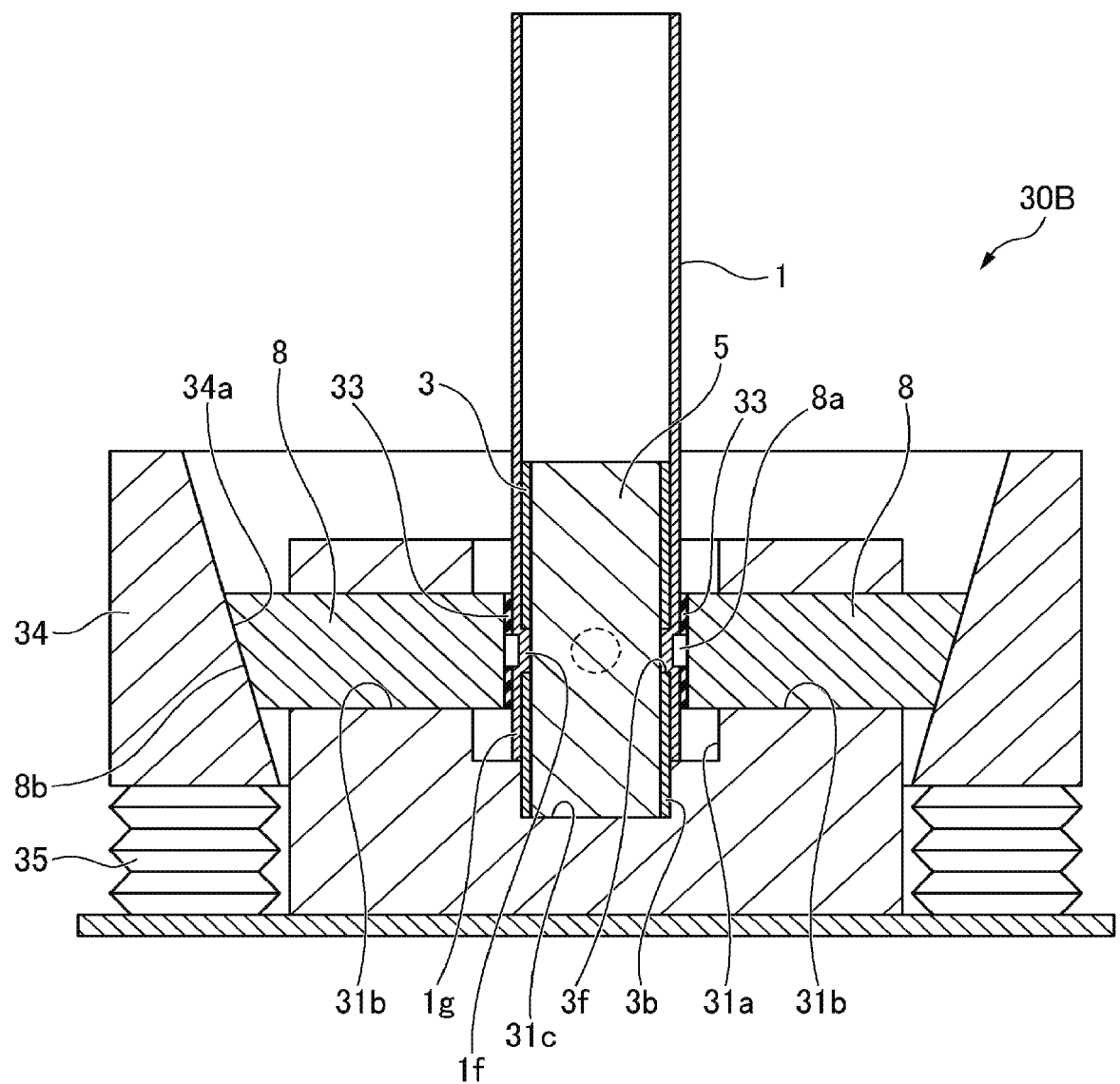
FIG. 25B is a cross-sectional view showing the coupling device in a caulking and coupling state in the method for joining different materials and the method for manufacturing a tubular member equipped with an auxiliary member for joining different materials according to the fourth embodiment.

Then, as shown in FIG. 25B, the pump 35 drives the pressurizing member 34 upward so as to displace the plurality of plungers 8 inward in the radial direction toward the peripheral wall of the pipe 1 that faces the plurality of through holes 3f of the auxiliary member 3. Accordingly, a part of the peripheral wall of the pipe 1 is bulged inward in the radial direction by the protruding portion 8a of the plunger 8 and is fitted into the through hole 3f to form the fitting portion 1f, and the pipe 1 and the auxiliary member 3 are caulked and coupled to each other.

Figure 25C:
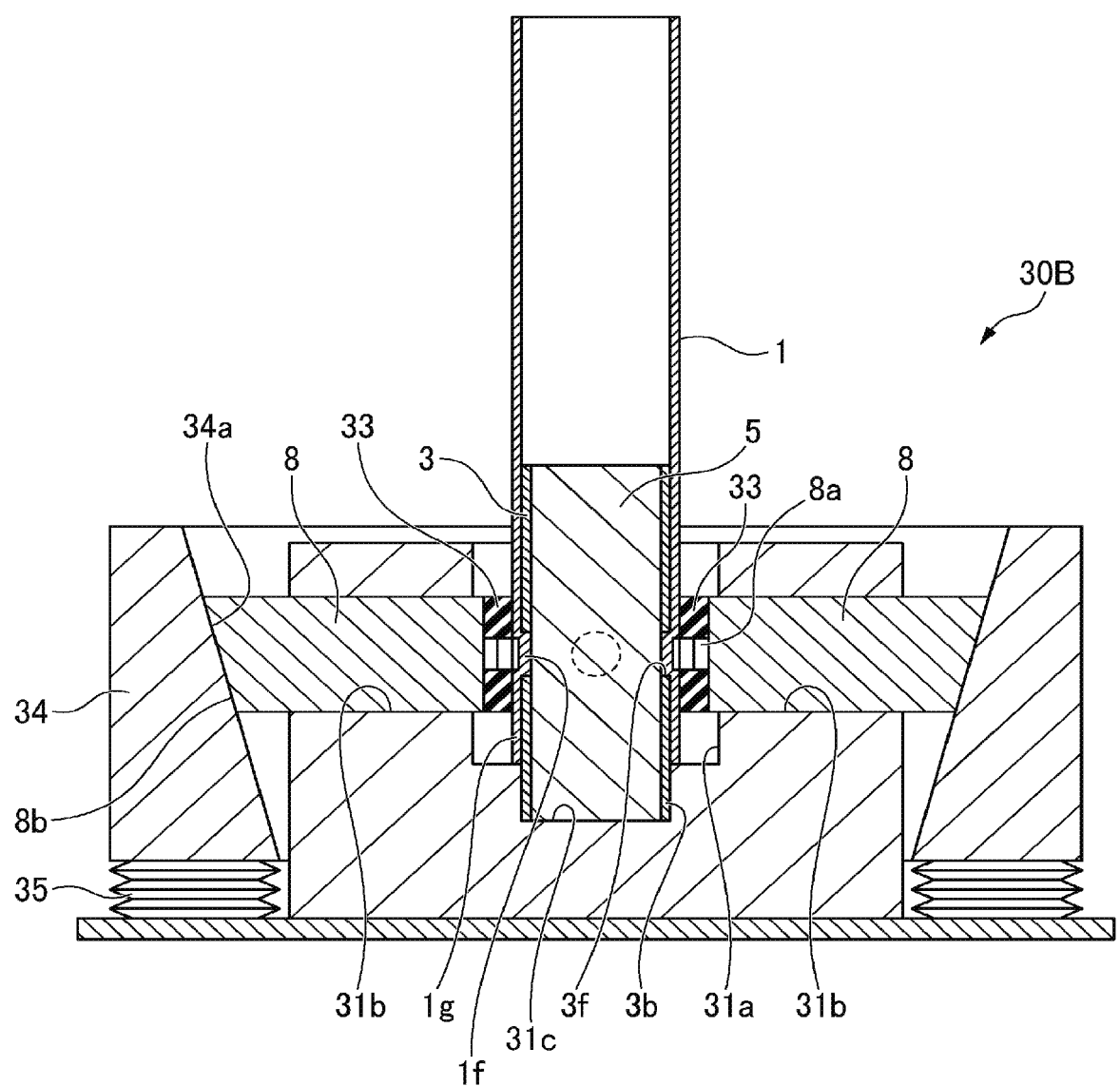
FIG. 25C is a cross-sectional view showing the coupling device in a state in which a plunger is returned and caulking and coupling are completed in the method for joining different materials and the method for manufacturing a tubular member equipped with an auxiliary member for joining different materials according to the fourth embodiment.
Figure 25D:
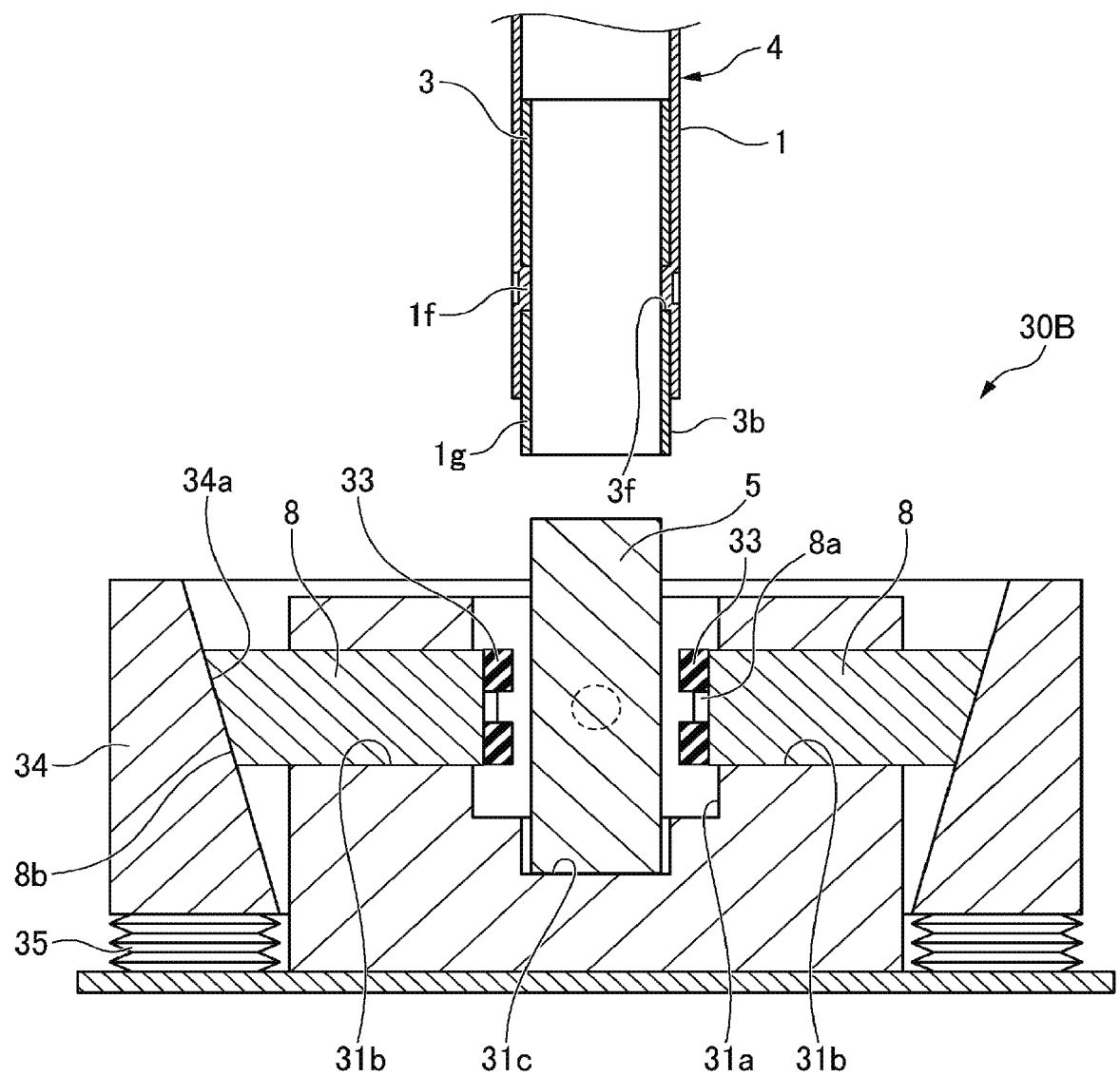
FIG. 25D is a cross-sectional view showing the coupling device in a state in which the tubular member equipped with an auxiliary member is detached from the coupling device in the method for joining different materials and the method for manufacturing a tubular member equipped with an auxiliary member for joining different materials according to the fourth embodiment.

Thereafter, as shown in FIG. 25C, the pump 35 drives the pressurizing member 34 downward, thereby moving the plunger 8 outward in the radial direction so as to retreat from the fitting portion 1f due to an action of the return rubber 33. Then, as shown in FIG. 25D, the pipe 1 and the auxiliary member 3 are detached from the core 5 and the base 31, thereby obtaining the joined body (a tubular member equipped with an auxiliary member for joining different materials) 4 including the pipe 1 and the auxiliary member 3.

Thereafter, returning to FIG. 22, the auxiliary member 3 of the joined body 4 and the plate material 2 are joined by arc welding or the like. Since fillet welding by an arc is welding between steels, the plate material 2 and the auxiliary member 3 are firmly joined without generating an intermetallic compound. In FIG. 22, reference numeral 23 denotes a welding torch.

In the present embodiment, the pipe 1 is made of an aluminum alloy or a magnesium alloy, and the plate material 2 and the auxiliary member 3 are made of steel. Materials of the members are not limited thereto as along as a material of the plate material 2 and a material of the auxiliary member 3 are different from a material of the pipe 1. For example, the material of the plate material 2 and the auxiliary member 3 may be any material that can be joined to each other by fusion welding without generating an intermetallic compound. Steel compositions of the plate material 2 and the auxiliary member 3 may be the same or may be different from each other.

When the pipe 1 is made of steel and the plate material 2 is made of an aluminum alloy or a magnesium alloy, the auxiliary member 3 may be made of a material different from the material of the pipe 1, and may be made of, for example, an aluminum alloy or a magnesium alloy which is the same material as the plate material 2.

Further, the pipe 1 may be made of a non-metal material including a resin material such as a carbon fiber reinforced resin instead of a metal material. In this case as well, the plate material 2 and the auxiliary member 3 may be made of a metal material and may be made of steel, or may be made of an aluminum alloy or a magnesium alloy.

A cross-sectional shape of the pipe 1 is not limited to a circular shape and may be any shape as long as the shape is a tubular shape. A cross-sectional shape of the auxiliary member 3 may be a shape corresponding to the shape of the pipe 1 or may be a shape different from the shape of the pipe 1 as long as the auxiliary member 3 has a shape in which the auxiliary member 3 is brought into contact with or close to an inner surface of the pipe 1 at a portion where the through hole 3f is formed and the fitting portion if is formed in the through hole 3f. On the other hand, a cross-sectional shape of the core 5 is required to be similar to the cross-sectional shape of the auxiliary member 3.

Figure 26A:
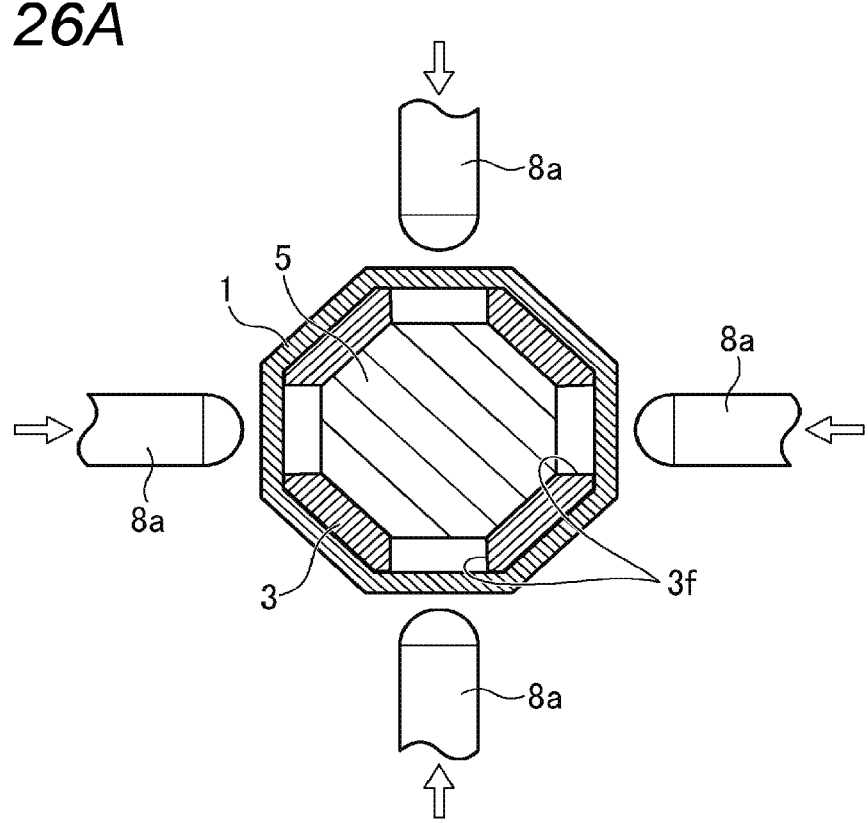
FIG. 26A is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a first modification of the fourth embodiment.

For example, in FIG. 26A, the pipe 1 is a polygonal tube member whose cross-sectional shape is a regular octagonal shape, the auxiliary member 3 is also a polygonal tube member whose cross-sectional shape is a regular octagonal shape, and the core 5 is a polygonal columnar member whose cross-sectional shape is a regular octagonal shape. The through hole 3f is formed at every other side of the auxiliary member 3 and is formed at four sides.

Figure 26B:
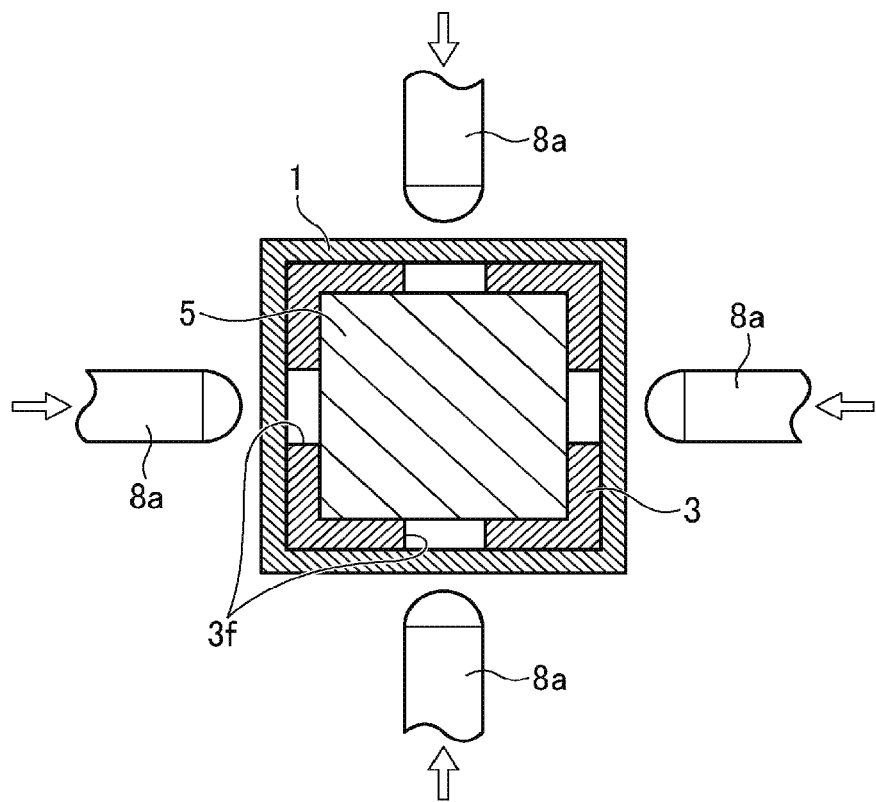
FIG. 26B is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a second modification of the fourth embodiment.

In FIG. 26B, the pipe 1 is a polygonal tube member whose cross-sectional shape is a square, the auxiliary member 3 is also a polygonal tube member whose cross-sectional shape is a square, and the core 5 is a polygonal columnar member whose cross-sectional shape is a square. The through holes 3f are formed in all sides of the auxiliary member 3.

Figure 26C:
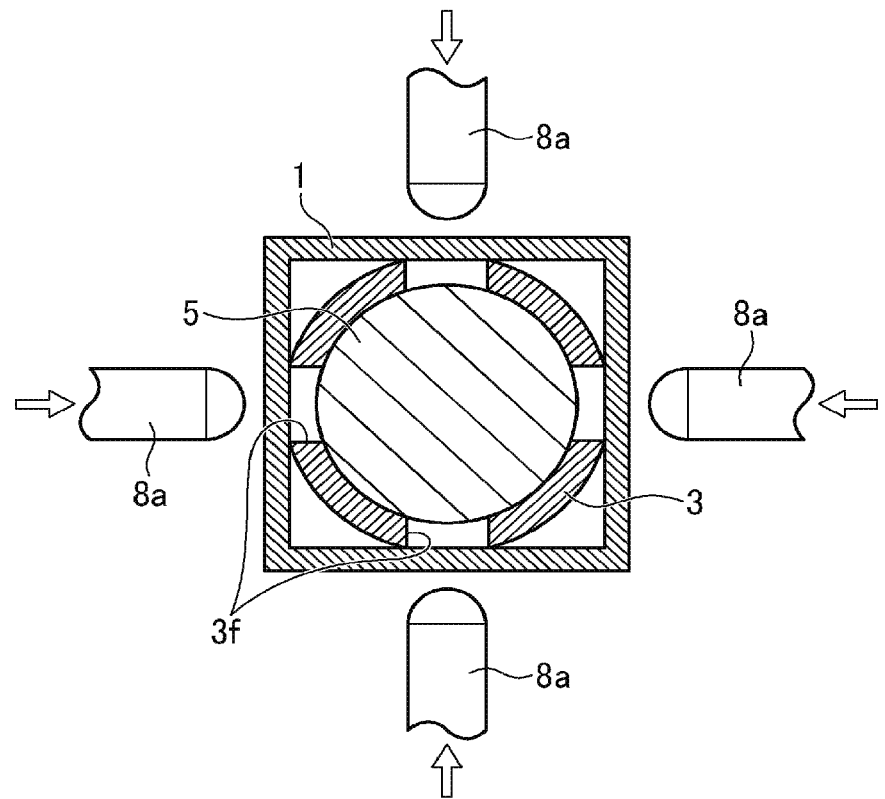
FIG. 26C is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a third modification of the fourth embodiment.

In FIG. 26C, the pipe 1 is a polygonal tube member whose cross-sectional shape is a square, the auxiliary member 3 is a circular tube member whose cross-sectional shape is a circular shape, and the core 5 is a cylindrical member whose cross-sectional shape is a circular shape. The through holes 3f are formed in the auxiliary member 3 at an interval of 90° in the circumferential direction.

Figure 26D:
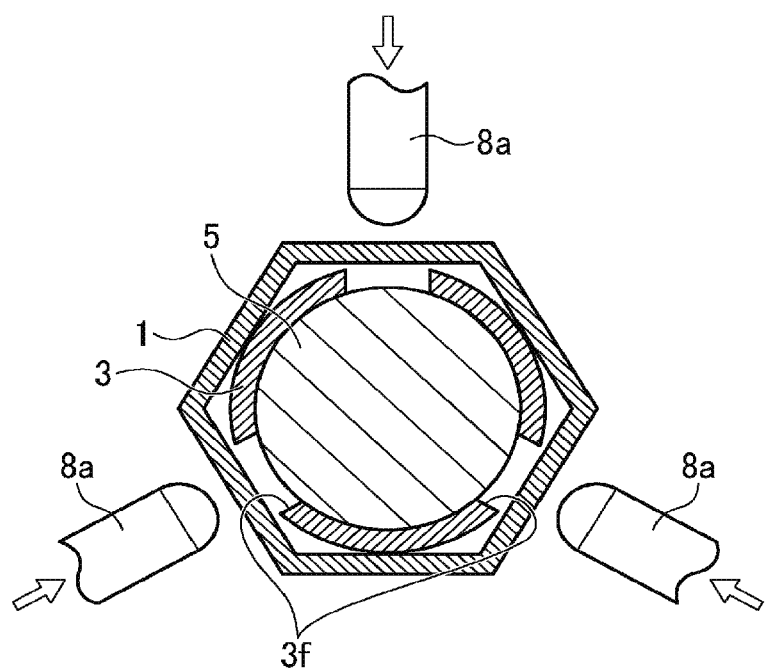
FIG. 26D is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a fourth modification of the fourth embodiment.

In FIG. 26D, the pipe 1 is a polygonal tube member whose cross-sectional shape is a regular hexagonal shape, the auxiliary member 3 is a circular tube member whose cross-sectional shape is a circular shape, and the core 5 is a cylindrical member whose cross-sectional shape is a circular shape. The through holes 3f are formed in the auxiliary member 3 at an interval of 120° in the circumferential direction.

Figure 26E:
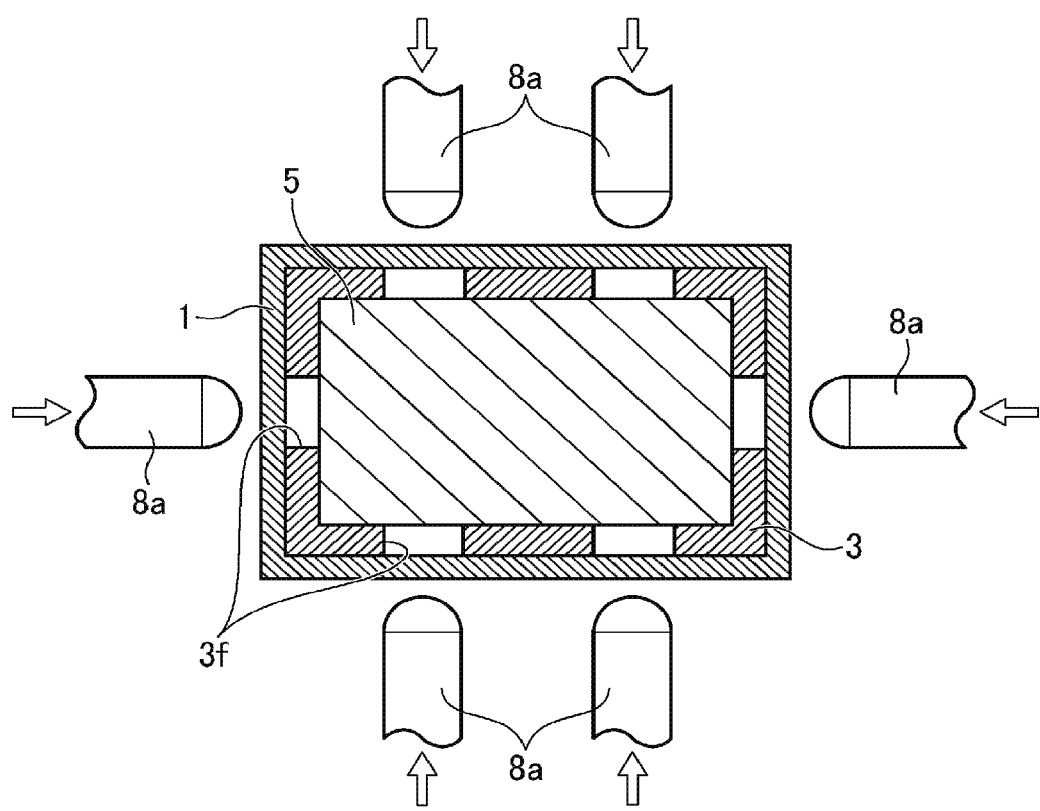
FIG. 26E is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a fifth modification of the fourth embodiment.

In FIG. 26E, the pipe 1 is a polygonal tube member whose cross-sectional shape is a rectangular shape, the auxiliary member 3 is also a polygonal tube member whose cross-sectional shape is a rectangular shape, and the core 5 is a polygonal columnar member whose cross-sectional shape is a rectangular shape. The through hole 3f is formed in each side of the auxiliary member 3, and in particular, two through holes 3f are formed in a long side.

In any one modification of FIGS. 26A to 26E described above, the auxiliary member 3 is firmly coupled to the pipe 1 by a pipe contraction processing of the pipe 1, and the auxiliary member 3 and the plate material 2 are joined by arc welding or the like.

As described above, according to the method for joining different materials using the coupling device 30 according to the present embodiment, the tubular pipe 1 is made of an aluminum alloy or a magnesium alloy, and the flat plate material 2 is made of steel. In this case, the method for joining different materials includes a step of setting the pipe 1 and the auxiliary member 3 on the base 31 so that the pipe 1 is disposed around the tubular auxiliary member 3 that is made of steel and is formed with a plurality of through holes 3f, a step of caulking and coupling the pipe 1 and the auxiliary member 3 to each other by displacing the plunger 8 inward in the radial direction toward the peripheral wall of the pipe 1 that faces the plurality of through holes 3f formed in the auxiliary member 3 so as to cause a part of the peripheral wall of the pipe 1 to bulge inward in the radial direction and fit into the through hole 3f, a step of detaching the pipe 1 and the auxiliary member 3 that are caulked and coupled to each other from the base 31, and a step of joining the pipe 1 and the plate material 2 via the auxiliary member 3 by welding the auxiliary member 3 and the plate material 2.

Accordingly, the tubular auxiliary member 3 is firmly coupled to the tubular pipe 1, and the auxiliary member 3 and the plate material 2 are joined by welding, so that the pipe 1 and the plate material 2 that are made of different materials can be joined indirectly via the auxiliary member 3.

When the tubular pipe 1 and the auxiliary member 3 are coupled in advance, the auxiliary member 3 and the plate material 2 can be easily joined to each other using a general welding method.

Therefore, in the present embodiment, the pipe 1 and the plate material 2 that are made of different materials can be joined easily and reliably at low costs, and can be applied to a wide range of fields.

In a method for manufacturing a tubular member equipped with an auxiliary member for joining different materials using the coupling device 30B according to the present embodiment, the tubular pipe 1 made of an aluminum alloy or a magnesium alloy and the tubular auxiliary member 3 that is made of steel and is disposed around the pipe 1 are provided. The manufacturing method includes a step of setting the pipe 1 and the auxiliary member 3 on the base 31 so that the pipe 1 is disposed around the tubular auxiliary member 3 formed with a plurality of through holes 3f, a step of caulking and coupling the pipe 1 and the auxiliary member 3 to each other by displacing the plunger 8 inward in the radial direction toward the peripheral wall of the pipe 1 that faces the plurality of through holes 3f formed in the auxiliary member 3 so as to cause a part of the peripheral wall of the pipe 1 to bulge inward in the radial direction and fit into the through hole 3f, and a step of detaching the pipe 1 and the auxiliary member 3 that are caulked and coupled to each other from the base 31.

Accordingly, since the tubular auxiliary member 3 is firmly coupled to the pipe 1, the pipe 1 and the plate material 2 that is made of a material different from a material of the pipe 1 can be indirectly joined to each other via the auxiliary member 3.

Therefore, in the present embodiment, the pipe 1 and the plate material 2 that are made of different materials can be joined easily and reliably at low costs, and can be applied to a wide range of fields.

Fifth Embodiment

Next, a method for joining different materials according to a fifth embodiment of the present invention will be described with reference to FIGS. 27 to 30E. The description of the same or equivalent parts as those of the fourth embodiment will be omitted or simplified.

Figure 27:
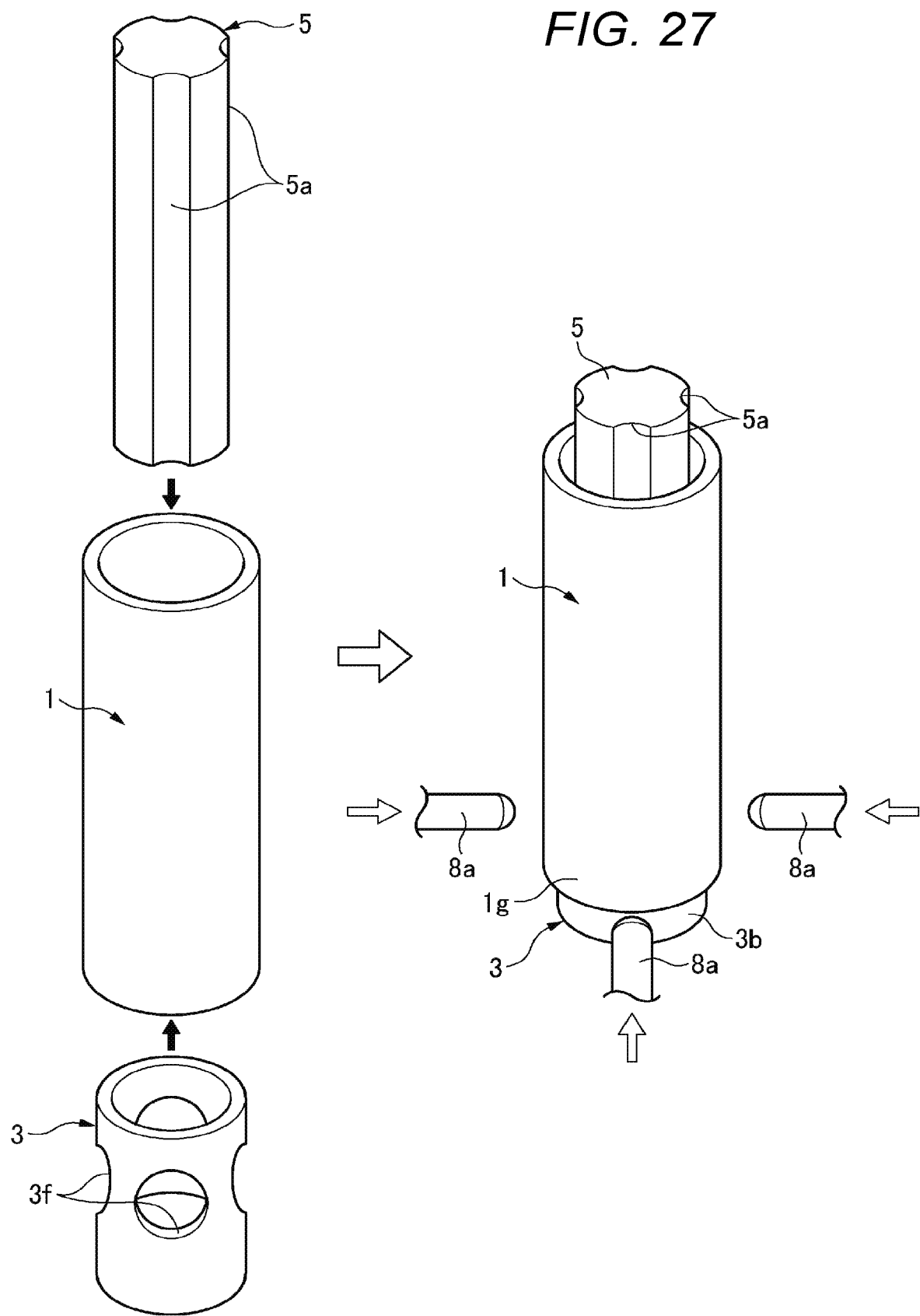
FIG. 27 is a perspective view showing a core arrangement step and a caulking and coupling step in a method for joining different materials and a method for manufacturing a tubular member equipped with an auxiliary member for joining different materials according to a fifth embodiment of the present invention.
Figure 28:
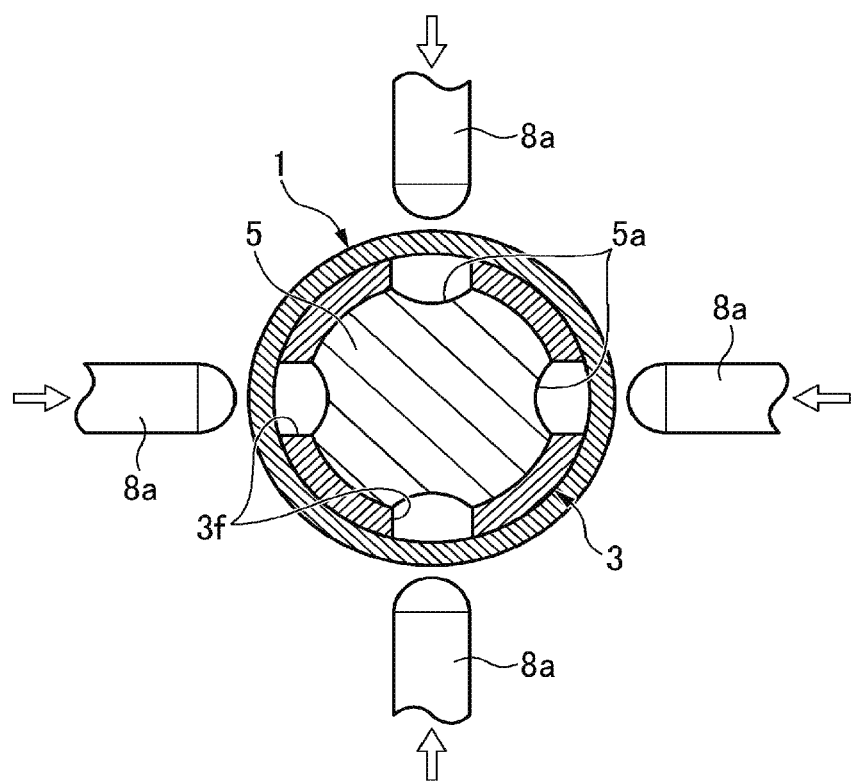
FIG. 28 is a horizontal cross-sectional view showing a pipe, an auxiliary member, a core, and a plunger and showing the caulking and coupling step in the method for joining different materials and the method for manufacturing a tubular member equipped with an auxiliary member for joining different materials according to the fifth embodiment.

In the fifth embodiment, the core 5 has a plurality of (four in the present embodiment) groove portions 5a extending along the axial direction at respective phases corresponding to the plurality of through holes 3f of the auxiliary member 3, as shown in FIGS. 27 and 28. Therefore, in the present embodiment, the core 5 is attached to the base 31 such that phases of the plurality of groove portions 5a and phases of the protruding portions 8a of the plungers 8 coincide with each other, and the auxiliary member 3 is set in the recessed portion 31a of the base 31 such that the phases of the plurality of groove portions 5a and phases of the plurality of through holes 3f of the auxiliary member 3 coincide with each other.

The coupling device according to the present embodiment has the same configuration as the coupling device according to the fourth embodiment except for the core 5.

Figure 29:
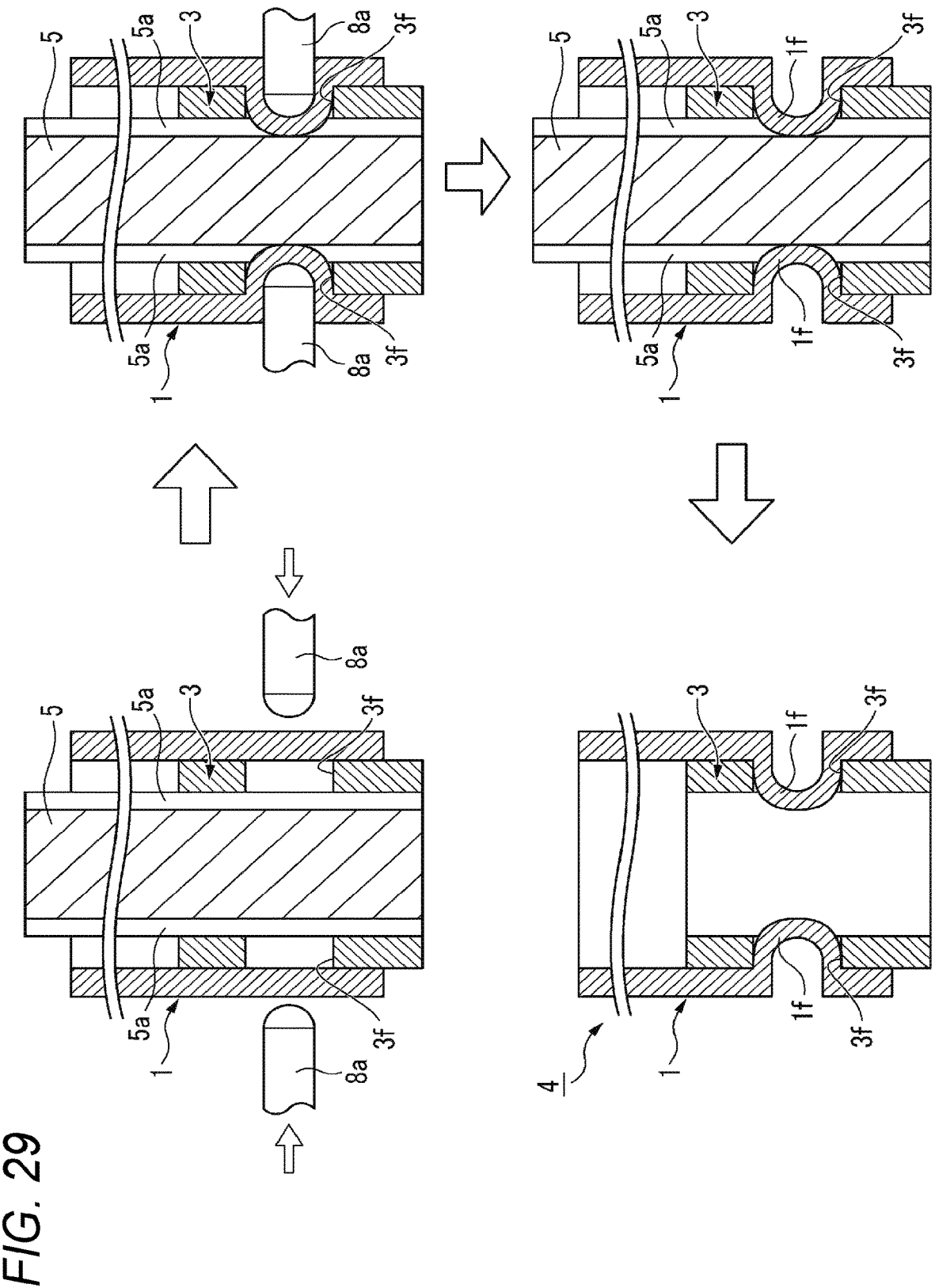
FIG. 29 is a vertical cross-sectional view showing a pipe, an auxiliary member, a core, and a plunger and showing the caulking and coupling step and a joined body detachment step in the method for joining different materials and the method for manufacturing a tubular member equipped with an auxiliary member for joining different materials according to the fifth embodiment.
Figure 30A:
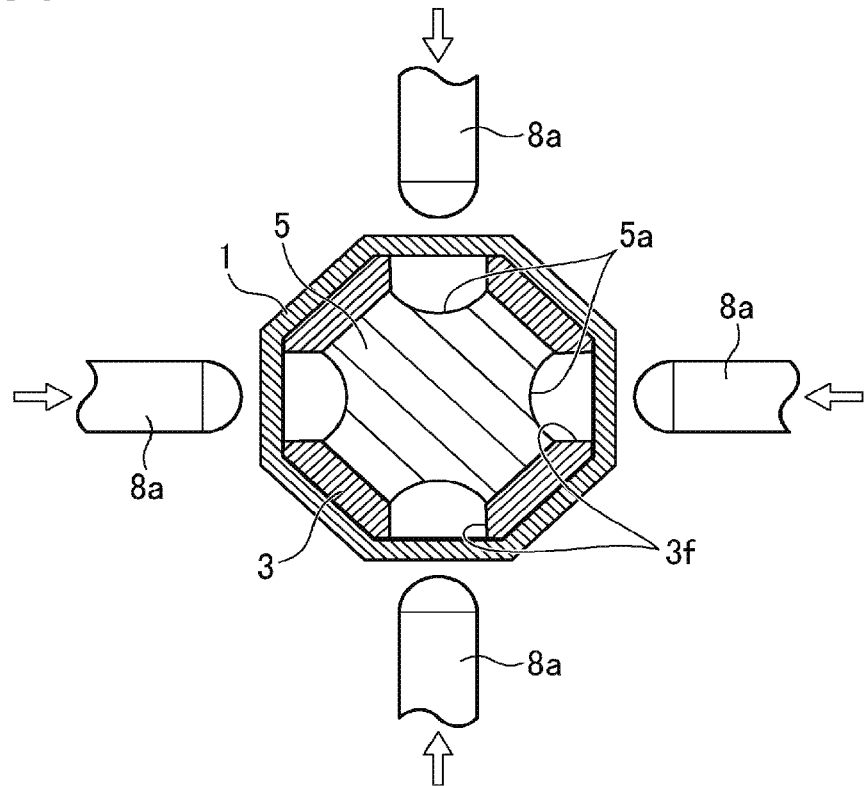
FIG. 30A is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a first modification of the fifth embodiment.
Figure 30B:
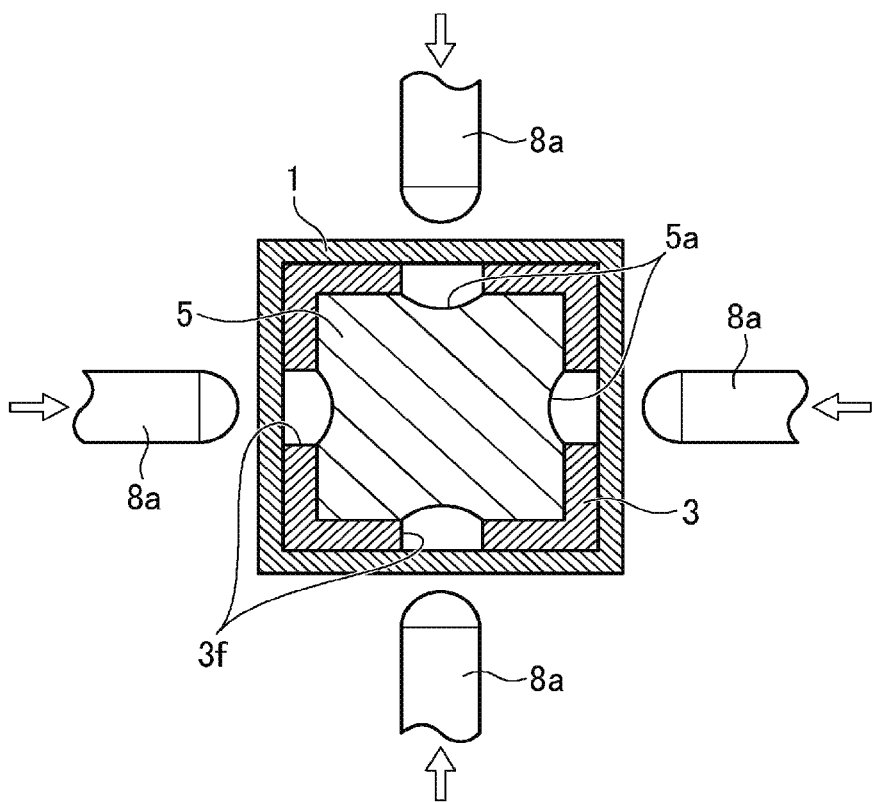
FIG. 30B is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a second modification of the fifth embodiment.
Figure 30C:
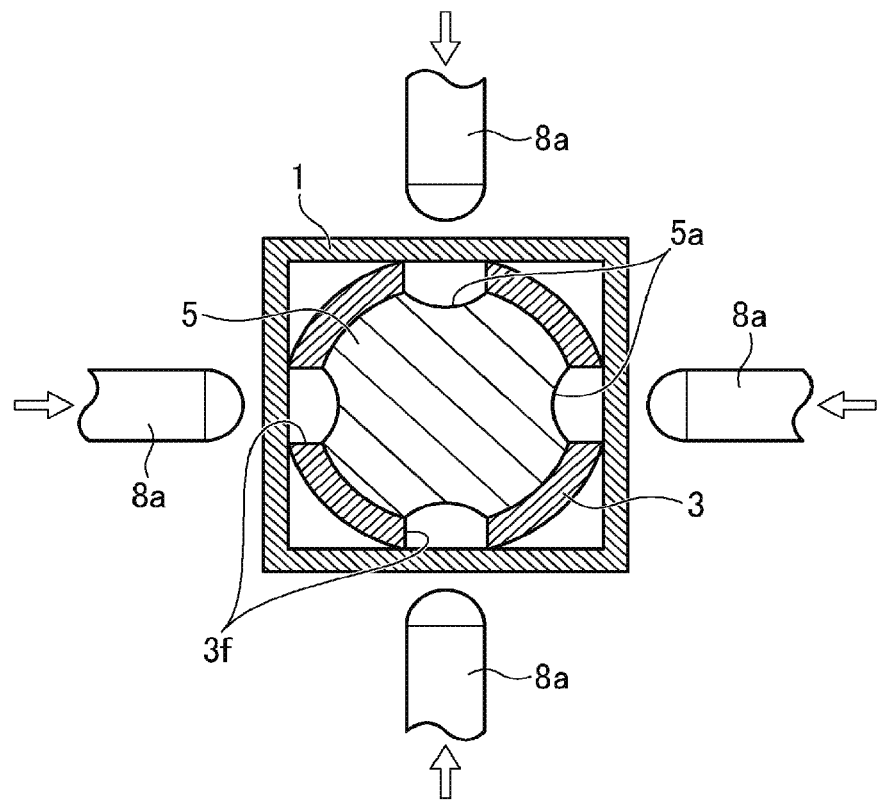
FIG. 30C is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a third modification of the fifth embodiment.
Figure 30D:
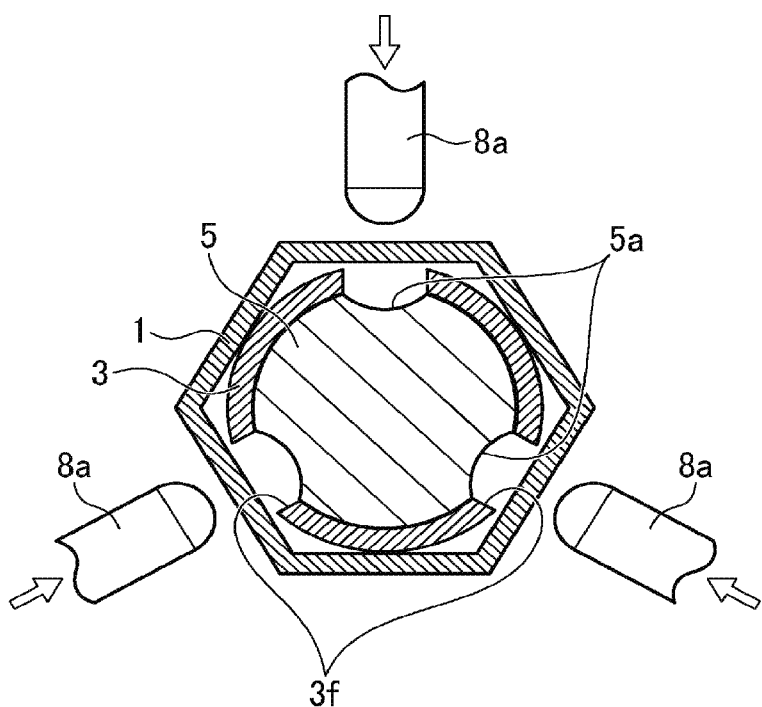
FIG. 30D is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a fourth modification of the fifth embodiment.
Figure 30E:
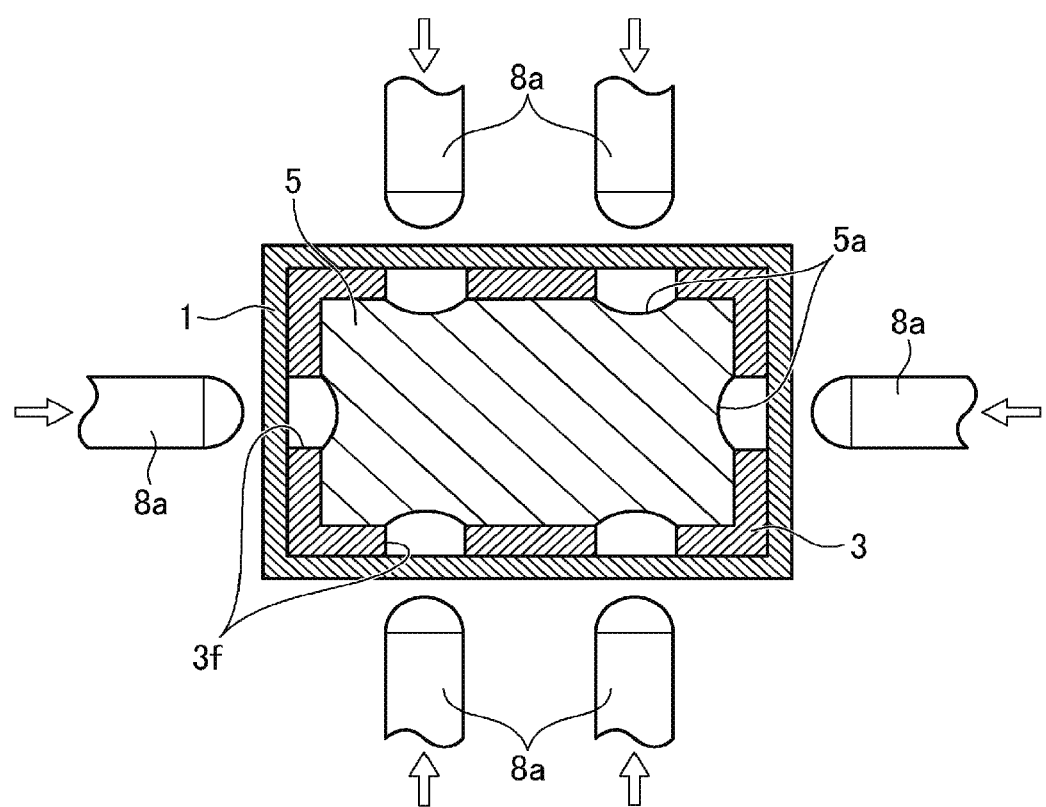
FIG. 30E is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a fifth modification of the fifth embodiment.

Accordingly, as shown in FIGS. 28 and 29, in the caulking and coupling step, the plunger 8 can be pushed inward in the radial direction more deeply, and a part of the peripheral wall of the pipe 1 is fitted into the through holes 3f of the auxiliary member 3 and the groove portions 5a of the core 5. That is, since the fitting portion if according to the present embodiment bulges inward in the radial direction from the inner peripheral surface of the auxiliary member 3 and is formed deeper than that in the fourth embodiment, it is possible to obtain the joint 10 of different materials and the joined body 4 that have improved caulking strength.

In the present embodiment, even when the pipe 1 and the auxiliary member 3 that have the same cross-sectional shapes as those in FIGS. 22A to 22E in the fourth embodiment are combined as shown in FIGS. 30A to 30E, it is possible to obtain the joint 10 of different materials and the joined body 4 that have improved caulking strength by using the core 5 having the groove portions 5a.

Other configurations and functions are the same as those in the fourth embodiment.

Sixth Embodiment

Next, a method for joining different materials according to a sixth embodiment of the present invention will be described with reference to FIGS. 31 to 35E. The description of the same or equivalent parts as those of the fourth embodiment will be omitted or simplified.

Figure 31:
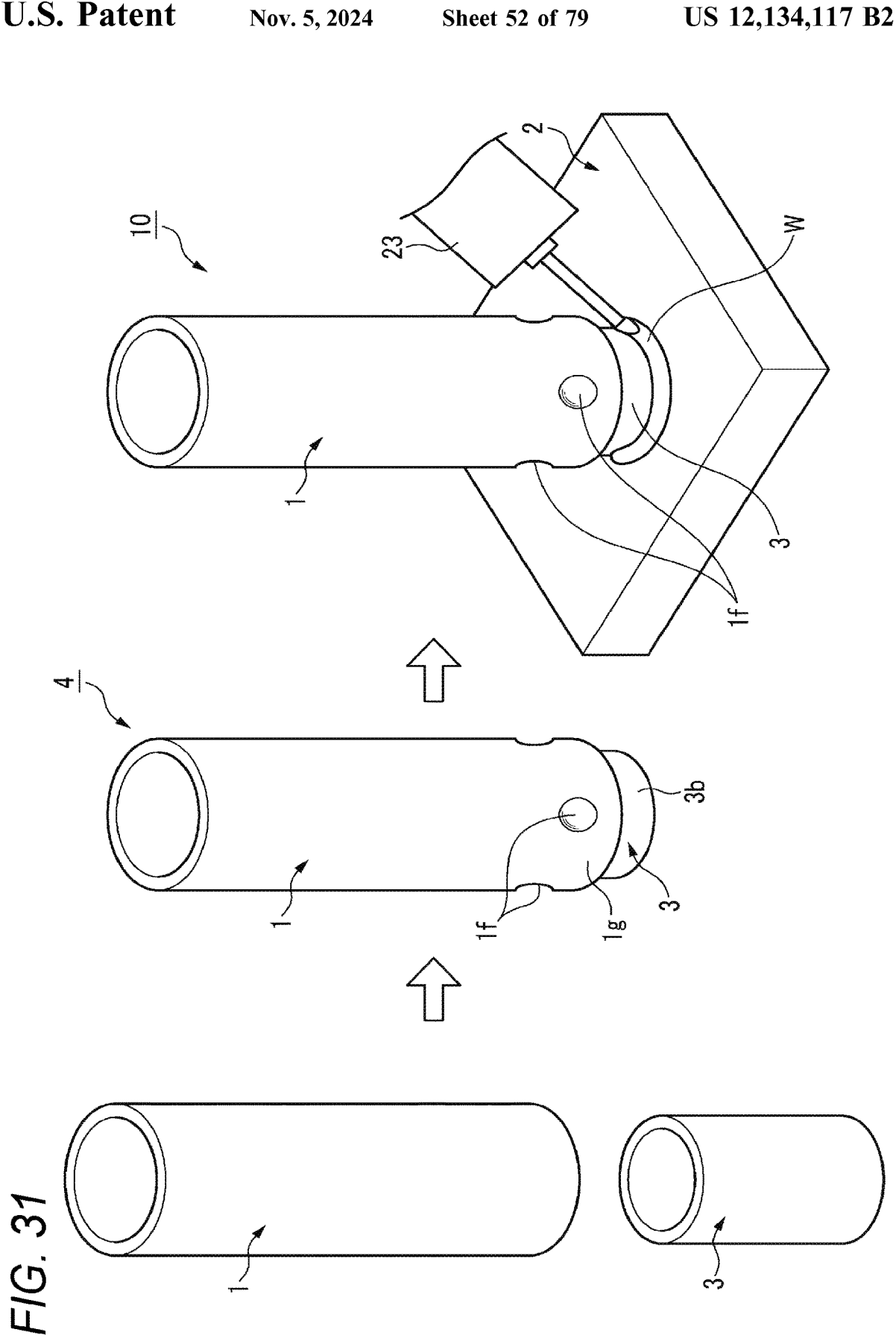
FIG. 31 is a perspective view showing steps of a method for joining different materials according to a sixth embodiment of the present invention.
Figure 32:
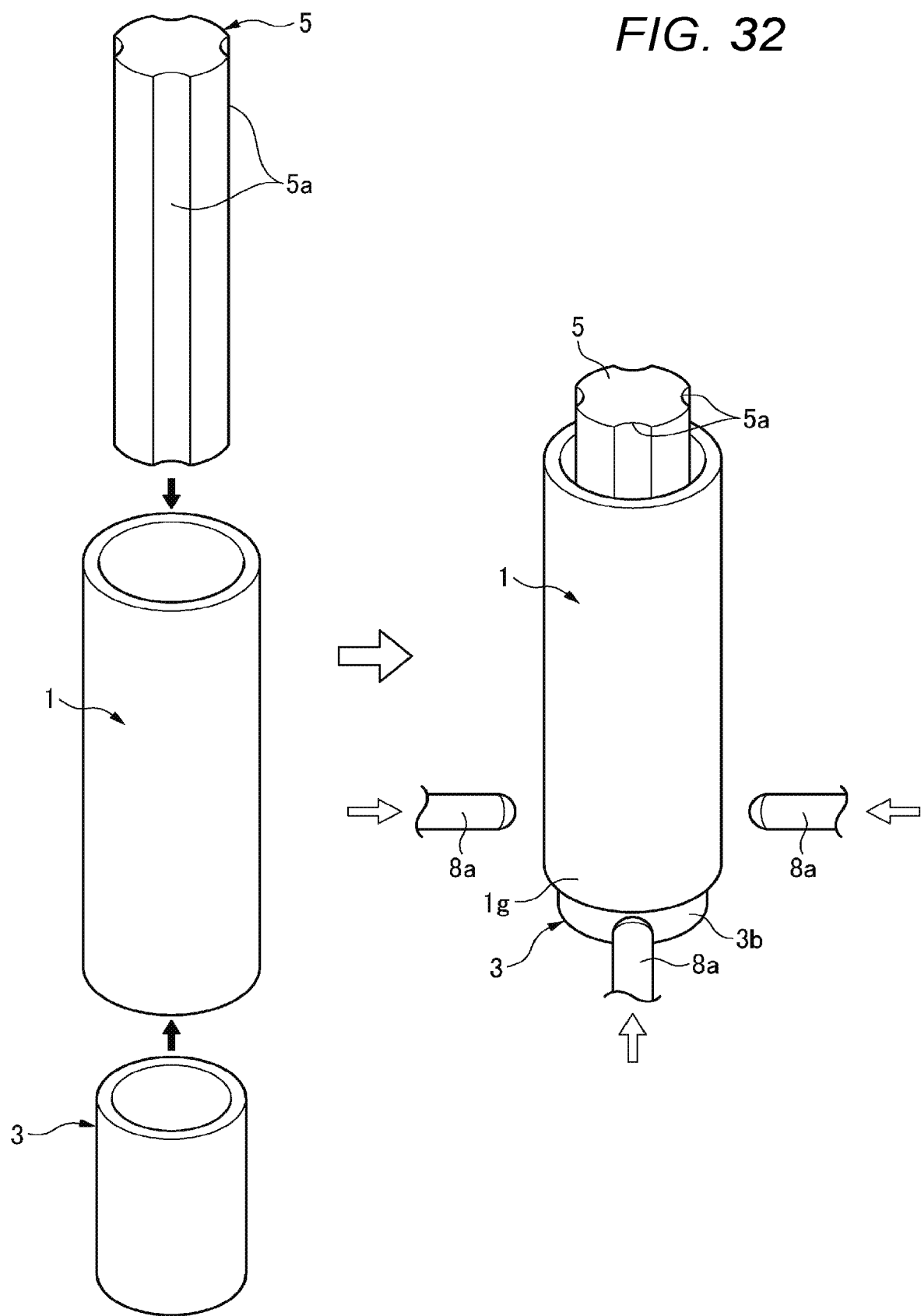
FIG. 32 is a perspective view showing a core arrangement step and a caulking and coupling step in the method for joining different materials and a method for manufacturing a tubular member equipped with an auxiliary member for joining different materials according to the sixth embodiment of the present invention.
Figure 33:
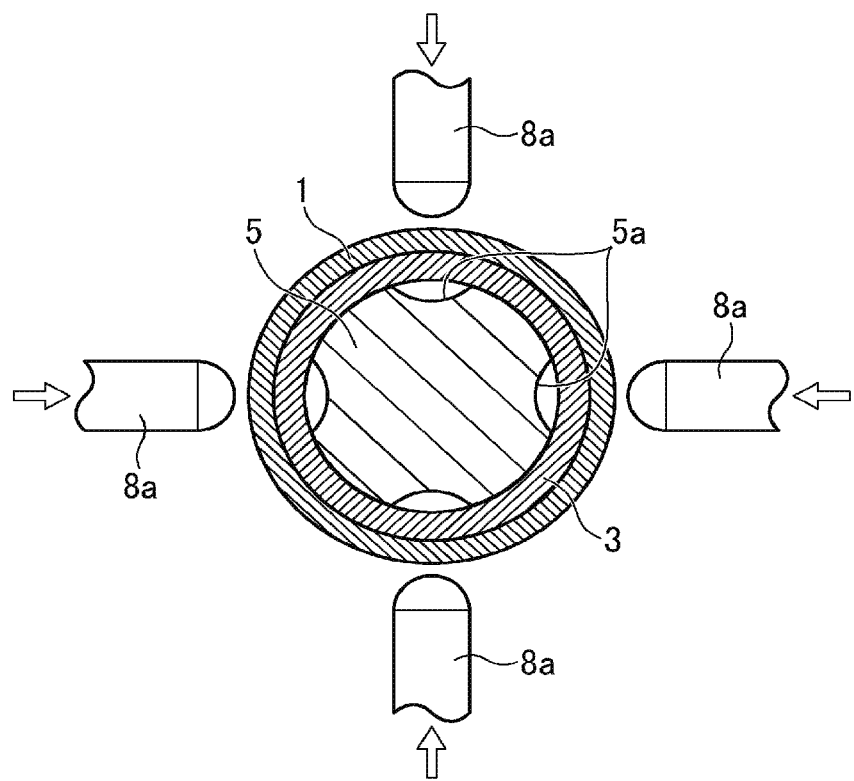
FIG. 33 is a horizontal cross-sectional view showing a pipe, an auxiliary member, a core, and a plunger and showing the caulking and coupling step in the method for joining different materials and the method for manufacturing a tubular member equipped with an auxiliary member for joining different materials according to the sixth embodiment.
Figure 34:
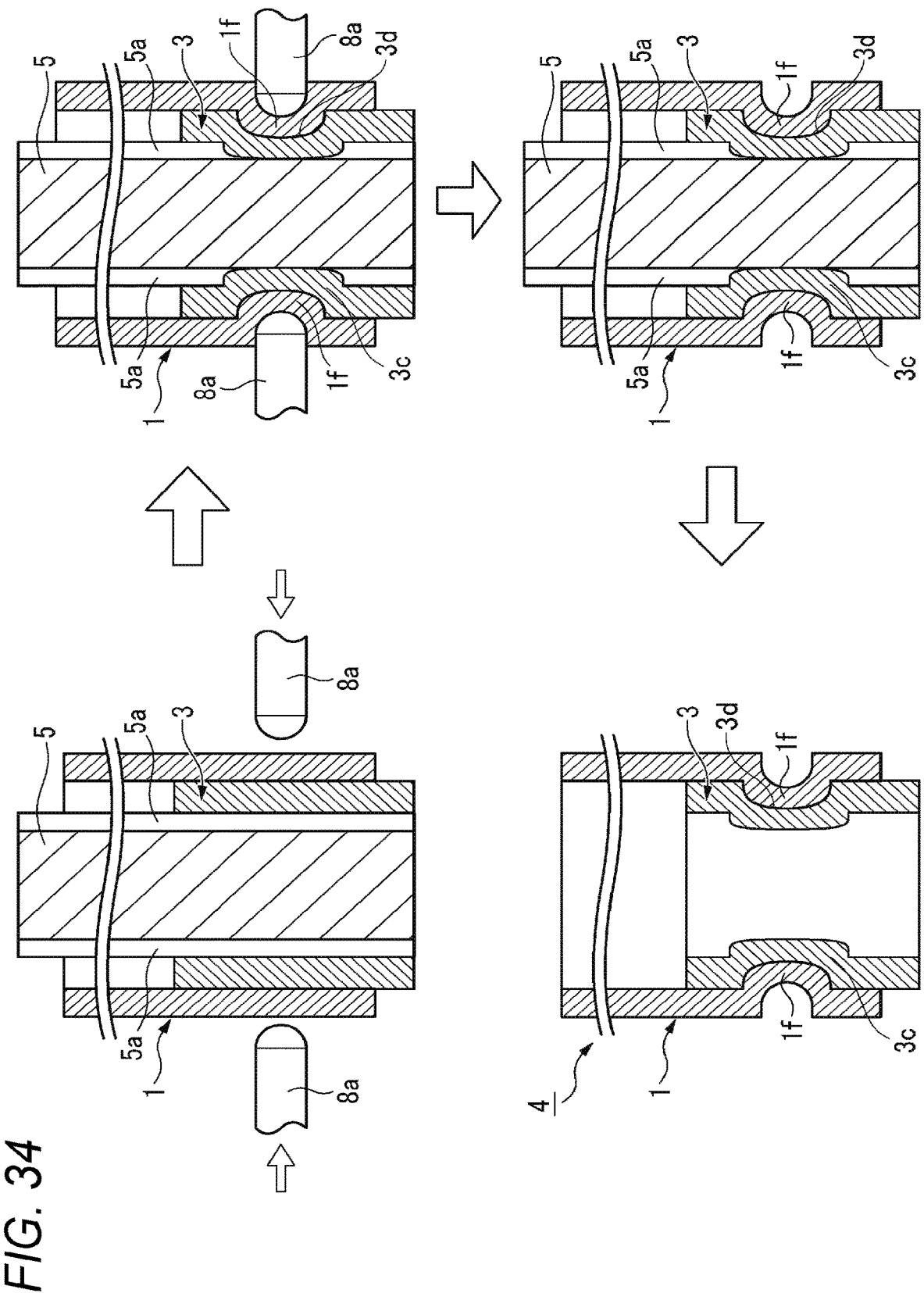
FIG. 34 is a vertical cross-sectional view showing a pipe, an auxiliary member, a core, and a plunger and showing the caulking and coupling step and a joined body detachment step in the method for joining different materials and the method for manufacturing a tubular member equipped with an auxiliary member for joining different materials according to the sixth embodiment.
Figure 35A:
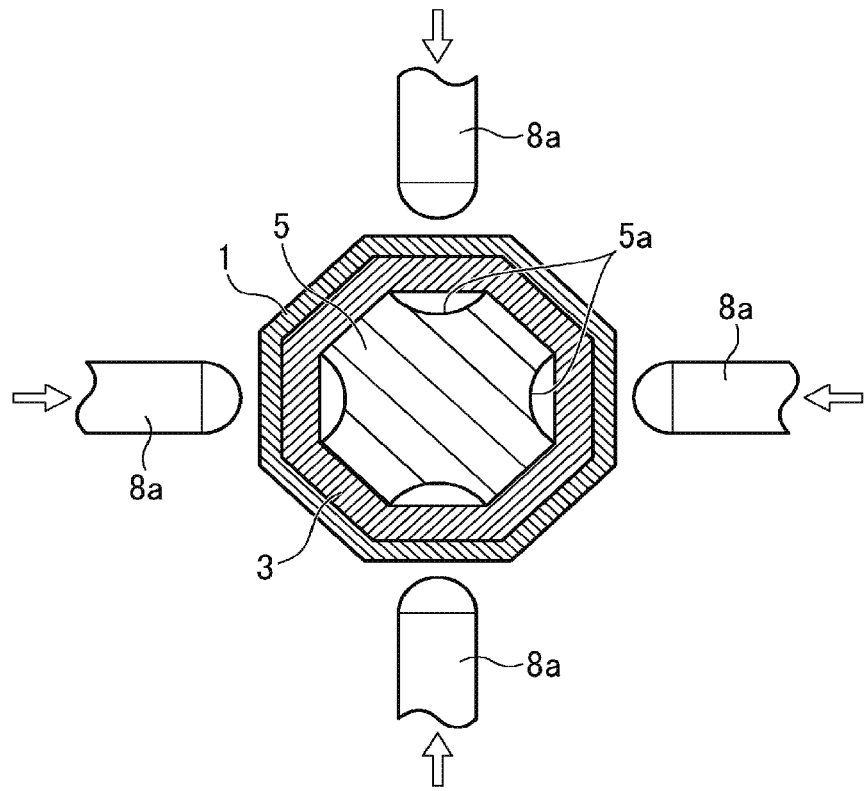
FIG. 35A is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a first modification of the sixth embodiment.
Figure 35B:
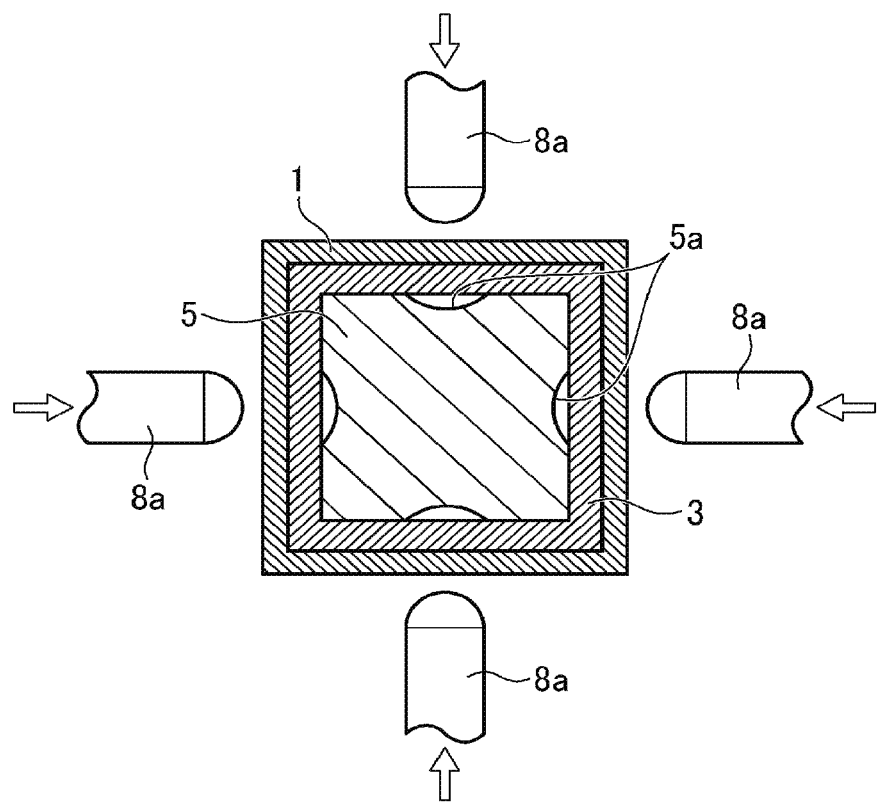
FIG. 35B is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a second modification of the sixth embodiment.
Figure 35C:
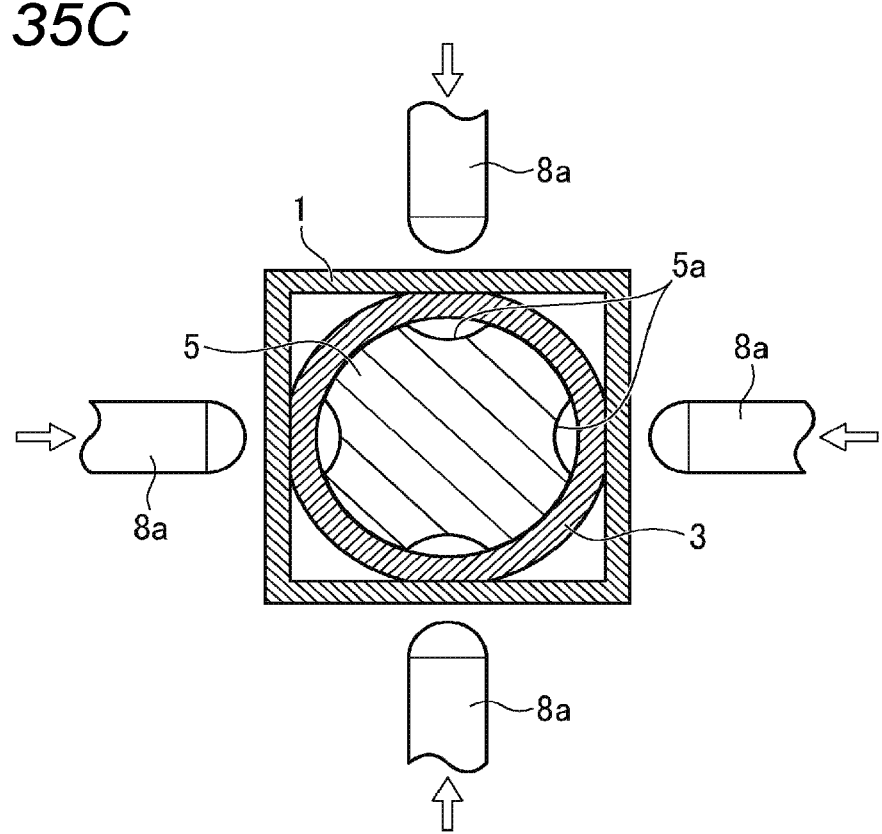
FIG. 35C is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a third modification of the sixth embodiment.
Figure 35D:
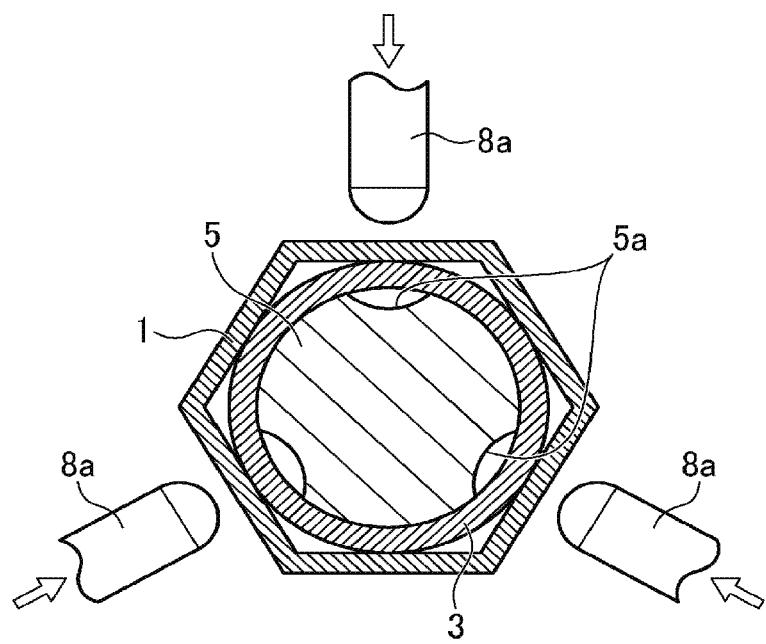
FIG. 35D is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a fourth modification of the sixth embodiment.
Figure 35E:
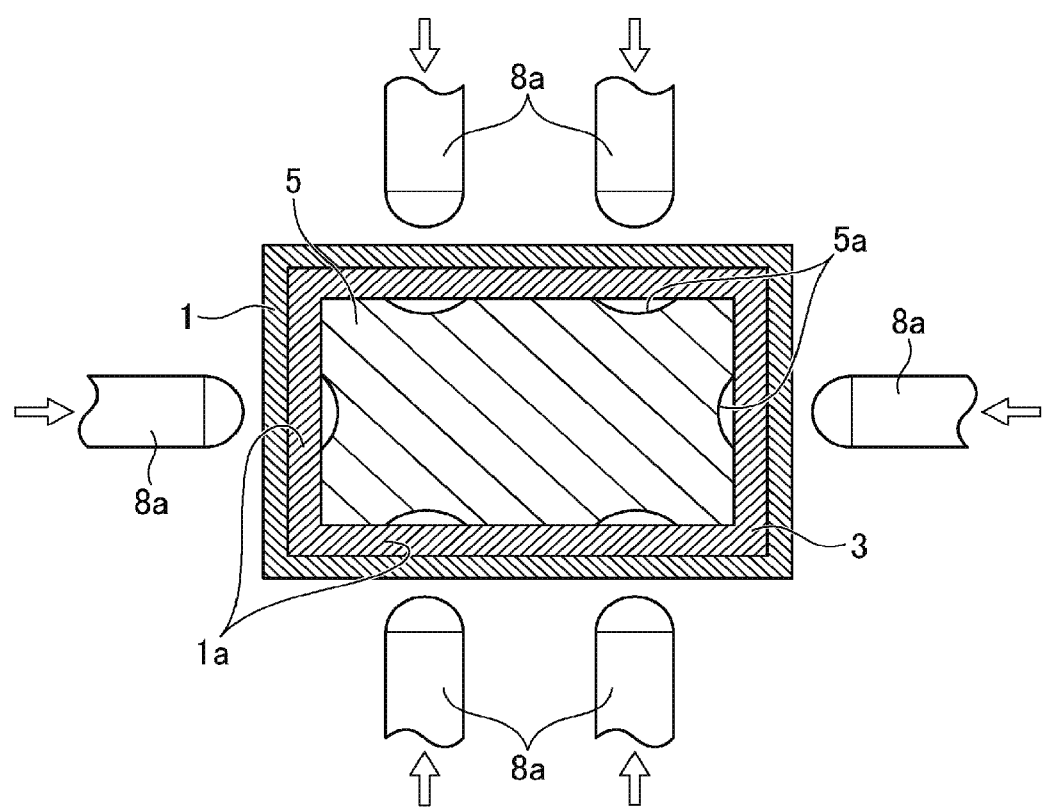
FIG. 35E is a horizontal cross-sectional view showing a pipe, an auxiliary member, a core, and a plunger and showing a caulking and coupling step in a method for joining different materials and a method for manufacturing a tubular member equipped with an auxiliary member for joining different materials according to a fifth modification of the sixth embodiment.

Different from the fourth and fifth embodiments, the circular tubular auxiliary member 3 that is not formed with a through hole is used in the sixth embodiment, as shown in FIG. 31. On the other hand, similar to the fifth embodiment, a cylindrical core that has a plurality of groove portions 5a extending along the axial direction is used as the core 5 as shown in FIG. 32. The plurality of groove portions 5a are formed at equal intervals in the circumferential direction, and the core 5 is attached to the base 31 such that the phases of the plurality of groove portions 5a and the phases of the protruding portions 8a of the plungers 8 coincide with each other. Therefore, the coupling device according to the present embodiment has the same configuration as the coupling device according to the fifth embodiment. Similar to the fourth and fifth embodiments, a circular tubular member is used as the auxiliary member 3.

Therefore, in the sixth embodiment, when the tubular pipe 1 is made of an aluminum alloy or a magnesium alloy and the flat plate material 2 is made of steel, the pipe 1 is disposed around the tubular auxiliary member 3 made of steel, and the pipe 1 and the auxiliary member 3 are set in the recessed portion 31a of the base 31. Then, the pump 35 is driven to displace the plunger 8 inward in the radial direction toward the peripheral wall of the pipe 1 that faces the plurality of groove portions 5a formed in the core 5 via the auxiliary member 3. Accordingly, a part of the peripheral wall of the pipe 1 is bulged inward in the radial direction to form a plurality of inward protruding portions 3c in the auxiliary member 3, and the inward protruding portions 3c respectively enter the plurality of groove portions 5a of the core 5. A part of the peripheral wall of the pipe 1 is formed with a plurality of fitting portions if that are respectively fitted into a plurality of recesses 3d formed by the plurality of inward protruding portions 3c of the auxiliary member 3, so that the pipe 1 and the auxiliary member 3 are caulked and coupled to each other.

Thereafter, similar to the fourth embodiment, the joined body 4 is detached from the core 5 and the base 31, and further the auxiliary member 3 and the plate material 2 are welded to each other, thereby joining the pipe 1 and the plate material 2 to each other via the auxiliary member 3 so as to obtain the joint 10 of different materials.

As described above, according to the method for manufacturing a tubular member equipped with an auxiliary member for joining different materials and the method for manufacturing the different-material joined joint in the sixth embodiment, the pipe 1 and the auxiliary member 3 are caulked and coupled to each other by using the core 5 having the groove portions 5a in the circular tubular auxiliary member 3 that is not formed with the through holes 3f. Therefore, it is not necessary to perform an operation of forming a through hole in the auxiliary member 3, it is also not necessary to perform an operation of determining phases when the pipe 1 is set in the coupling device 30B, the number of steps can be reduced, and manufacturing costs can be reduced.

In the present embodiment, even when the pipe 1 and the auxiliary member 3 that have the same cross-sectional shapes as those in FIGS. 26A to 26E in the fourth embodiment are combined as shown in FIGS. 35A to 35E, the pipe 1 and the auxiliary member 3 can be caulked and coupled to each other by using the core 5 having the groove portions 5a in the auxiliary member 3 that is not formed with the through holes 3f. In this case as well, there is an advantage that the number of manufacturing steps can be reduced.

Other configurations and functions are the same as those in the fourth embodiment.

Seventh Embodiment

Figure 36:
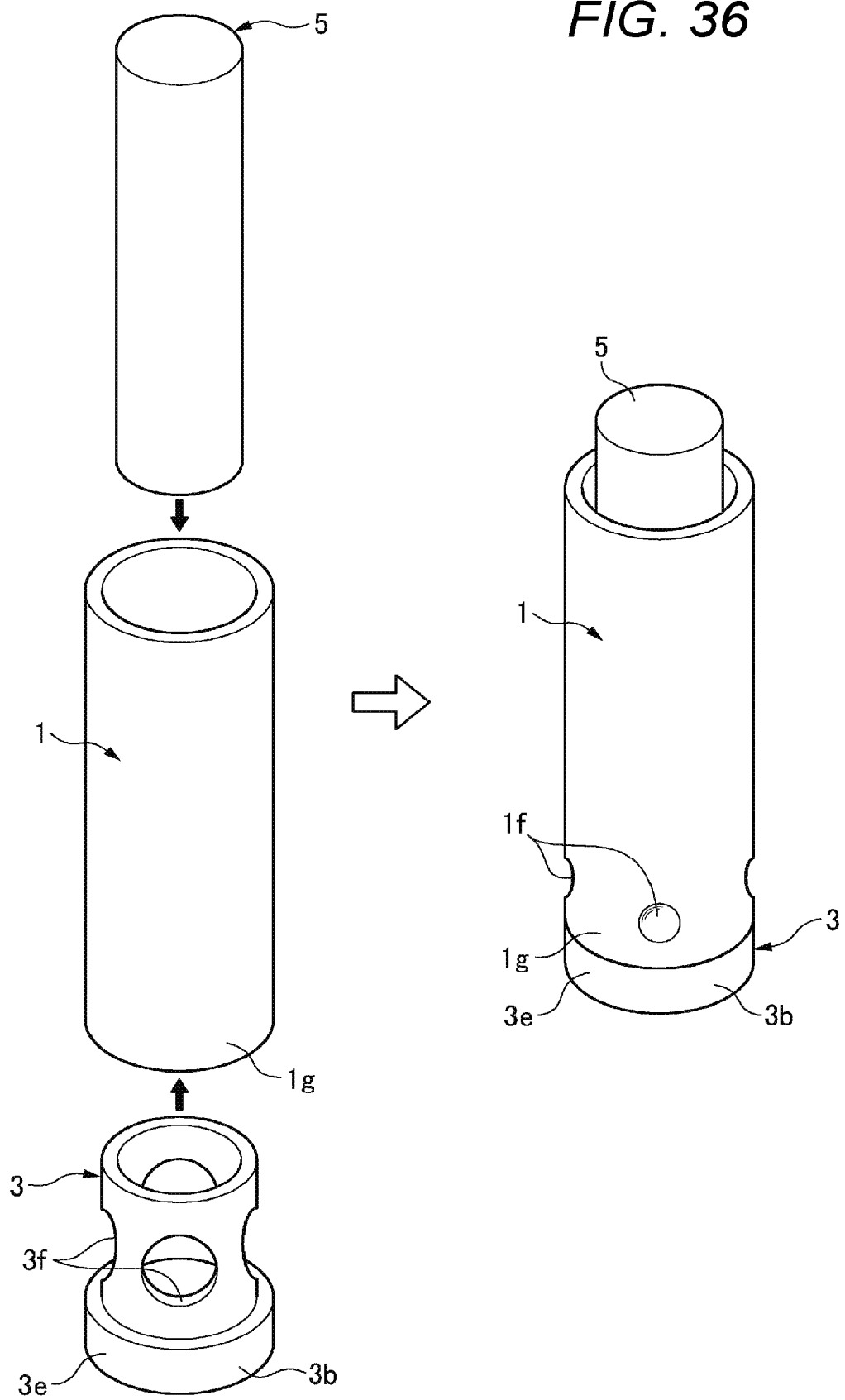
FIG. 36 is a perspective view showing a step of arranging a pipe, an auxiliary member, and a core, and showing an auxiliary member for joining different materials after caulking and coupling in a method for joining different materials and a method for manufacturing a tubular member equipped with an auxiliary member for joining different materials according to a seventh embodiment of the present invention.
Figure 37:
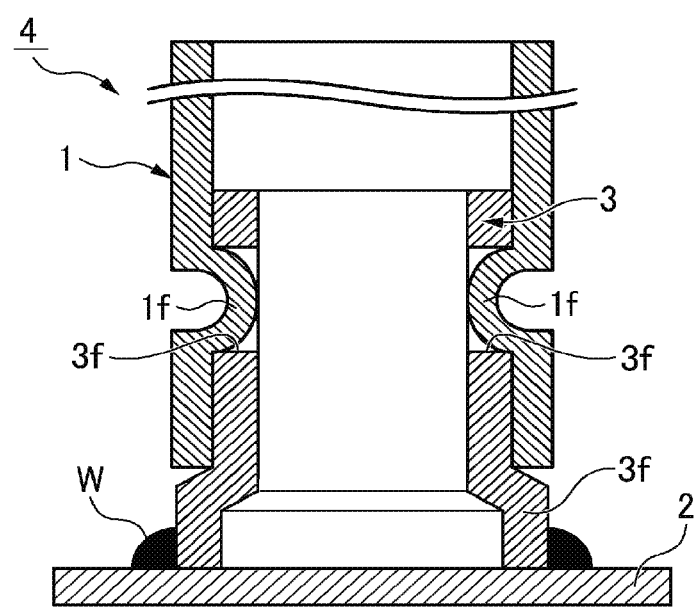
FIG. 37 is a cross-sectional view showing a joint of different materials after welding in the method for joining different materials according to the seventh embodiment.

Next, a method for joining different materials according to a seventh embodiment of the present invention will be described with reference to FIGS. 36 and 37. The description of the same or equivalent parts as those of the fourth embodiment will be omitted or simplified.

In the seventh embodiment, an expanded pipe portion 3e having an outer peripheral surface of which a diameter is larger than the inner diameter of the pipe 1 is provided at the axial end portion 3b of the auxiliary member 3. Specifically, an outer diameter of the expanded pipe portion 3e is formed to be substantially equal to the outer diameter of the pipe 1 in the present embodiment. Accordingly, when the pipe 1 is disposed around the auxiliary member 3, the axial end portion 1g of the pipe 1 is brought into contact with the expanded pipe portion 3e of the auxiliary member 3, that is, a stepped portion formed by the expanded pipe portion 3e, and the pipe 1 and the auxiliary member 3 can be positioned in the axial direction. As shown in FIG. 37, after the joined body 4 is formed, the expanded pipe portion 3e of the auxiliary member 3 and the plate material 2 are arc welded, and the welded metal W is formed at a corner portion between the expanded pipe portion 3e and the plate material 2.

Therefore, according to the present embodiment, since the expanded pipe portion 3e is provided in the auxiliary member 3, the pipe 1 can be easily disposed around the auxiliary member 3 in a state in which the axial end portion 3b of the auxiliary member 3 extends from the axial end portion 1g of the pipe 1 without providing a support member for the pipe 1.

Although the auxiliary member 3 requires a pipe expanding step for forming the expanded pipe portion 3e, there is no necking portion between the axial end portion 1g of the pipe 1 and the plate material 2, and the appearance of the joint 10 of different materials can be improved.

Other configurations and functions are the same as those in the fourth embodiment. The configuration having the expanded pipe portion according to the present embodiment is also applicable to the auxiliary member 3 according to the fifth and sixth embodiments.

The present invention is not limited to the embodiments described above, and modifications, improvements, and the like can be made as appropriate.

FIGS. 38 to 43B show modifications in which the pipe 1 is an inner member and the auxiliary member 3 is an outer member.

Figure 38:
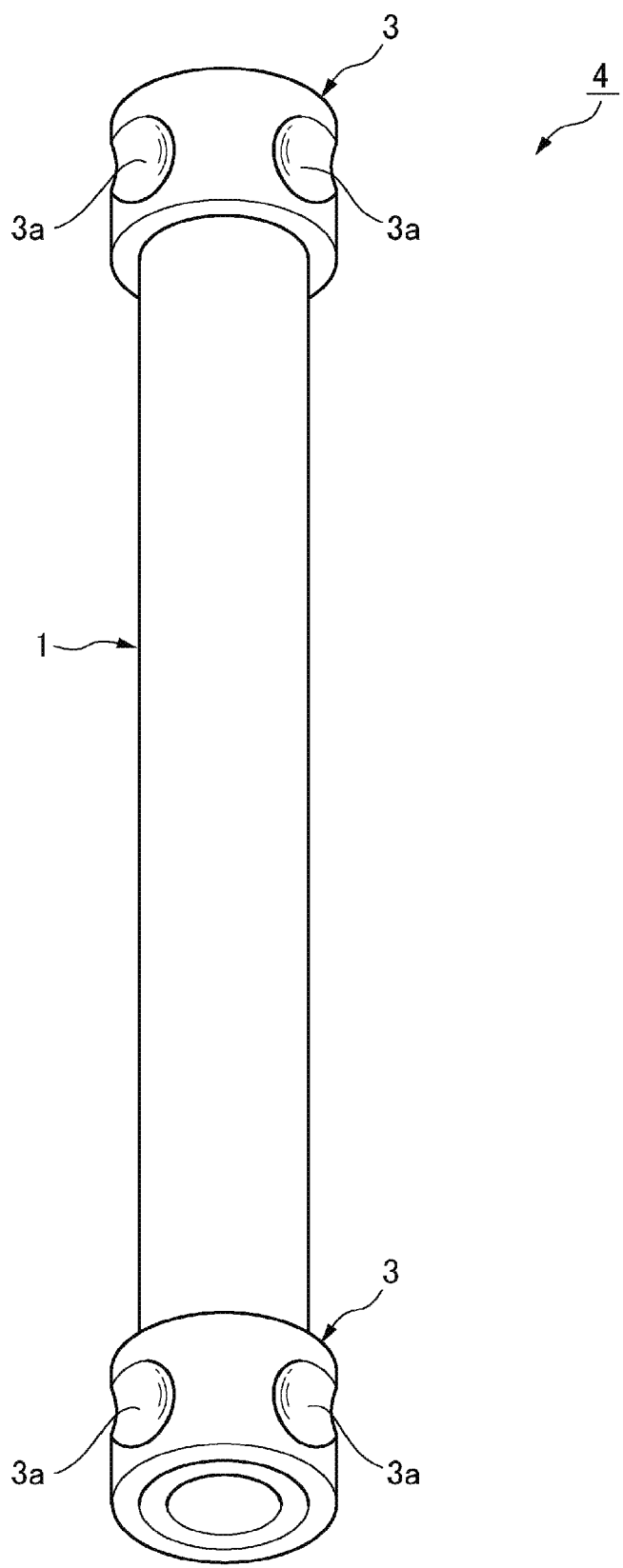
FIG. 38 is a perspective view showing a tubular member equipped with an auxiliary member for joining different materials according to a first modification of the present invention.

For example, the joined body 4 as shown in FIG. 38 may be configured by caulking and coupling a pair of auxiliary members 3 to both end portions of the pipe 1.

Figure 39:
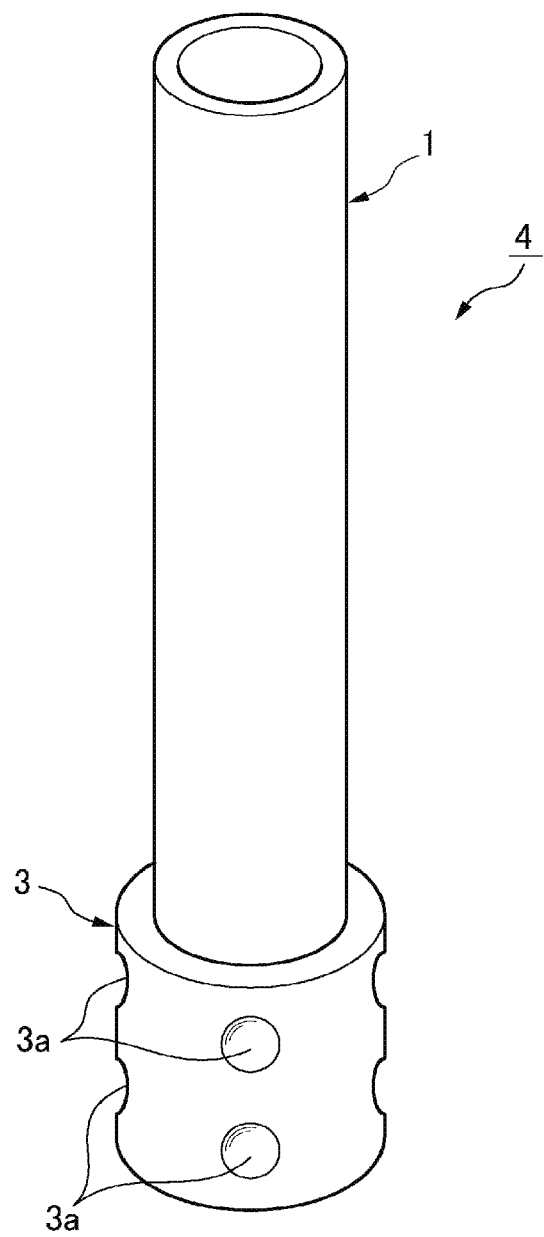
FIG. 39 is a perspective view showing a tubular member equipped with an auxiliary member for joining different materials according to a second modification of the present invention.
Figure 40:
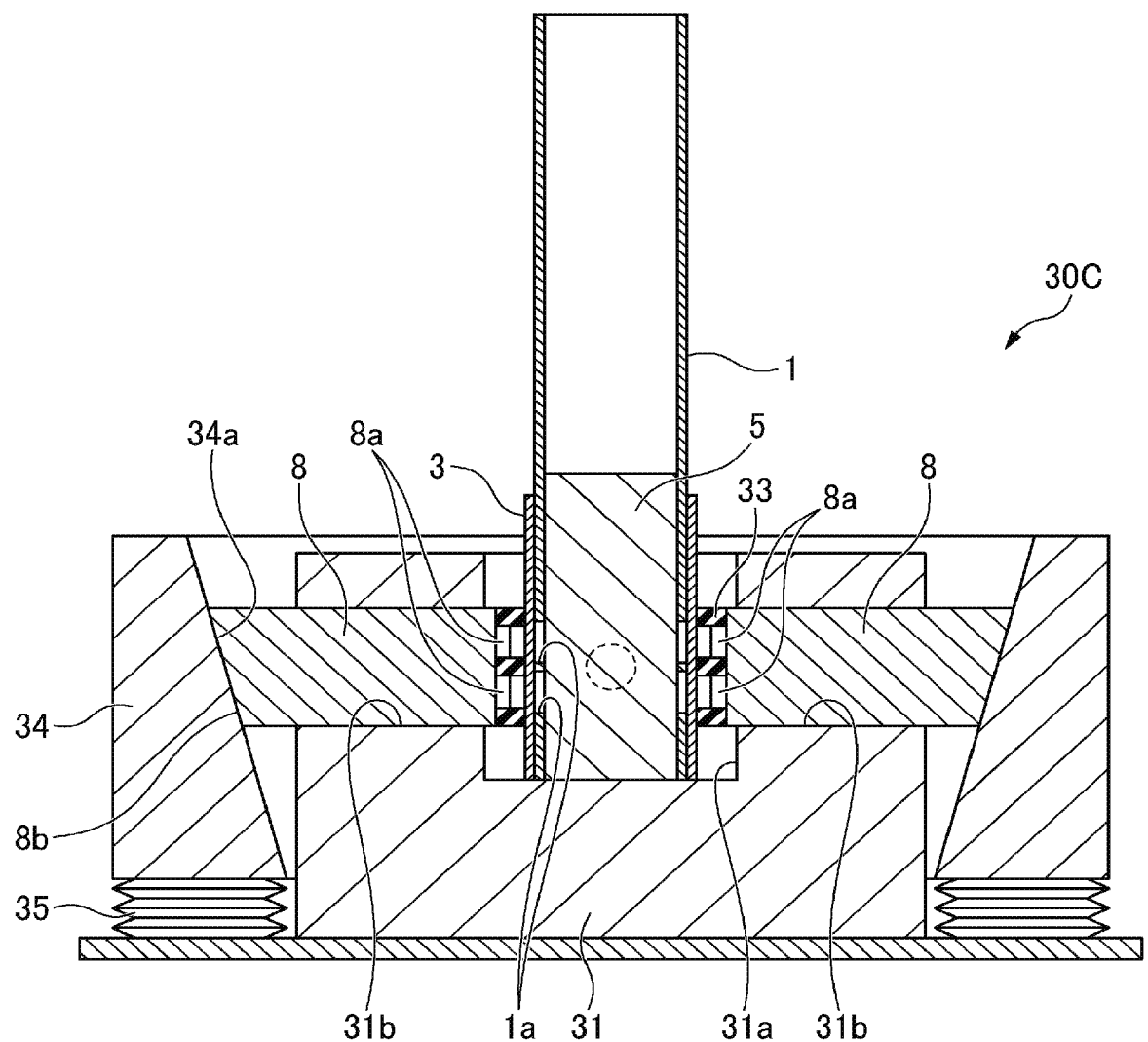
FIG. 40 is a cross-sectional view showing a coupling device for forming the tubular member equipped with an auxiliary member for joining different materials shown in FIG. 39.
Figure 41:
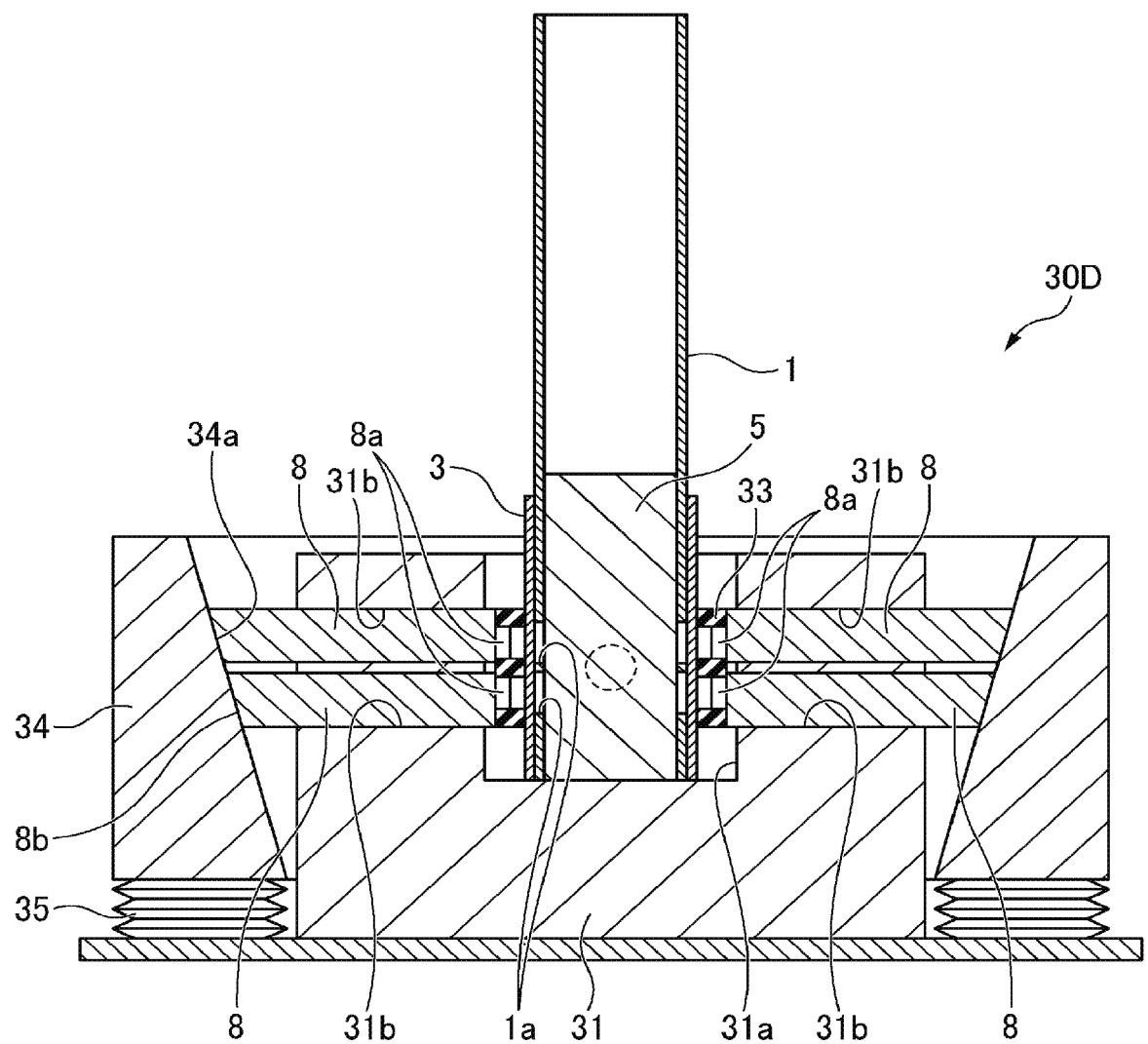
FIG. 41 is a cross-sectional view showing a modification of the coupling device for forming the tubular member equipped with an auxiliary member for joining different materials shown in FIG. 39.

As shown in FIG. 39, in the joined body 4 which is a tubular member equipped with an auxiliary member for joining different materials, a plurality of (two in the present embodiment) fitting portions 3a of the auxiliary member 3 may be formed side by side in the axial direction. In this case, in a coupling device 30C, the plunger 8 may have a plurality of protruding portions 8a in the vertical direction as shown in FIG. 40. Alternatively, in a coupling device 30D, a plurality of plungers 8 each having a protruding portion 8a may be respectively arranged in a plurality of support holes 31b arranged side by side in the axial direction, as shown in FIG. 41. The pipe 1 is provided with a plurality of through holes 1a arranged side by side in the axial direction.

In this manner, a plurality of caulked portions between the pipe 1 and the auxiliary member 3 are provided not only in the circumferential direction but also in the axial direction, so that the pipe 1 and the auxiliary member 3 can be more firmly joined to each other.

When a plurality of fitting portions 3a of the auxiliary member 3 are formed in the axial direction, phases in the circumferential direction of the fitting portions 3a at respective axial positions may be shifted from one another. For example, an upper fitting portion 3a and a lower fitting portion 3a may be alternately arranged at equal intervals in the circumferential direction. In this case, although not shown, a phase in the circumferential direction of the plunger 8 in an upper stage and a phase in the circumferential direction of the plunger 8 in a lower stage may be shifted from each other in the coupling device 30D.

Figure 42A:
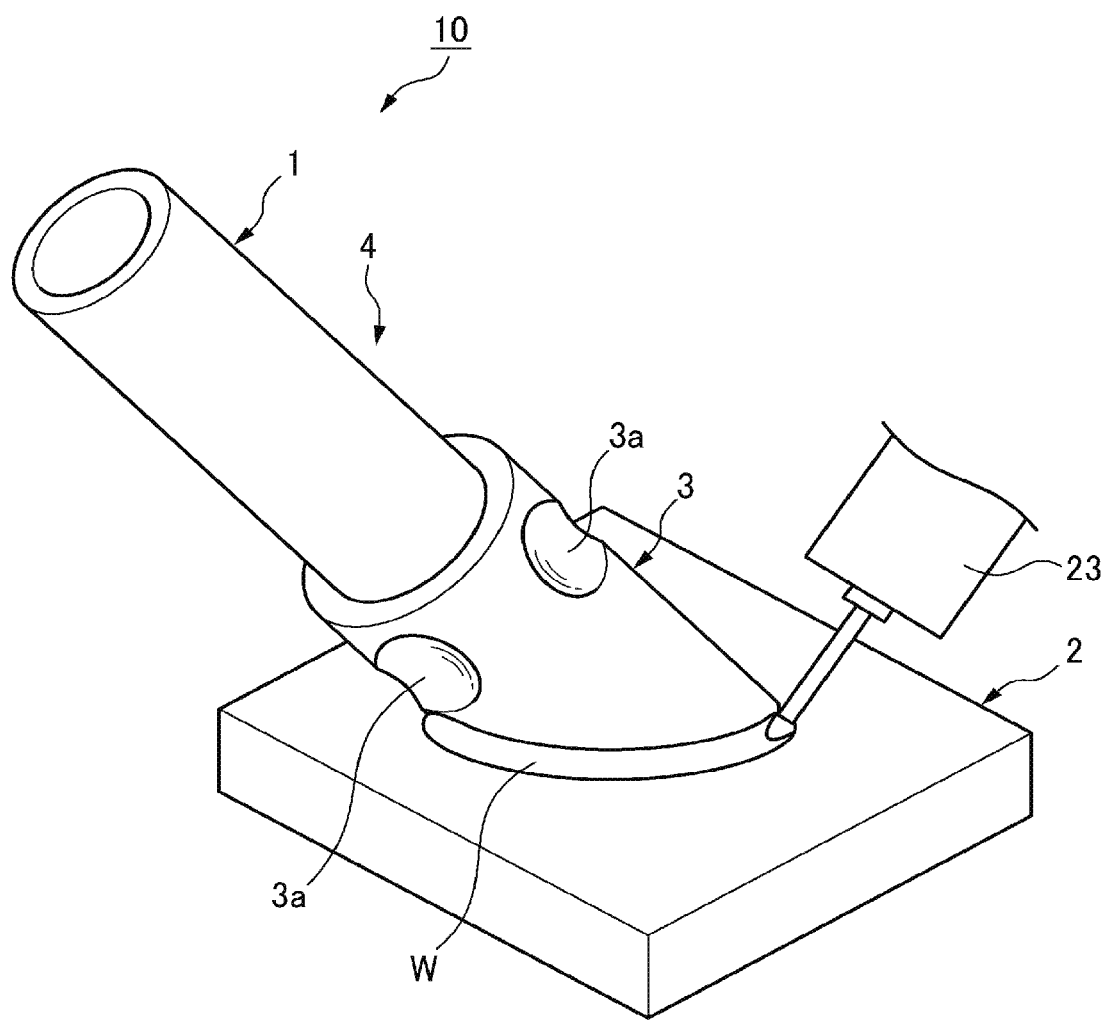
FIG. 42A is a perspective view showing a state in which a tubular member equipped with an auxiliary member and a plate material are joined to each other according to a third modification of the present invention.

Further, as shown in FIG. 42A, an end surface of the joined body 4 (end surfaces of the pipe 1 and the auxiliary member 3) may be inclined relative to the axial direction of the pipe 1, or the joined body 4 may be joined such that the axial direction of the joined body 4 is inclined relative to a normal line of the plate material 2. In this case, the end surfaces of the pipe 1 and the auxiliary member 3 may be obliquely cut after the pipe contraction processing of the pipe 1, or may be obliquely cut before the pipe contraction processing.

Figure 42B:
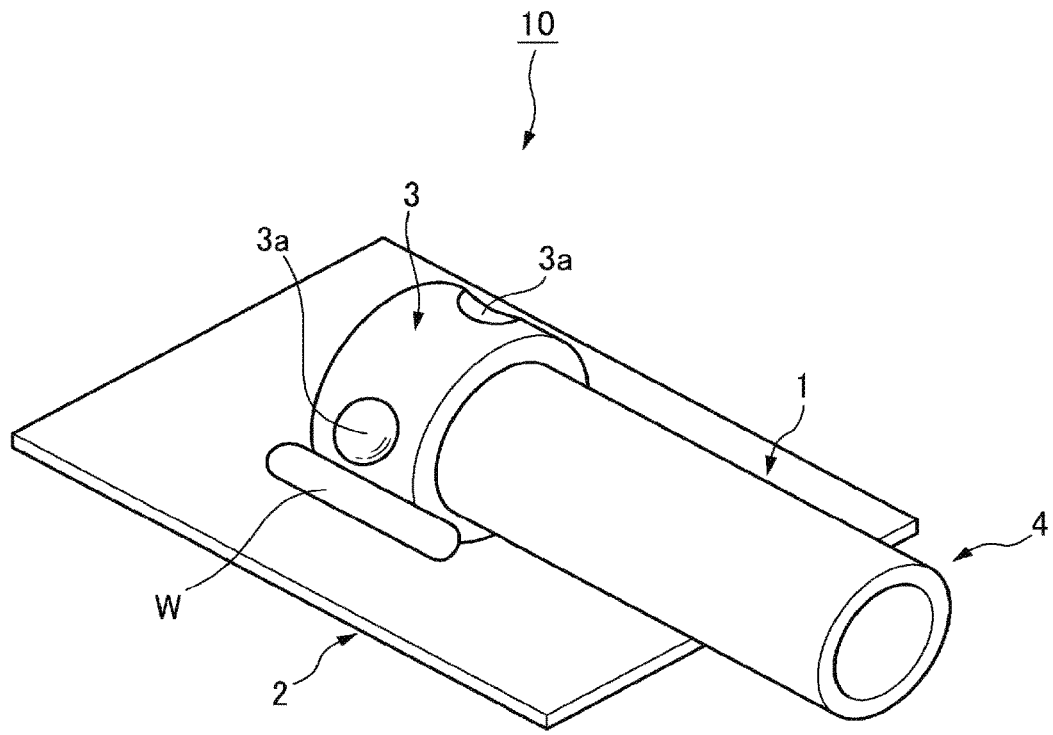
FIG. 42B is a perspective view showing a joint of different materials according to a fourth modification of the present invention.

As shown in FIG. 42B, the pipe 1 of the joined body 4 and the plate material 2 may be joined such that the axis of the pipe 1 is parallel to a surface of the plate material 2. In this case, the auxiliary member 3 and the plate material 2 are arc welded along the axial direction of the pipe 1 at two positions (only one side is shown) in the circumferential direction of the auxiliary member 3.

Figure 42C:
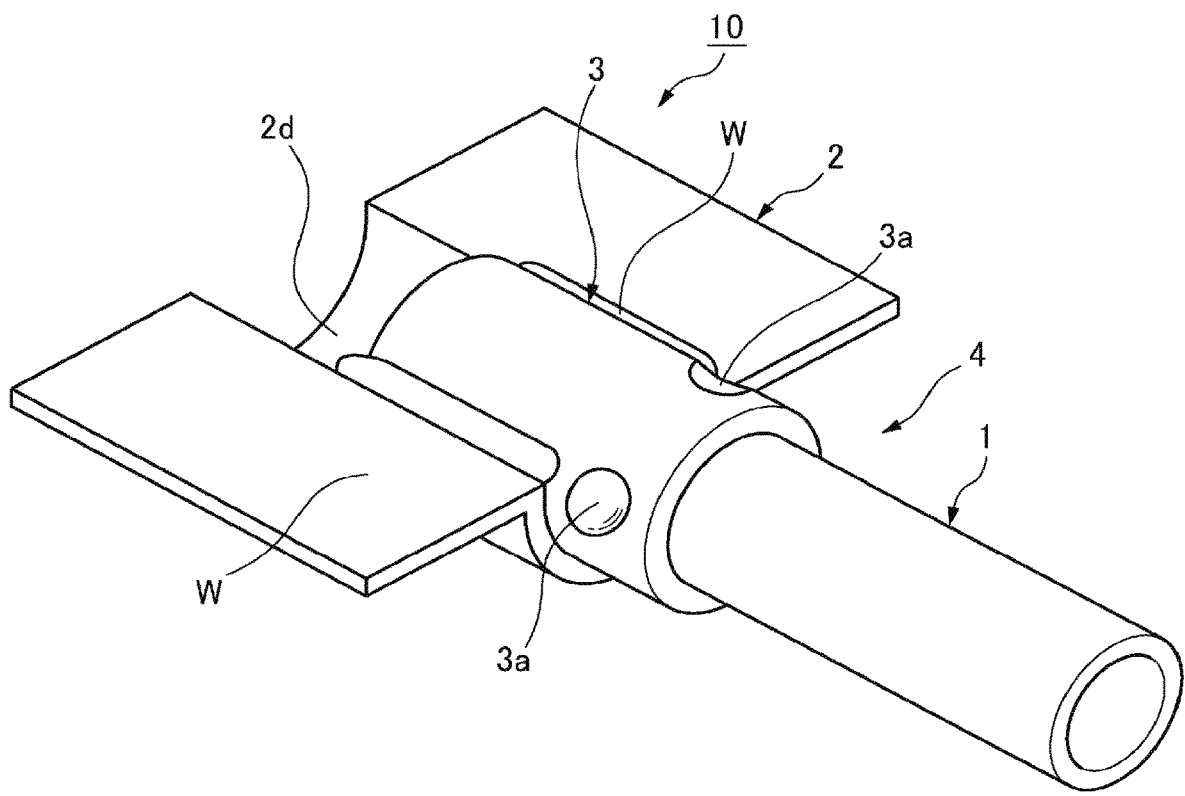
FIG. 42C is a perspective view showing a joint of different materials according to a fifth modification of the present invention.

As shown in FIG. 42C, the pipe 1 of the joined body 4 and the plate material 2 may be joined such that the pipe 1 is accommodated, via the auxiliary member 3, in a semi-cylindrical recessed portion 2d formed in the plate material 2. In this case, the auxiliary member 3 and the plate material 2 are arc welded along the axial direction of the pipe 1 at two positions at a boundary portion between the recessed portion 2d and the flat surface of the plate material 2.

Figure 42D:
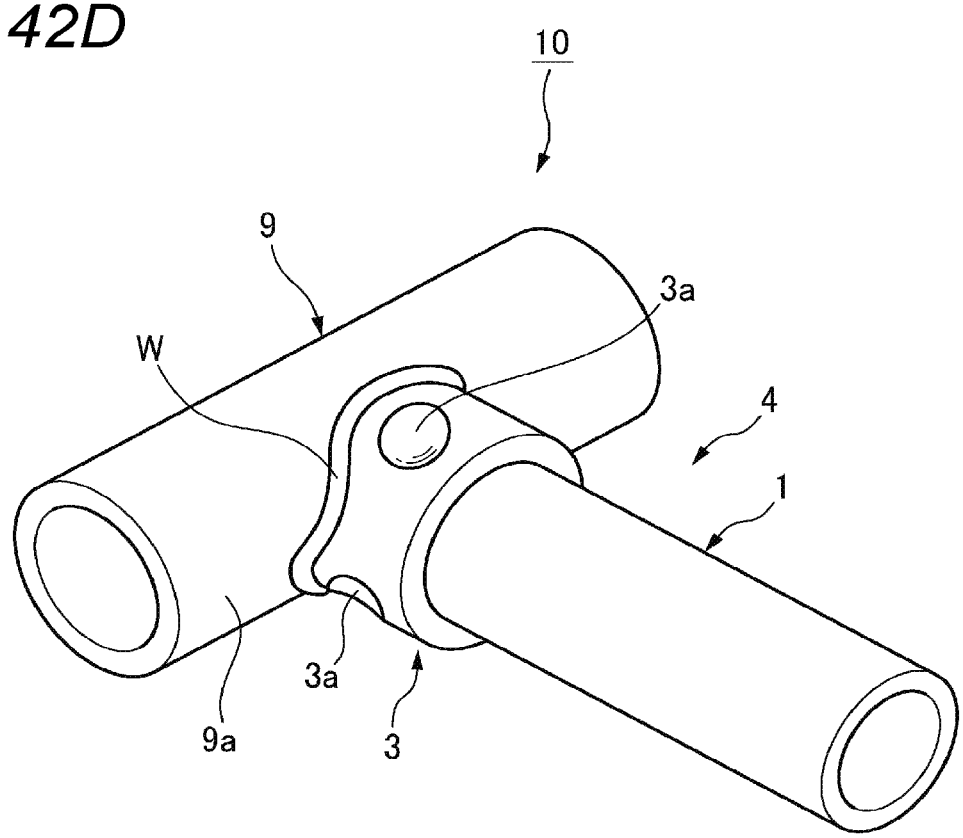
FIG. 42D is a perspective view showing a joint of different materials according to a sixth modification of the present invention.

As shown in FIG. 42D, the pipe 1 of the joined body 4 and another pipe 9 may be joined to each other via the auxiliary member 3 such that the pipe 1 and the pipe 9 are orthogonal to each other. In this case, an end surface of the auxiliary member 3 is processed so as to be in contact with an outer peripheral surface 9a of the pipe 9 over the entire periphery, and arc welding is performed along the end surface of the auxiliary member 3.

Figure 42E:
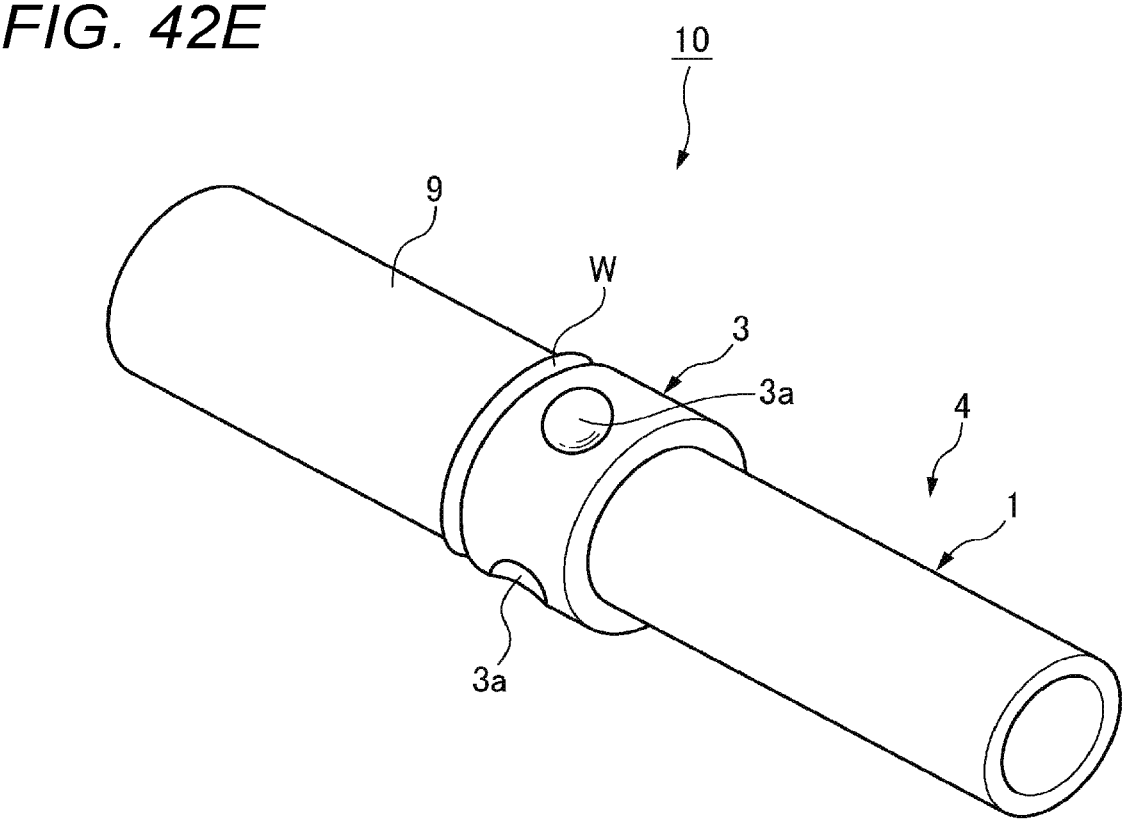
FIG. 42E is a perspective view showing a joint of different materials according to a seventh modification of the present invention.

As shown in FIG. 42E, the pipe 1 of the joined body 4 and the pipe 9 may be joined to each other via the auxiliary member 3 such that the pipe 1 and the pipe 9 are linearly coupled to each other. In this case, an end surface of the auxiliary member 3 and an end surface of the pipe 9 are brought into contact with each other over the entire periphery, and arc welding is performed along the end surfaces. The pipe 1 and the pipe 9 may have the same diameter or may have different diameters.

Figure 43A:
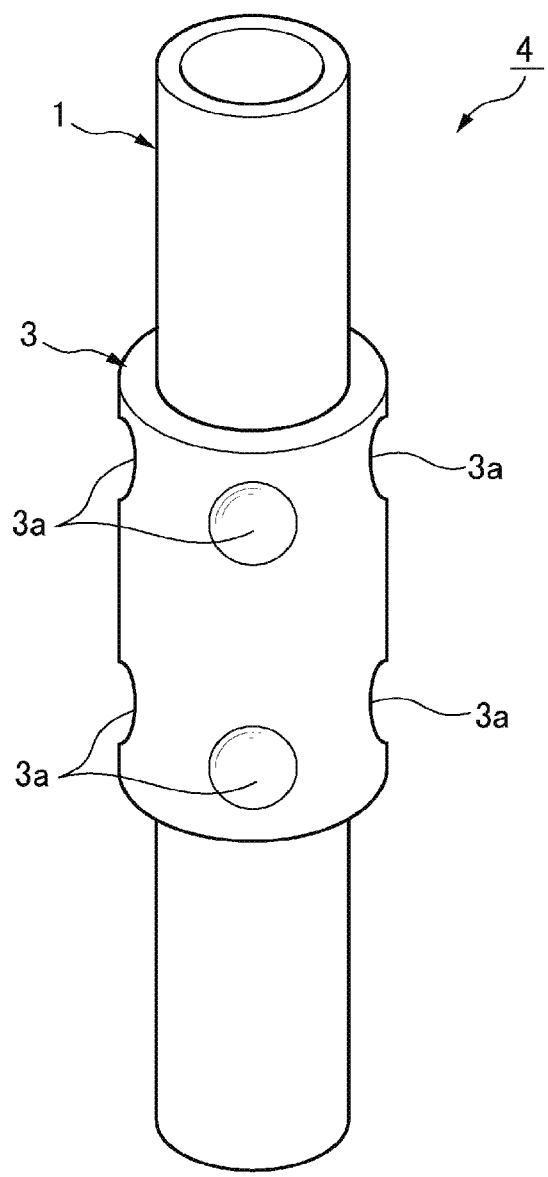
FIG. 43A is a perspective view showing a tubular member equipped with an auxiliary member for joining different materials according to an eighth modification of the present invention.
Figure 43B:
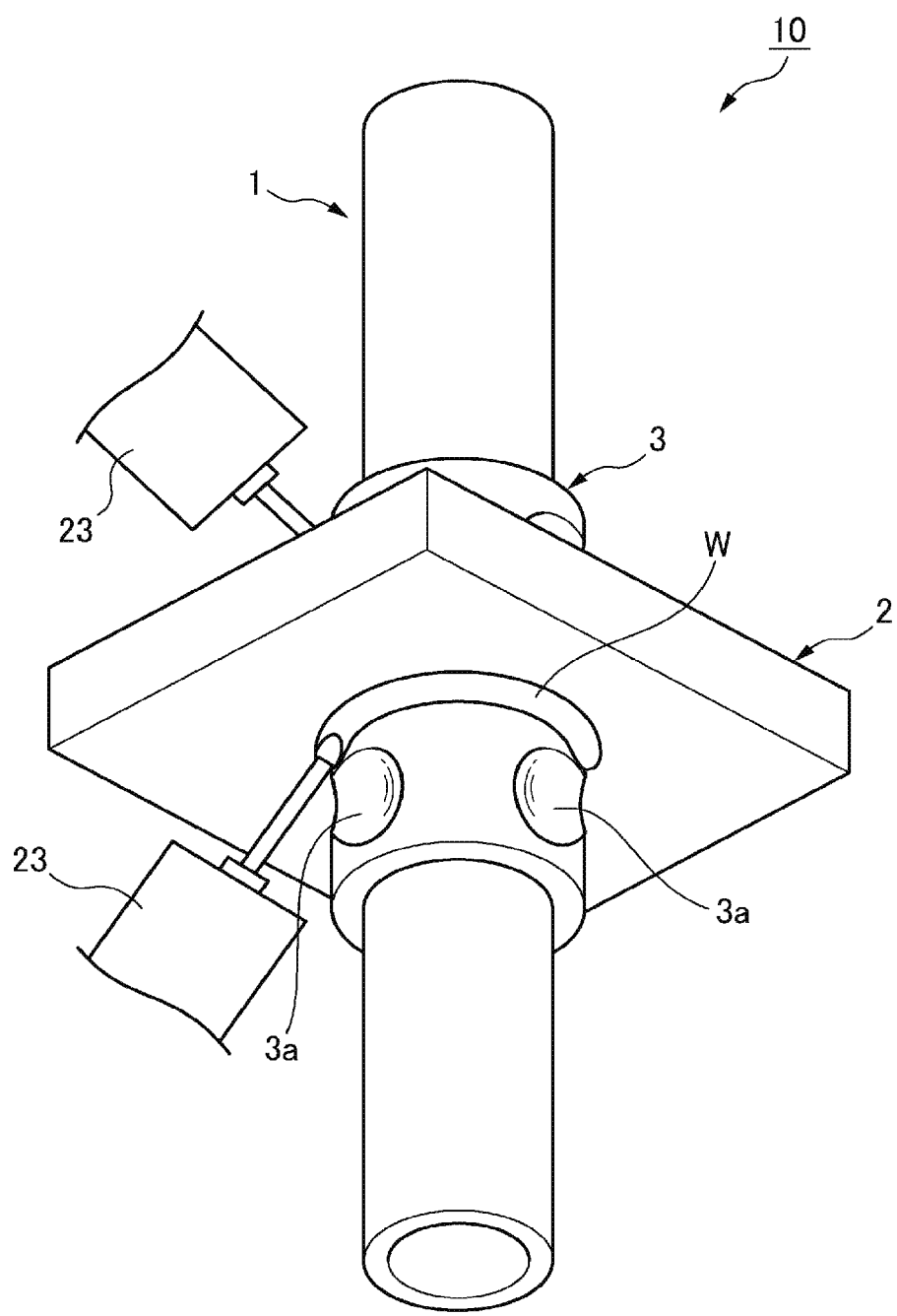
FIG. 43B is a perspective view showing a method for joining different materials and a joint of different materials according to an eighth modification of the present invention.

As shown in FIG. 43A, the joined body 4 in which the auxiliary member 3 is disposed at an intermediate portion of the pipe 1 in the axial direction can be formed such that the fitting portions 3a are positioned at two end sides of the auxiliary member 3 in the axial direction. Therefore, as shown in FIG. 43B, the plate material 2 formed with an opening is inserted around the auxiliary member 3, and the corner portions between the plate material 2 and the auxiliary member 3 are joined by arc welding or the like at intermediate portions in the axial direction of the fitting portions 3a positioned at two sides in the axial direction of the plate material 2, so that the plate material 2 can be joined to the intermediate portion in the axial direction of the pipe 1.

FIGS. 44 to 46E show modifications in which the pipe 1 is an outer member and the auxiliary member 3 is an inner member.

Figure 44:
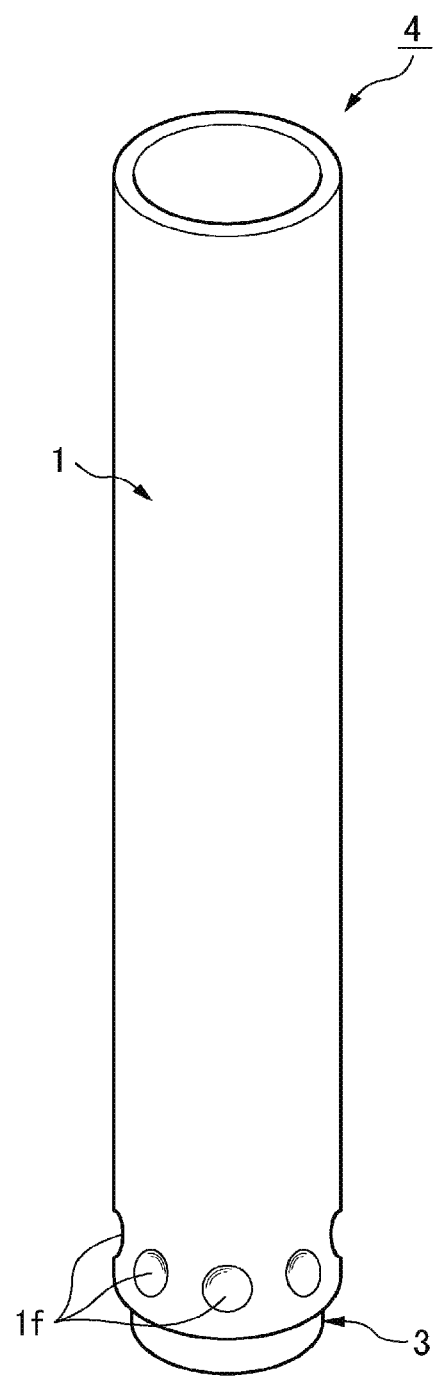
FIG. 44 is a perspective view showing a tubular member equipped with an auxiliary member for joining different materials according to a ninth modification of the present invention.

For example, the plurality of holes 3f may be provided in the auxiliary member 3 in at least two positions depending on a required joining strength with the pipe 1, and the number of the holes 3f is not limited to four in the embodiments described above, and may be, for example, eight as shown in FIG. 44.

Figure 45:
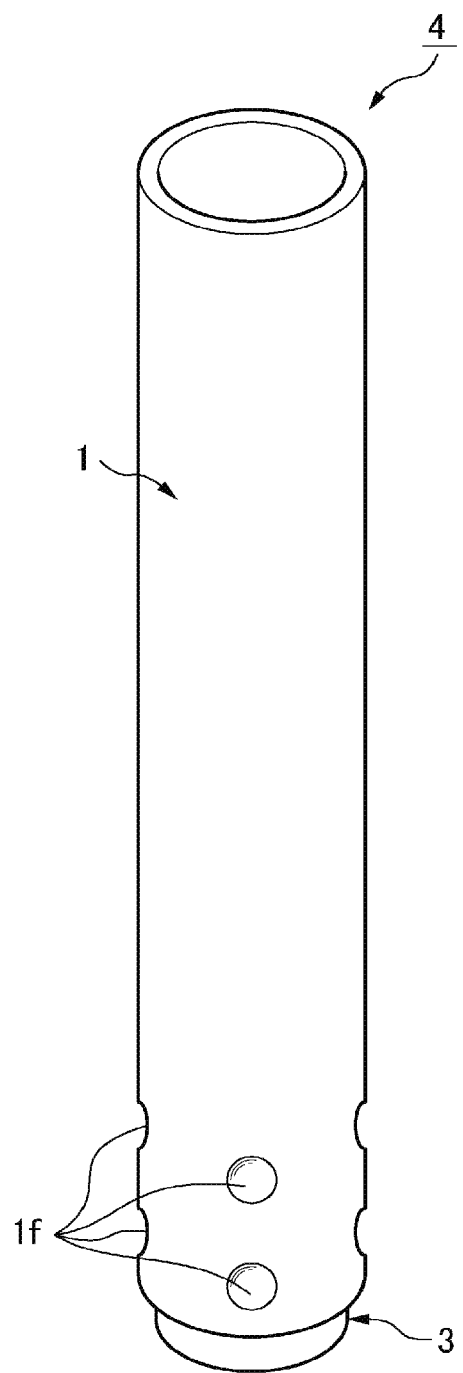
FIG. 45 is a perspective view showing a tubular member equipped with an auxiliary member for joining different materials according to a tenth modification of the present invention.

As shown in FIG. 45, in the joined body 4 which is a tubular member equipped with an auxiliary member for joining different materials, a plurality of (two in the present embodiment) fitting portions if of the pipe 1 may be formed side by side in the axial direction. In this case, although not shown, the plunger 8 having two protruding portions 8a of the coupling device 30C may be applied to the coupling device 30B according to the fourth embodiment. The auxiliary member 3 is provided with a plurality of through holes 3f arranged side by side in the axial direction.

In this manner, a plurality of caulked portions between the pipe 1 and the auxiliary member 3 are provided not only in the circumferential direction but also in the axial direction, so that the pipe 1 and the auxiliary member 3 can be more firmly joined to each other.

Figure 46A:
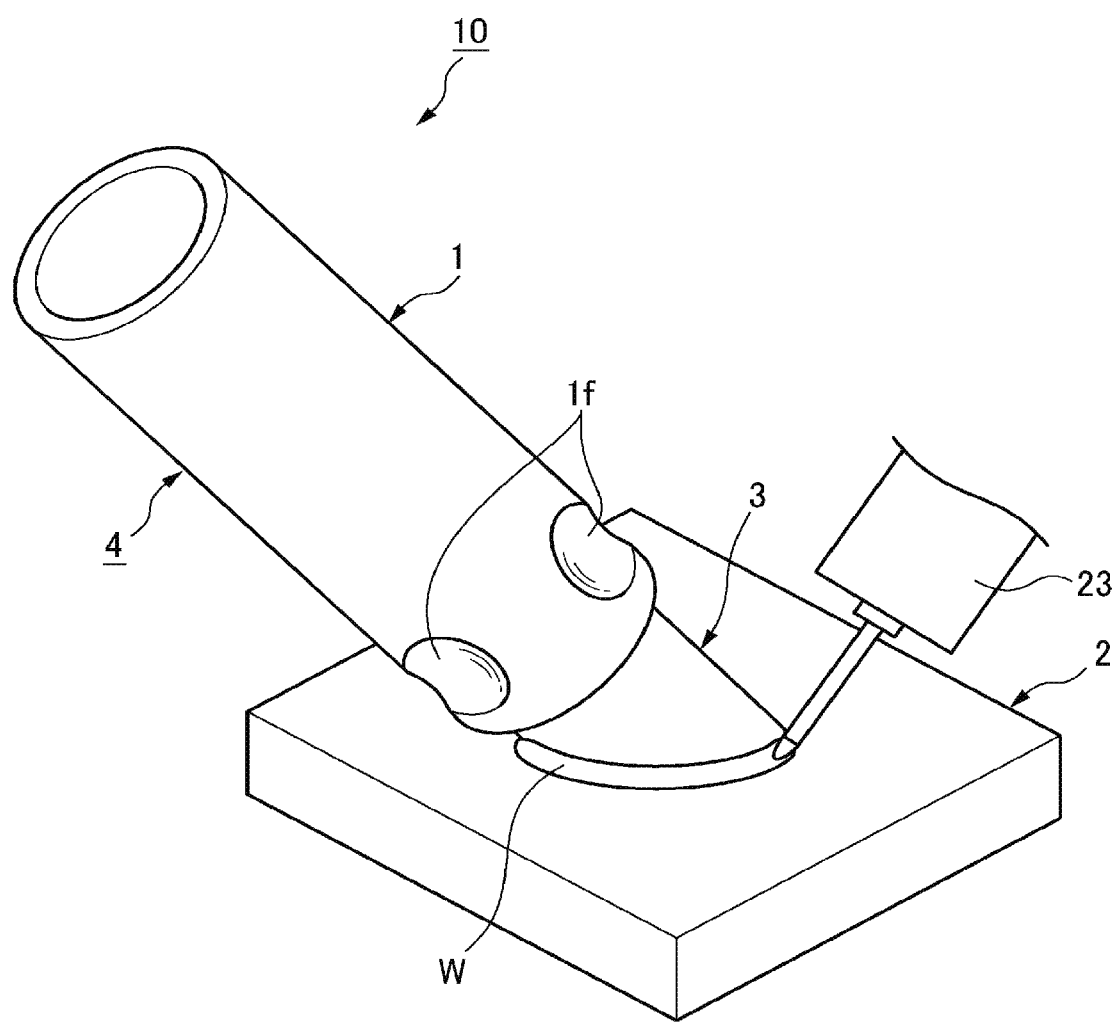
FIG. 46A is a perspective view showing a state in which a tubular member equipped with an auxiliary member and a plate material are joined to each other according to an eleventh modification of the present invention.

Further, as shown in FIG. 46A, an end surface of the joined body 4 (end surfaces of the pipe 1 and the auxiliary member 3) may be inclined relative to the axial direction of the pipe 1, or the joined body 4 may be joined such that the axial direction of the joined body 4 is inclined relative to a normal line of the plate material 2. In this case, the end surfaces of the pipe 1 and the auxiliary member 3 may be obliquely cut after the pipe contraction processing of the pipe 1, or may be obliquely cut before the pipe contraction processing.

Figure 46B:
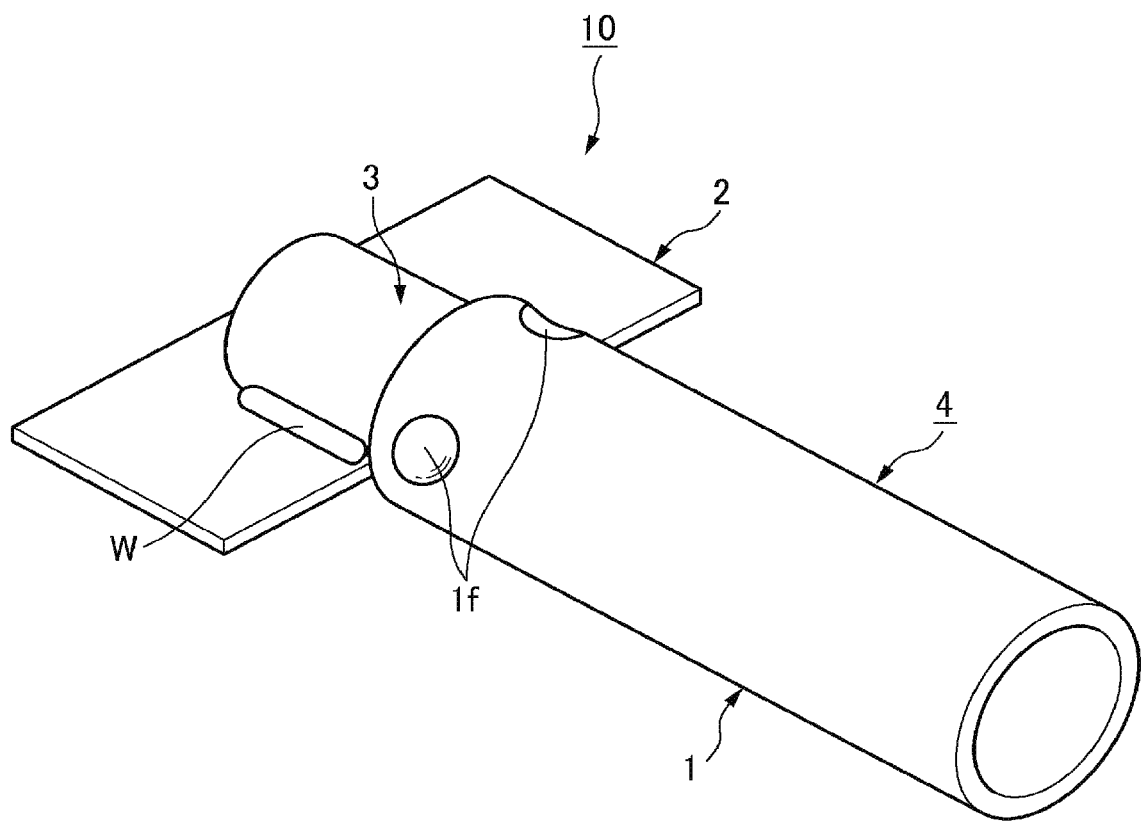
FIG. 46B is a perspective view showing a joint of different materials according to a twelfth modification of the present invention.

As shown in FIG. 46B, the pipe 1 of the joined body 4 and the plate material 2 may be joined such that the axis of the pipe 1 is parallel to a surface of the plate material 2. In this case, the auxiliary member 3 and the plate material 2 are arc welded along the axial direction of the pipe 1 at two positions (only one side is shown) in the circumferential direction of the auxiliary member 3.

Figure 46C:
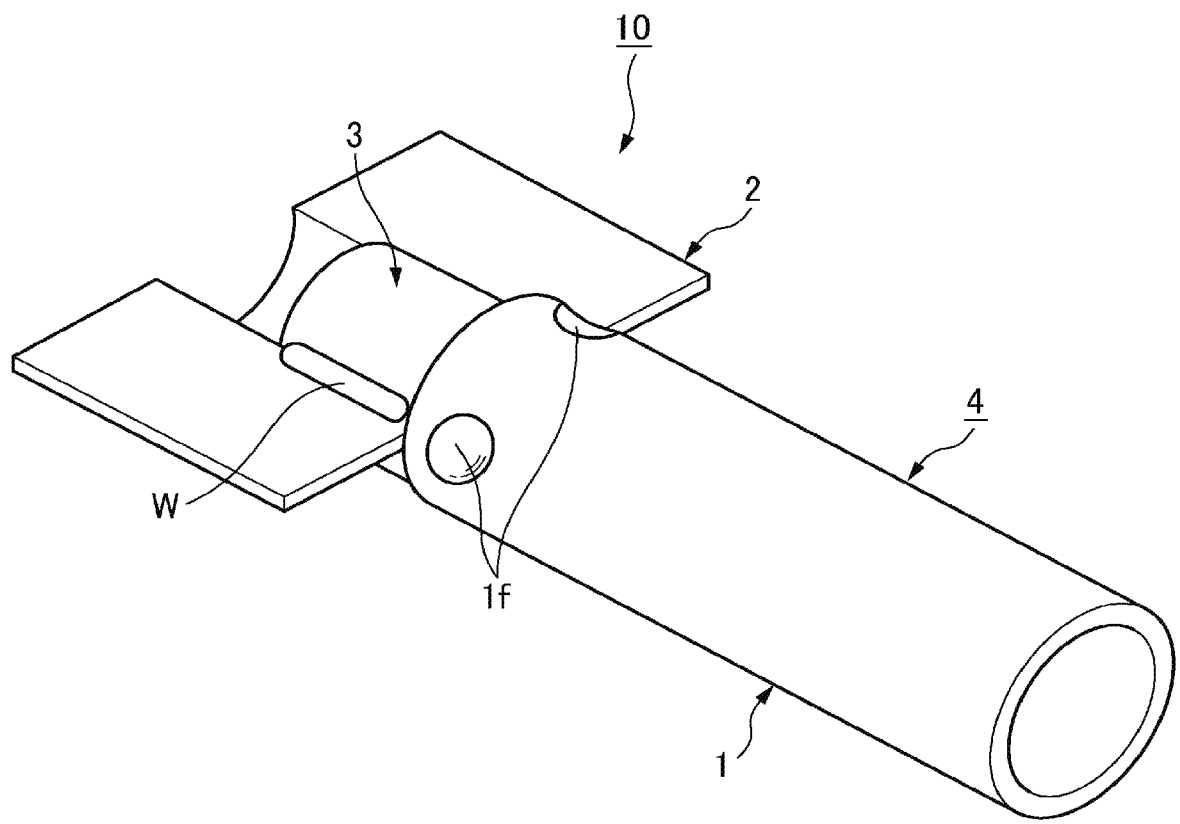
FIG. 46C is a perspective view showing a joint of different materials according to a thirteenth modification of the present invention.

As shown in FIG. 46C, the pipe 1 of the joined body 4 and the plate material 2 may be joined such that the pipe 1 is accommodated, via the auxiliary member 3, in the semicylindrical recessed portion 2d formed in the plate material 2. In this case, the auxiliary member 3 and the plate material 2 are arc welded along the axial direction of the pipe 1 at two positions at a boundary portion between the recessed portion 2d and the flat surface of the plate material 2.

Figure 46D:
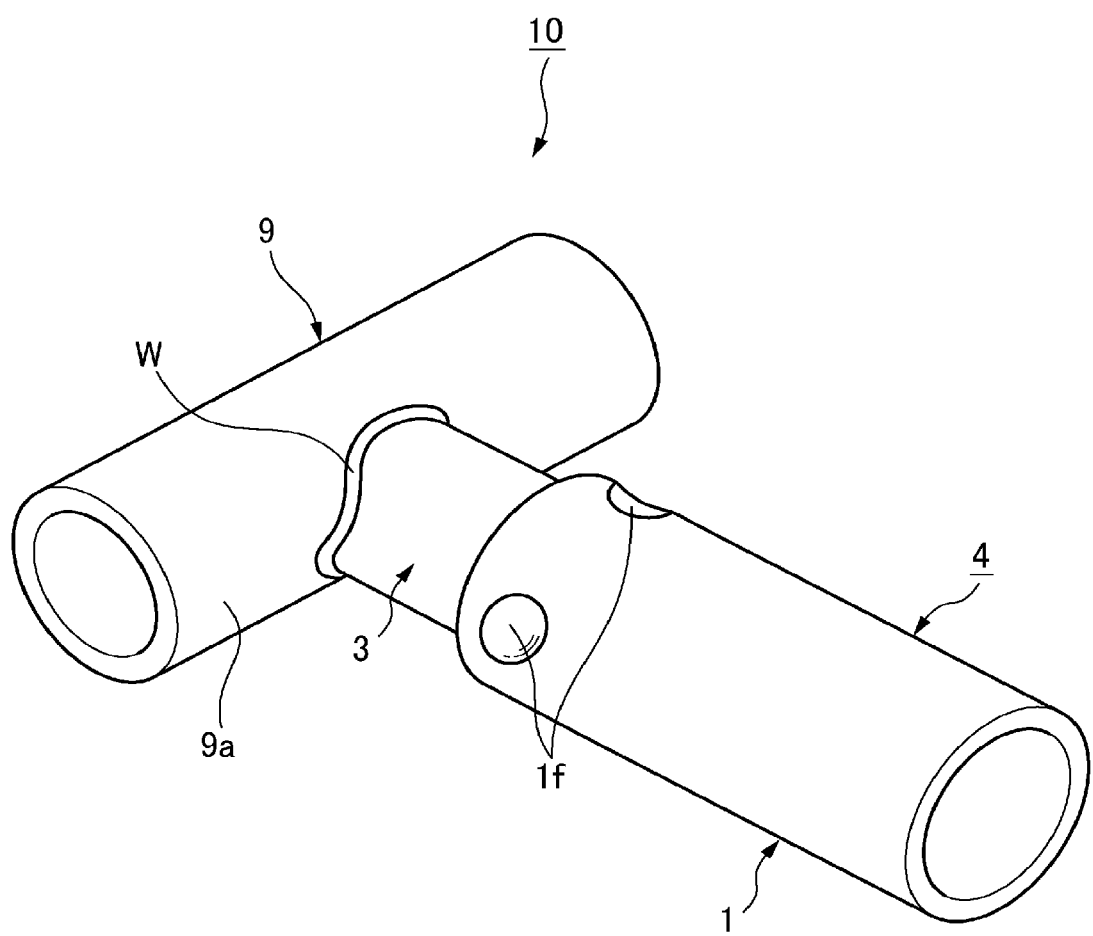
FIG. 46D is a perspective view showing a joint of different materials according to a fourteenth modification of the present invention.

As shown in FIG. 46D, the pipe 1 of the joined body 4 and another pipe 9 may be joined to each other via the auxiliary member 3 such that the pipe 1 and the pipe 9 are orthogonal to each other. In this case, an end surface of the auxiliary member 3 is processed so as to be in contact with an outer peripheral surface 9a of the pipe 9 over the entire periphery, and arc welding is performed along the end surface of the auxiliary member 3.

Figure 46E:
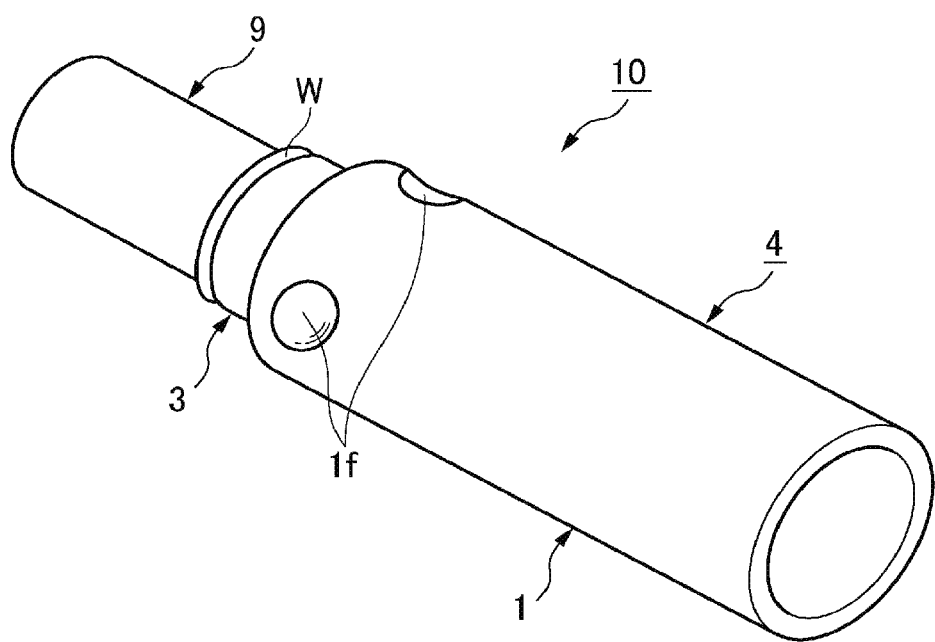
FIG. 46E is a perspective view showing a joint of different materials according to a fifteenth modification of the present invention.

As shown in FIG. 46E, the pipe 1 of the joined body 4 and the pipe 9 may be joined to each other via the auxiliary member 3 such that the pipe 1 and the pipe 9 are linearly coupled to each other. In this case, an end surface of the auxiliary member 3 and an end surface of the pipe 9 are brought into contact with each other over the entire periphery, and arc welding is performed along the end surfaces. The pipe 1 and the pipe 9 may have the same diameter or may have different diameters.

Further, although the core 5 is made of steel in the first to seventh embodiments, the core according to the present invention is not limited thereto, and the core may be made of a hard material such as a non-ferrous alloy and ceramic.

Figure 47:
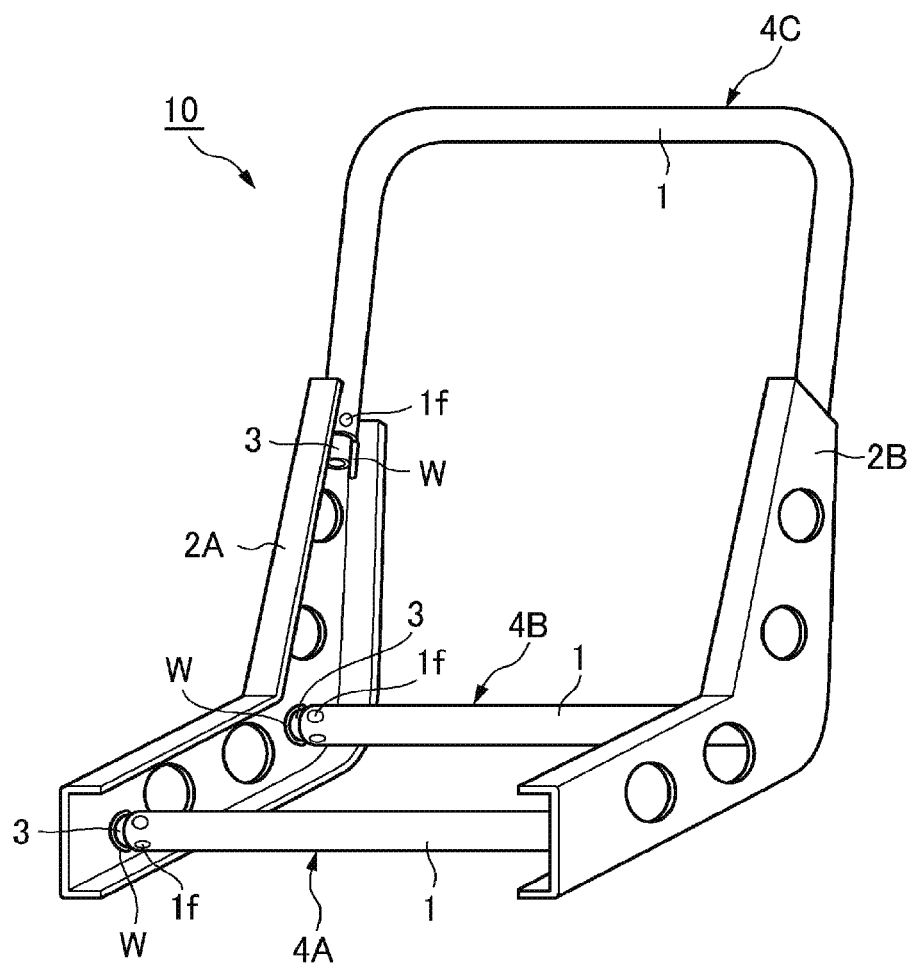
FIG. 47 is a perspective view showing a seat frame for an automobile to which the joint of different materials according to the present invention is applied.

FIG. 47 shows a seat frame for an automobile as an example to which the joint 10 for different materials according to the present invention is applied. Specifically, joined bodies 4A, 4B, and 4C formed by coupling the pipe (a first member) 1 made of an aluminum alloy and the auxiliary member 3 made of steel serve as beam members (coupling members), and the joined bodies 4A, 4B, and 4C are joined, by arc welding, to a pair of press plate members (side frames, second members) 2A and 2B that are made of steel and are disposed in a manner of being separated from each other and facing each other, thereby obtaining the seat frame for the automobile. In this case, in the joined bodies 4A, 4B, and 4C, a pair of auxiliary members 3 are provided at both end portions of the pipe 1, and the auxiliary members 3 are respectively joined to the press plate members 2A and 2B. The seat frame having the above-described configuration can be reduced in weight as compared with a general seat frame in which a metal pipe made of steel is used as a beam member, and can be manufactured by an arc welding device as in the related art.

Figure 48:
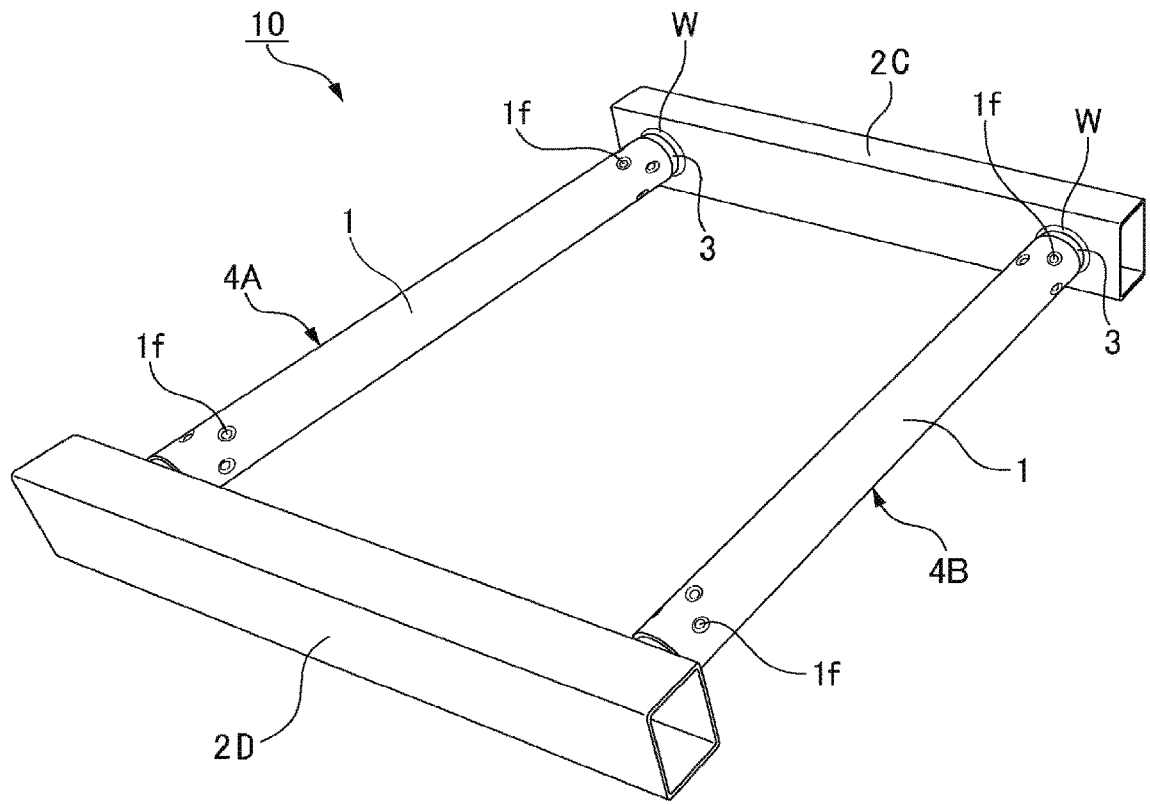
FIG. 48 is a perspective view showing a frame to which the joint of different materials according to the present invention is applied.

FIG. 48 shows another example of the joint 10 of different materials according to the present invention, in which the joined bodies 4A and 4B formed by coupling the pipe (a first member) 1 made of an aluminum alloy and the auxiliary member 3 made of steel to each other serve as beam members (coupling members) and the joined bodies 4A and 4B are joined, by arc welding, to a pair of square steel pipes (side frames, second members) 2C and 2D that are made of steel and are disposed in a manner of being separated from each other and facing each other, so that a lightweight and strong frame can be obtained. In this case as well, in the joined bodies 4A and 4B, a pair of auxiliary members 3 are provided at both end portions of the pipe 1, and the auxiliary members 3 are respectively joined to the square steel pipes 2A and 2B.

Figure 49A:
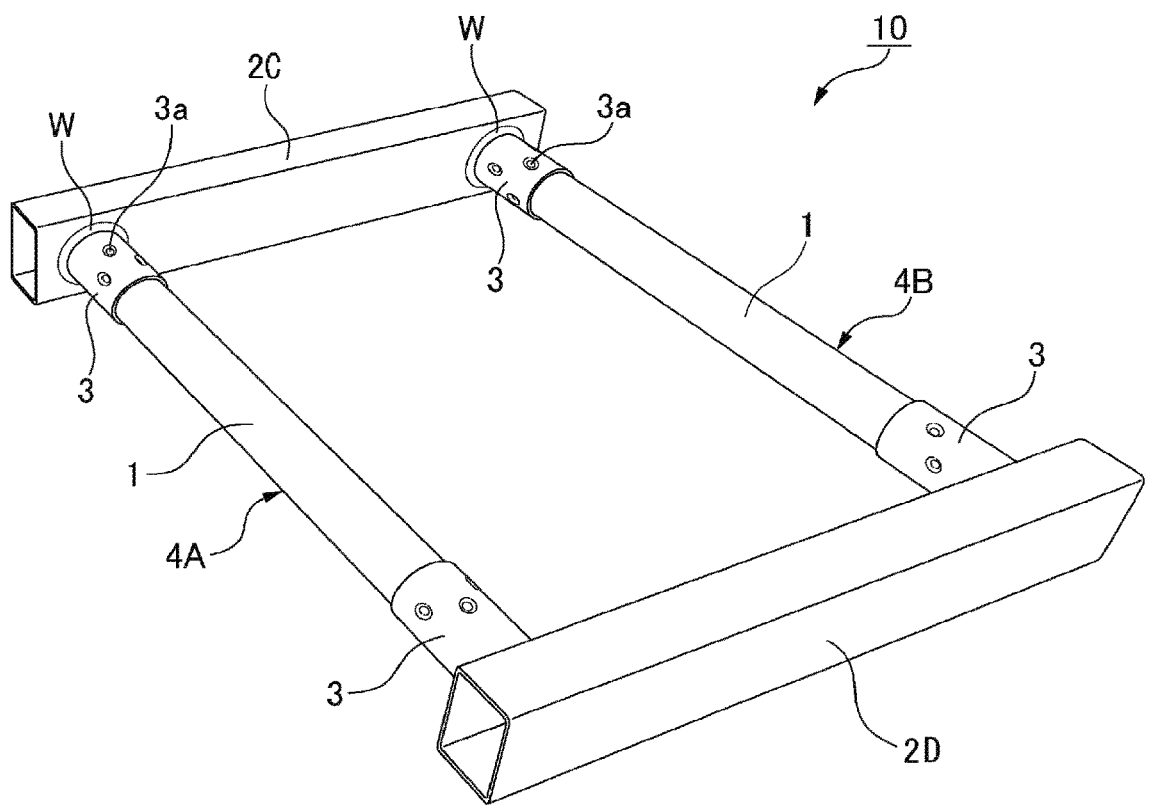
FIG. 49A is a perspective view showing a frame to which the joint of different materials according to the present invention is applied.
Figure 49B:
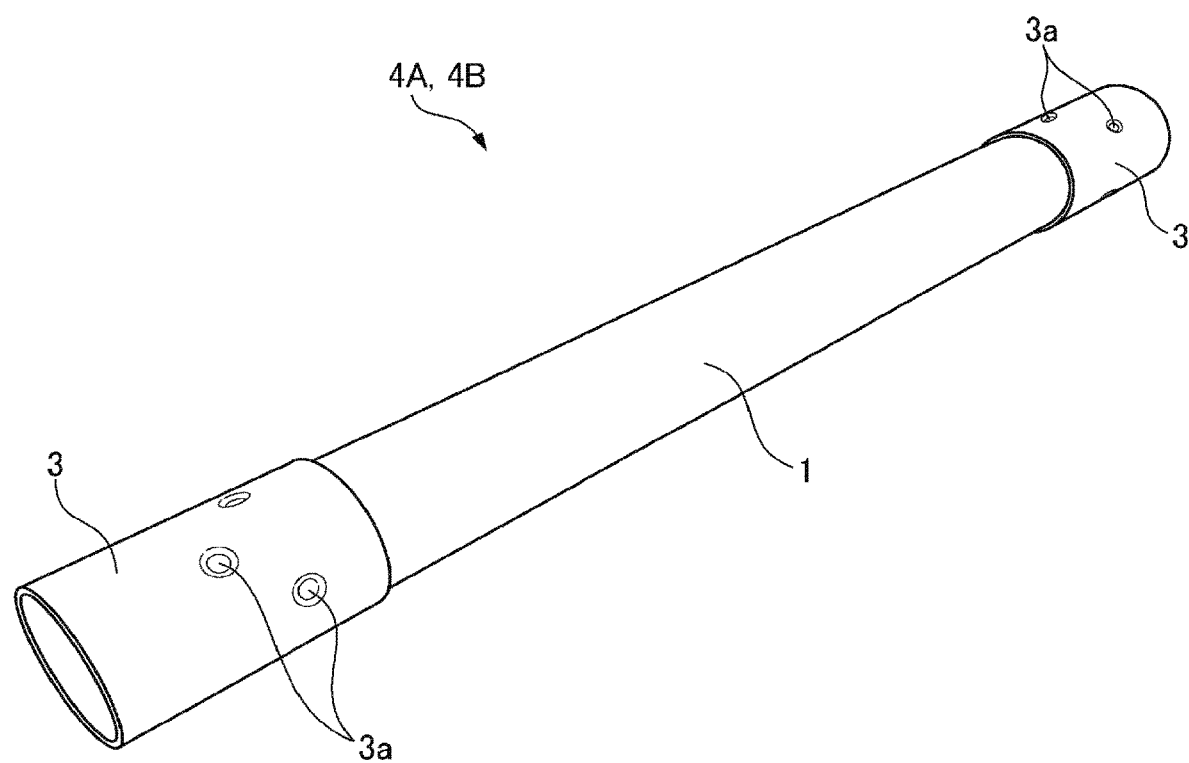
FIG. 49B is a perspective view showing a joined body used in FIG. 49A.

As shown in FIG. 49A, the pipe 1 made of carbon fiber reinforced plastic (CFRP) may be used as a beam member of a frame, instead of the pipe 1 made of an aluminum alloy shown in FIG. 48. Specifically, as shown in FIG. 49B, in the joined bodies 4A and 4B, a pair of auxiliary members 3 that are made of steel and serve as outer members are caulked and coupled to both end portions of the pipe 1 serving as an inner member. In this case, the fitting portion 3a formed in the auxiliary member 3 is fitted into the through hole (not shown) of the pipe 1 as described in the first embodiment. Then, the auxiliary members 3 are respectively joined to the square steel pipes 2A and 2B. In this manner, it is possible to obtain a further lightweight and strong frame by partially using the carbon fiber reinforced plastic (CFRP).

The coupling device according to the present invention is not limited to being used in the method for joining different materials or the method for manufacturing a tubular member equipped with an auxiliary member for joining different materials according to the embodiment described above, and can also be used, for example, in a case where a tubular inner member and a tubular outer member are made of the same material.

At least one of the tubular inner member and the tubular outer member that are coupled by the coupling device according to the present invention may have one bottomed end portion so as to cover an end portion of a joined body.

The present application is based on Japanese Patent Application NO. 2019-122510, filed on Jun. 28, 2019, and the contents thereof are incorporated herein by reference.

REFERENCE SIGNS LIST 1 pipe (first member, tubular member)
1a through hole (hole)
1f fitting portion
2 plate material (second member)
3 auxiliary member
3a fitting portion
3f through hole (hole)
4 joined body (tubular member equipped with auxiliary member for joining different materials)
5 core
8 plunger (pressing member)
8a protruding portion
9 another pipe (second member)
10 joint of different materials
30 device for coupling tubular member
31 base
33 return rubber (mechanism for returning pressing members)
34 pressurizing member
35 pump (drive mechanism)

The invention claimed is:

1. A device for coupling tubular members, the device that couples a tubular inner member with a tubular outer member disposed around the inner member, the coupling device comprising:
a base that holds the inner member and the outer member in a state in which the outer member is disposed around the inner member;
a plurality of pressing members that are supported by the base around the outer member in a manner in which the pressing members are movable in a radial direction of the inner member and the outer member, a tip end of each of the pressing members having a protruding portion;
a pressurizing member that comes into contact with an end part of the pressing members and pressurize the pressing members inward in the radial direction;
a drive mechanism that drives one of the base and the pressurizing member so as to move relative to the other one of the base and the pressurizing member in a direction perpendicular to a moving direction of the pressing members; and
a mechanism for returning the pressing members,
wherein the drive mechanism drives one of the base and the pressurizing member to displace the pressing members inward in the radial direction, so that a part of a peripheral wall of the outer member is bulged inward in the radial direction by the protruding portion, and the inner member and the outer member are caulked and coupled to each other, and
wherein the mechanism is positioned between the pressing members and the peripheral wall of the outer member so as to displace the plurality of pressing members outward in the radial direction relative to the inner member and the outer member that are caulked and coupled to each other.

2. The device for coupling tubular members according to claim 1, further comprising a columnar core that can be placed inside the inner member.

3. The device for coupling tubular members according to claim 2, wherein the core has a plurality of groove portions extending along an axial direction, and
the core is attached to the base such that phases of the plurality of groove portions and phases of the plurality of pressing members coincide with each other.

4. A method for joining different materials comprising a tubular first member made of a first material and a second member made of a second material different from the first material, using the device for coupling tubular members according to claim 3, the method comprising:
setting the inner member and the outer member on the base such that one of a tubular auxiliary member made of a third material different from the first material and the first member is disposed as the outer member around the other one of the auxiliary member and the first member as the inner member;
caulking and coupling the inner member and the outer member to each other by displacing the pressing members inward in the radial direction toward a peripheral wall of the outer member that faces the plurality of groove portions formed in the core via the inner member, and causing a part of the peripheral wall of the outer member to bulge inward in the radial direction and fit into recesses formed in the inner member;
detaching the inner member and outer member that are caulked and coupled to each other from the base; and
joining the first member and the second member via the auxiliary member by welding the auxiliary member and the second member.

5. A method for manufacturing a tubular member equipped with an auxiliary member for joining different materials, comprising a tubular auxiliary member that is made of a material different from a material of the tubular member and is fitted to the tubular member, the method using the device for coupling tubular members according to claim 3, the method comprising:
setting the inner member and the outer member on the base such that one of the tubular member and the auxiliary member is disposed as the outer member around the other one of the tubular member and the auxiliary member which is disposed as the inner member;
caulking and coupling the inner member and the outer member to each other by displacing the pressing members inward in the radial direction toward a peripheral wall of the outer member that faces the plurality of groove portions formed in the core via the inner member, and causing a part of the peripheral wall of the outer member to bulge inward in the radial direction and fit into recesses formed in the inner member; and
detaching the inner member and outer member that are caulked and coupled to each other from the base.

6. The device for coupling tubular members according to claim 1, wherein
the base has a plurality of non-circular support holes that supports the plurality of pressing members respectively around the outer member in a manner in which the pressing members are movable in the radial direction of the inner member and the outer member, and the base is formed into a cylindrical shape, and
the pressurizing member is formed into an annular shape so as to surround a periphery of the base having the cylindrical shape, and has an inclined surface that faces an inclined surface of the end part of the pressing members.

7. A method for joining different materials comprising a tubular first member made of a first material and a second member made of a second material different from the first material, using the device for coupling tubular members according to claim 1, the method comprising:
- setting the inner member and the outer member on the base such that one of a tubular auxiliary member made of a third material different from the first material and the first member is disposed as the outer member around a portion of the other one of the auxiliary member and the first member as the inner member where a plurality of holes are formed;
- caulking and coupling the inner member and the outer member to each other by displacing the pressing members inward in the radial direction toward a peripheral wall of the outer member that faces the plurality of holes formed in the inner member, and causing a part of the peripheral wall of the outer member to bulge inward in the radial direction and fit into the holes;
- detaching the inner member and outer member that are caulked and coupled to each other from the base; and
- joining the first member and the second member via the auxiliary member by welding the auxiliary member and the second member.

8. The method for joining different materials according to claim 7, wherein
- a columnar core is provided, the core has a plurality of groove portions extending along an axial direction at phases corresponding to the plurality of holes, and the core is placed inside the inner member,
- the core is attached to the base such that phases of the plurality of groove portions and phases of the plurality of pressing members coincide with each other,
- the inner member is set on the base in the setting such that phases of the plurality of holes coincide with the phases of the plurality of groove portions of the core, and
- a part of the peripheral wall of the outer member is fitted into the holes of the inner member and the groove portions of the core in the caulking and coupling.

9. The method for joining different materials according to claim 7, wherein
- the inner member is the auxiliary member, and the outer member is the first member,
- an expanded pipe portion having an outer peripheral surface of which a diameter is larger than an inner diameter of the first member is provided at an axial end portion of the auxiliary member, and
- the axial end portion of the first member is brought into contact with the expanded pipe portion of the auxiliary member.

10. The method for joining different materials according to claim 7,
- wherein the first material is made of any one of aluminum alloy, magnesium alloy, steel, and non-metal, and
- the second and the third materials are made of any one of aluminum alloy, magnesium alloy and steel.

11. A method for manufacturing a tubular member equipped with an auxiliary member for joining different materials, comprising a tubular member and a tubular auxiliary member that is made of a material different from a material of the tubular member and is fitted to the tubular member, the method using the device for coupling tubular members according to claim 1, the method comprising:
- setting the inner member and the outer member on the base such that one of the tubular member and the auxiliary member is disposed as the outer member around a portion of the other one of the tubular member and the auxiliary member which is disposed as the inner member where a plurality of holes are formed in the inner member;
- caulking and coupling the inner member and the outer member to each other by displacing the pressing members inward in the radial direction toward a peripheral wall of the outer member that faces the plurality of holes formed in the inner member, and causing a part of the peripheral wall of the outer member to bulge inward in the radial direction and fit into the holes; and
- detaching the inner member and outer member that are caulked and coupled to each other from the base.

12. The method for manufacturing a tubular member equipped with an auxiliary member for joining different materials according to claim 11, wherein
- a columnar core is provided, the core has a plurality of groove portions extending along an axial direction at phases corresponding to the plurality of holes, and the core can be placed inside the inner member,
- the core is attached to the base such that phases of the plurality of groove portions and phases of the plurality of pressing members coincide with each other,
- the inner member is set on the base in the setting such that phases of the plurality of holes coincide with the phases of the plurality of groove portions of the core, and
- a part of the peripheral wall of the outer member is fitted into the holes of the inner member and the groove portions of the core in the caulking and coupling.

13. The method for manufacturing a tubular member equipped with an auxiliary member for joining different materials according to claim 11, wherein
- the inner member is the auxiliary member, and the outer member is the tubular member,
- an expanded pipe portion having an outer peripheral surface of which a diameter is larger than an inner diameter of the tubular member is provided at an axial end portion of the auxiliary member, and
- the axial end portion of the tubular member is brought into contact with the expanded pipe portion of the auxiliary member.

14. The method for manufacturing a tubular member equipped with an auxiliary member for joining different materials according to claim 11, wherein
- a material of the tubular member is any one of aluminum alloy, magnesium alloy, a steel, and a non-metal, and
- a material of the auxiliary member is any one of aluminum alloy, magnesium alloy, and the steel.

* * * * *